US008817422B2

(12) United States Patent
Winarski

(10) Patent No.: US 8,817,422 B2
(45) Date of Patent: Aug. 26, 2014

(54) MAGNETIC STORAGE MEDIUM COMPRISED OF MAGNETIC NANOPARTICLES CONTAINED WITHIN NANOTUBES

(71) Applicant: Sigma Pro Ltd. LLC, Dover, DE (US)

(72) Inventor: Tyson York Winarski, Mountain View, CA (US)

(73) Assignee: Sigma Pro Ltd. LLC, Dover, DE (US)

( * ) Notice: Subject to any disclaimer, the term of this patent is extended or adjusted under 35 U.S.C. 154(b) by 0 days.

(21) Appl. No.: 13/864,125

(22) Filed: Apr. 16, 2013

(65) Prior Publication Data

US 2013/0230743 A1    Sep. 5, 2013

Related U.S. Application Data

(60) Division of application No. 12/569,353, filed on Sep. 29, 2009, now Pat. No. 8,437,104, which is a continuation-in-part of application No. 12/403,729, filed on Mar. 13, 2009, now Pat. No. 8,507,032.

(60) Provisional application No. 61/243,347, filed on Sep. 17, 2009.

(51) Int. Cl.
*G11B 5/65* (2006.01)
*G11B 5/82* (2006.01)

(52) U.S. Cl.
USPC ........................................... 360/135

(58) Field of Classification Search
CPC ............ G11B 5/65; G11B 5/82; G11B 5/706; G11B 5/66; G11B 5/712

USPC ............. 360/135, 77.08; 428/832, 836.3, 826
See application file for complete search history.

(56) References Cited

U.S. PATENT DOCUMENTS

| | | | |
|---|---|---|---|
| 4,333,985 A | 6/1982 | Shirahata | |
| 4,393,110 A | 7/1983 | Fukuda | |
| 5,851,643 A * | 12/1998 | Honda et al. | 428/212 |
| 6,324,032 B1 | 11/2001 | Ohtsuka | |
| 6,465,132 B1 | 10/2002 | Jin | |
| 6,835,330 B2 | 12/2004 | Nishino | |
| 6,962,685 B2 | 11/2005 | Sun | |
| 7,045,088 B2 | 5/2006 | Matsumiya | |
| 7,419,624 B1 | 9/2008 | Smalley | |
| 7,687,159 B2 | 3/2010 | Chen | |
| 7,687,160 B2 | 3/2010 | Winarski | |
| 7,695,769 B2 | 4/2010 | Watanabe | |
| 7,803,262 B2 | 9/2010 | Haik | |

(Continued)

FOREIGN PATENT DOCUMENTS

JP    2005-56534 A    3/2005

OTHER PUBLICATIONS

Tyagi, P.K., et al., "Preparation of Ni-Filled Carbon Nanotubes for Key Potential Applications in Nanotechnology," in A. Matthews (ed.,), "Thin Solid Films: Proceedings of the 31st International Conference on Metallurgical Coatings and Thin Films, San Diego, Calif., Apr. 19-23, 2004," Elsevier, Amsterdam, vols. 469-470, pp. 127-130.

*Primary Examiner* — Will J Klimowicz
(74) *Attorney, Agent, or Firm* — Christensen O'Connor Johnson Kindness PLLC

(57) ABSTRACT

A magnetic storage medium is formed of magnetic nanoparticles that are encapsulated within nanotubes (e.g., carbon nanotubes).

7 Claims, 39 Drawing Sheets

Nanotube with encapsulated magnetic-shunt nanoparticles

(56) References Cited

U.S. PATENT DOCUMENTS

| | | |
|---|---|---|
| 7,976,966 B2 | 7/2011 | Winarski |
| 8,213,119 B2 * | 7/2012 | Jubert .......................... 360/135 |
| 8,241,767 B2 * | 8/2012 | Winarski ................... 428/845.1 |
| 8,243,390 B2 * | 8/2012 | Jubert .......................... 360/135 |
| 8,437,104 B2 * | 5/2013 | Winarski ..................... 360/135 |
| 2003/0190278 A1 | 10/2003 | Wang |
| 2003/0214742 A1 * | 11/2003 | Kai et al. ........................ 360/46 |
| 2004/0071951 A1 | 4/2004 | Jin |
| 2004/0106009 A1 | 6/2004 | Nakamura |
| 2004/0127130 A1 | 7/2004 | Yi |
| 2005/0058805 A1 | 3/2005 | Kimura |
| 2005/0068679 A1 | 3/2005 | Chen |
| 2005/0079282 A1 | 4/2005 | Jin |
| 2005/0142385 A1 | 6/2005 | Jin |
| 2005/0170169 A1 | 8/2005 | Watanabe |
| 2005/0214356 A1 | 9/2005 | Joyce |
| 2005/0249980 A1 * | 11/2005 | Itoh et al. ..................... 428/828 |
| 2005/0254168 A1 | 11/2005 | Inomata |
| 2006/0065136 A1 | 3/2006 | Takahashi |
| 2006/0075418 A1 | 4/2006 | Kurt |
| 2006/0099461 A1 | 5/2006 | Jones |
| 2007/0054154 A1 | 3/2007 | Leu |
| 2007/0158610 A1 | 7/2007 | Hong |
| 2007/0184969 A1 | 8/2007 | Dubois |
| 2007/0237987 A1 | 10/2007 | Winarski |
| 2007/0243124 A1 | 10/2007 | Baughman |
| 2007/0290384 A1 | 12/2007 | Kodas |
| 2008/0014442 A1 | 1/2008 | Rida |
| 2008/0260941 A1 | 10/2008 | Jin |
| 2009/0053512 A1 | 2/2009 | Pyun |
| 2009/0202644 A1 | 8/2009 | Gogotsi |
| 2009/0220561 A1 | 9/2009 | Jin |
| 2009/0280242 A1 * | 11/2009 | Winarski ..................... 427/130 |
| 2010/0014187 A1 | 1/2010 | Winarski |
| 2010/0285337 A1 | 11/2010 | Winarski |
| 2010/0291412 A1 | 11/2010 | Winarski |

* cited by examiner

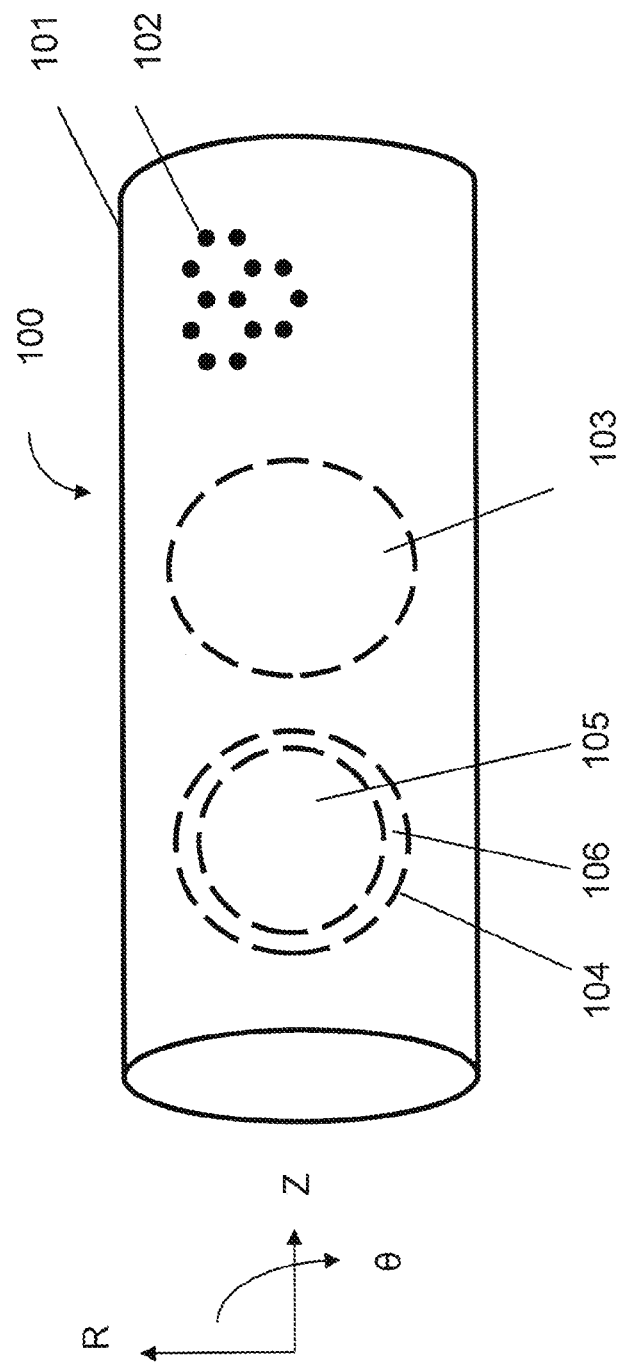
FIG. 1 – Nanotube with encapsulated magnetic nanoparticles

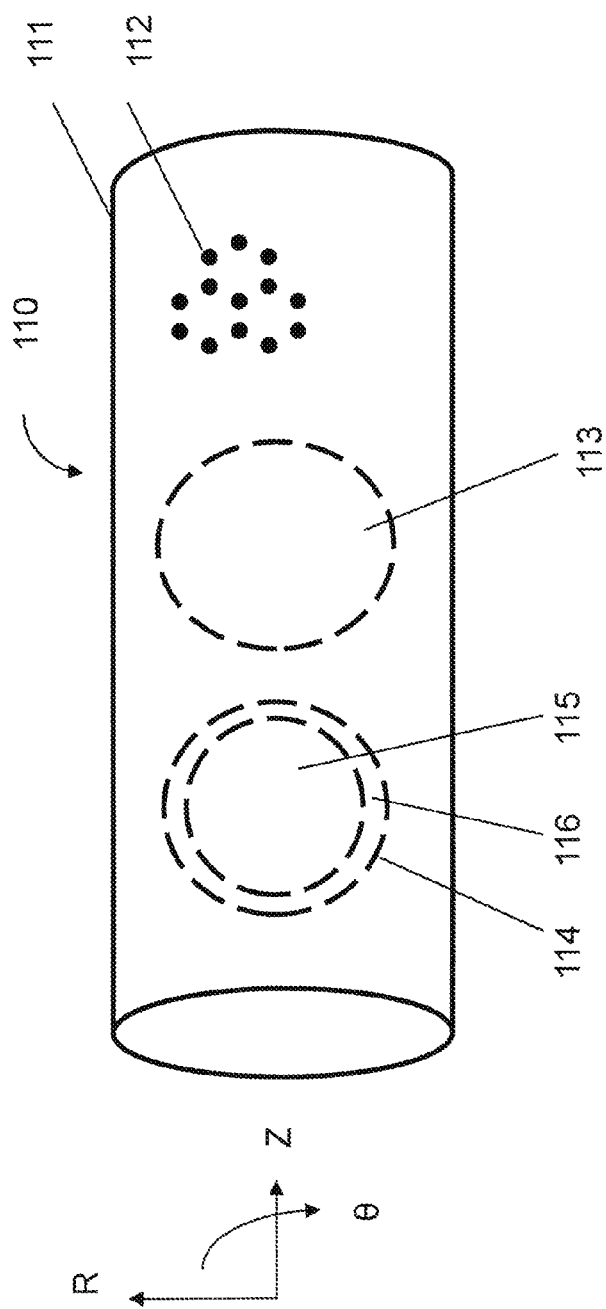
FIG. 2 – Nanotube with encapsulated magnetic-shunt nanoparticles

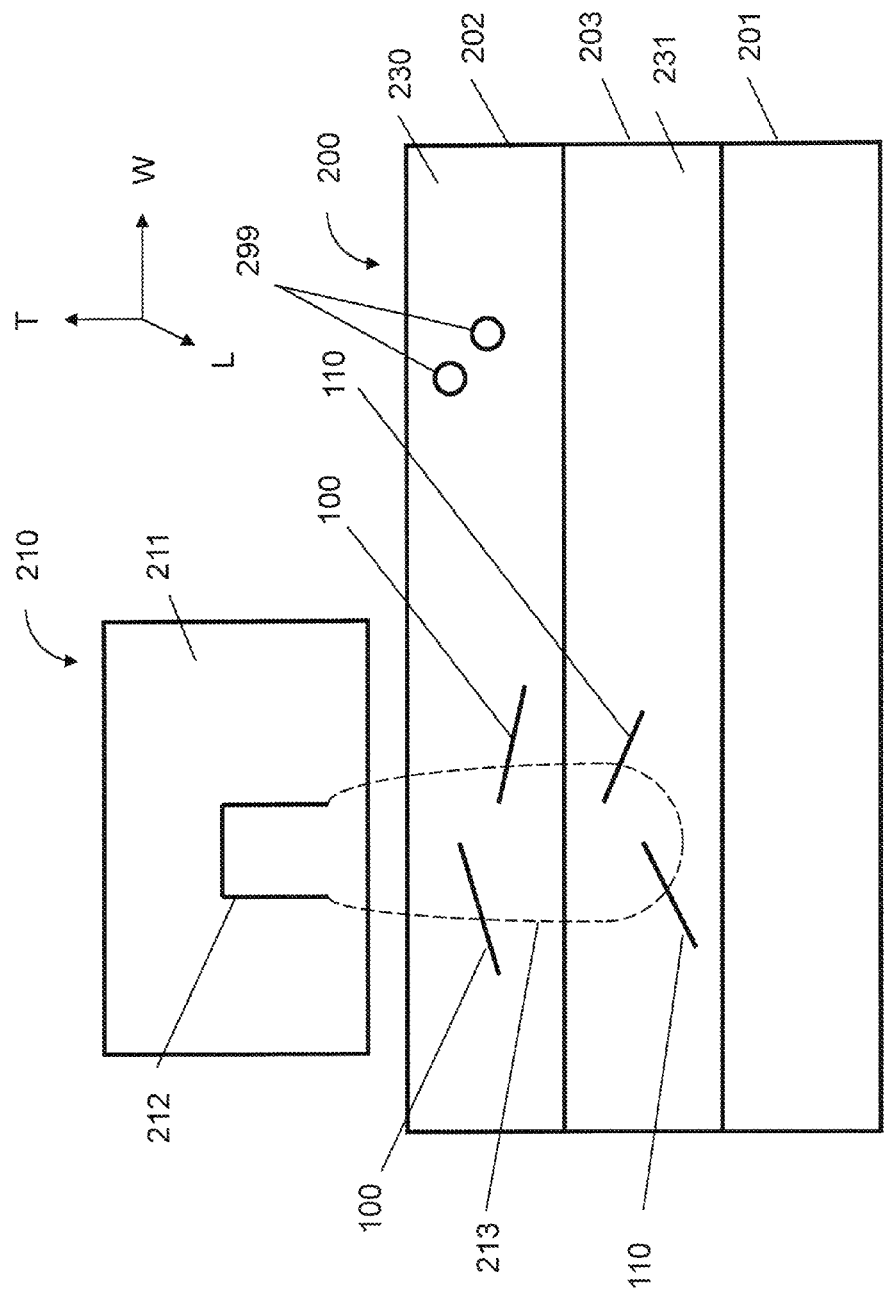
FIG. 3 – Cross-section of Magnetic Medium

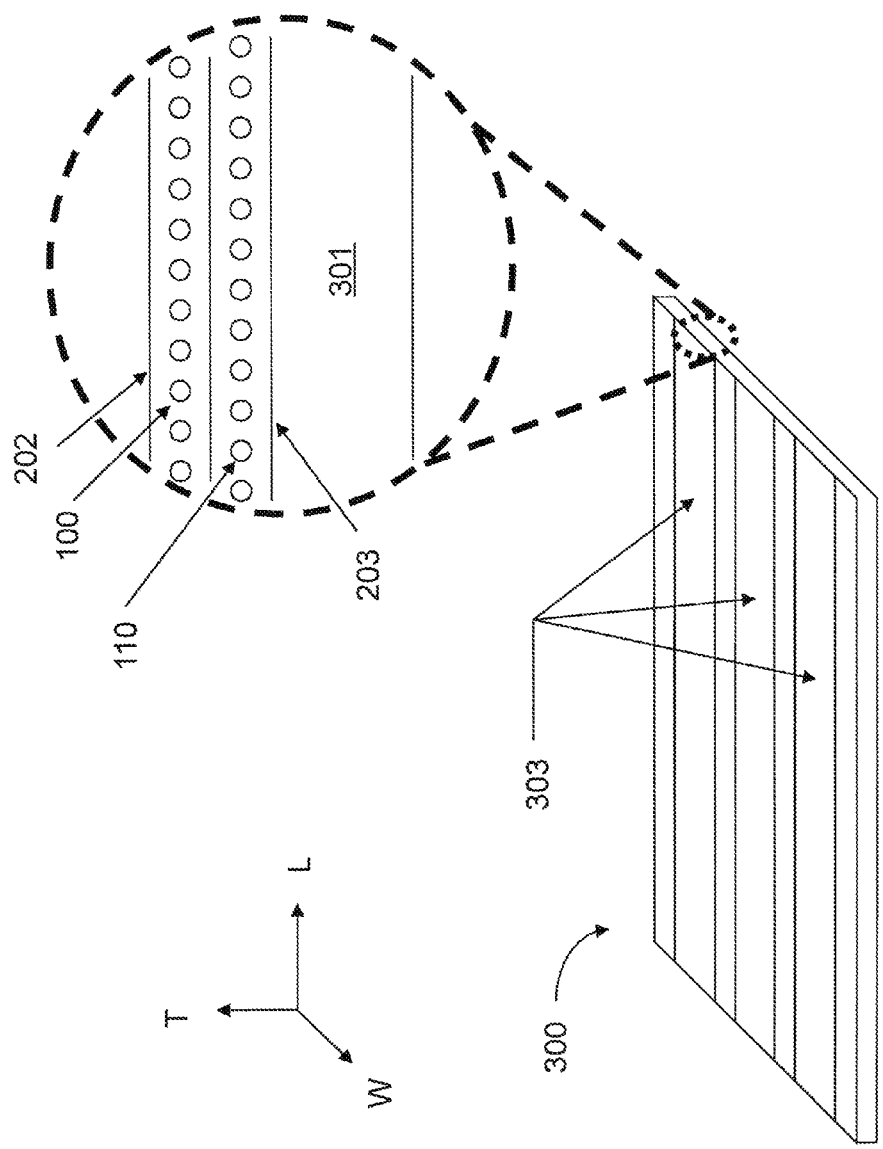
FIG. 4 View of Magnetic Tape

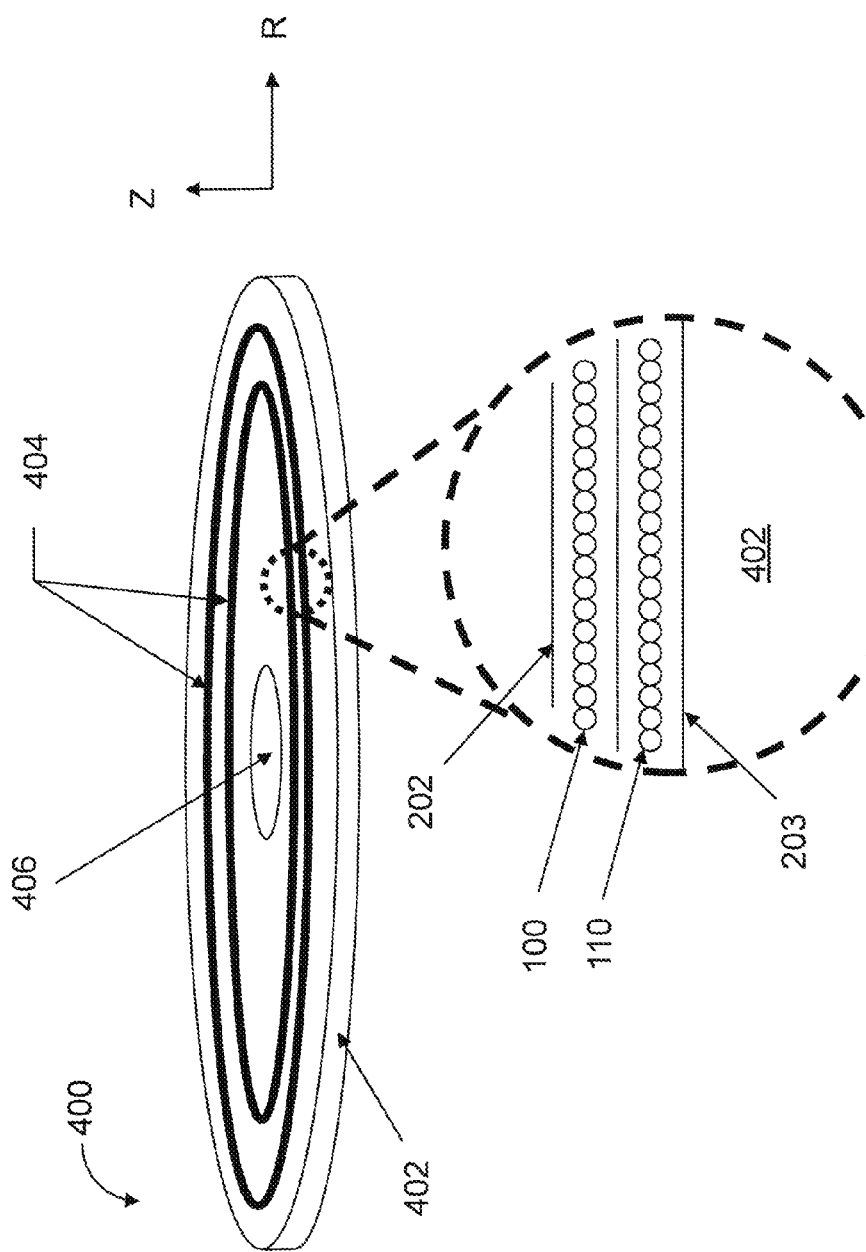
FIG. 5 – View of Disk with Concentric Rings

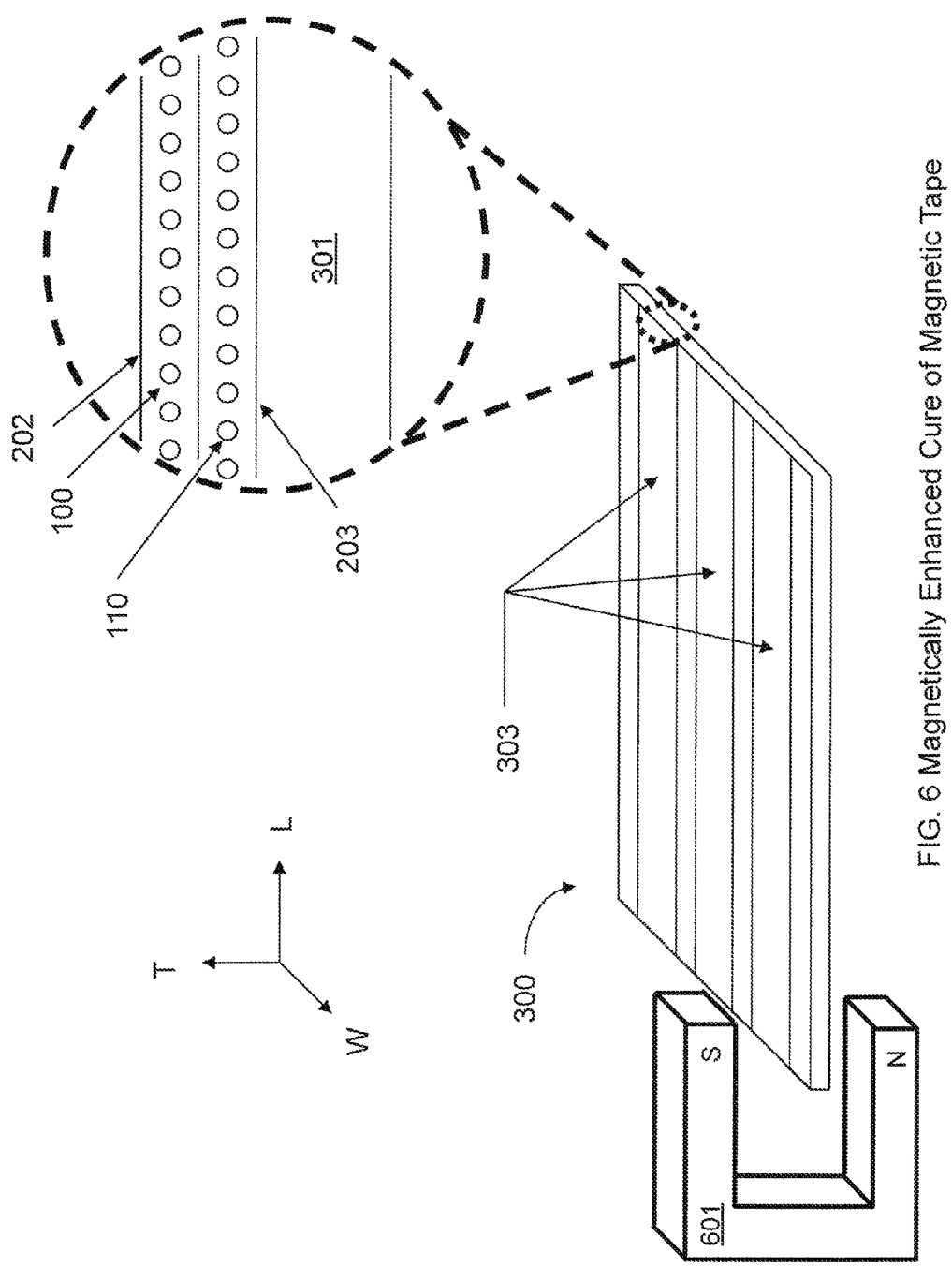
FIG. 6 Magnetically Enhanced Cure of Magnetic Tape

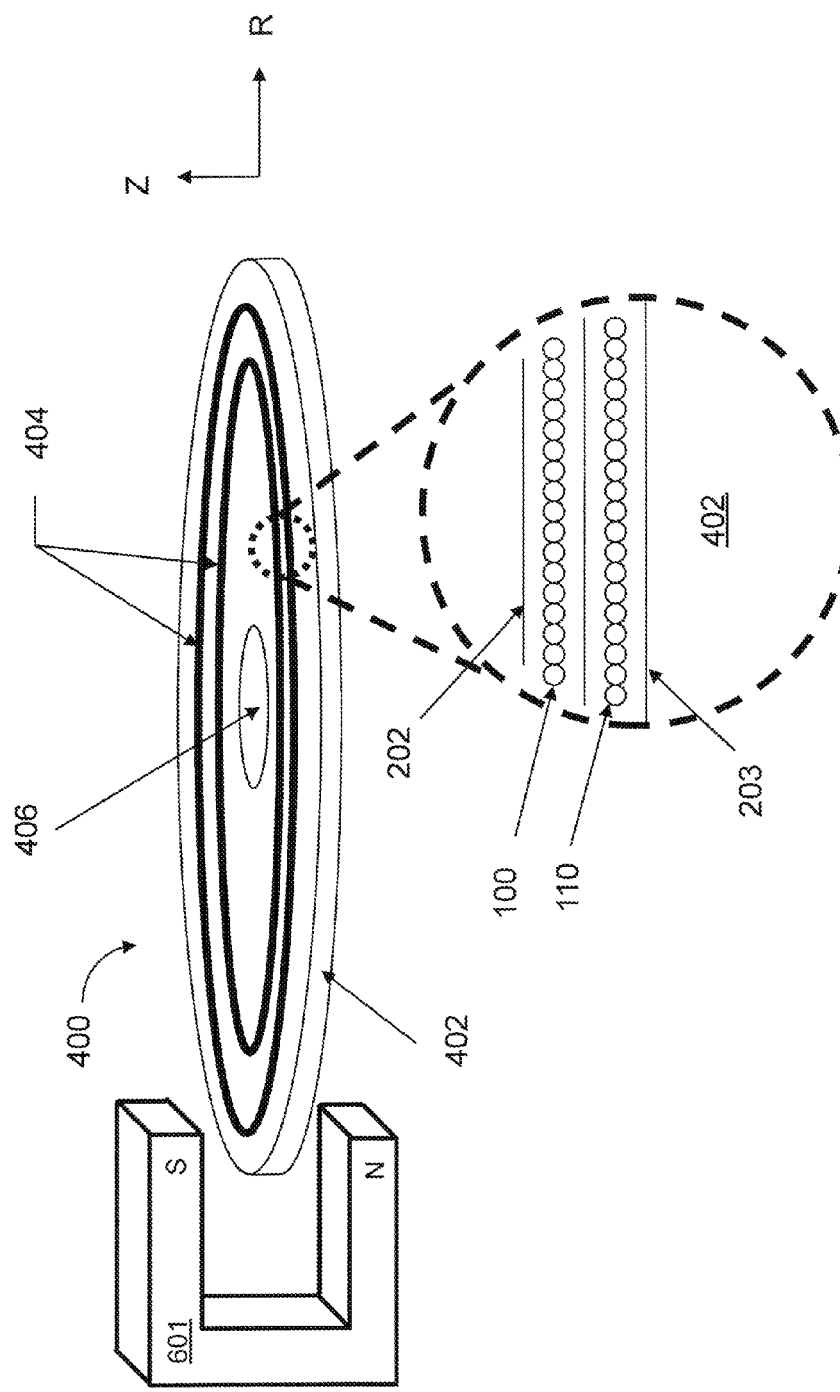
FIG. 7 – Magnetically Enhanced Cure of Disk with Concentric Rings

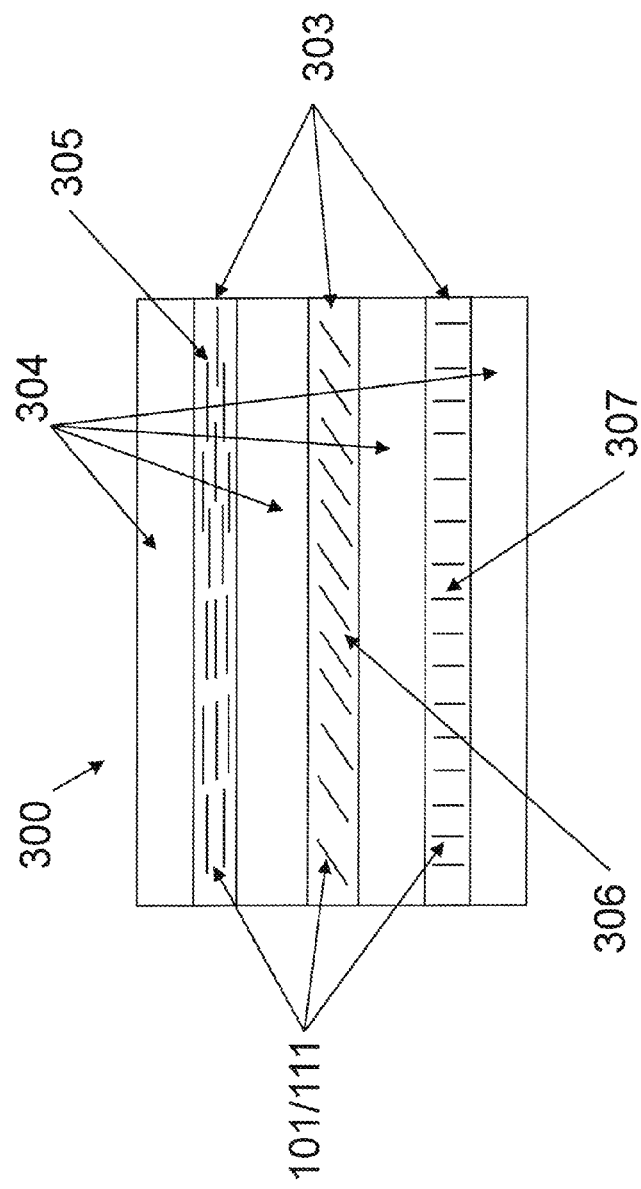
FIG. 8 – A Magnetic Tape Having Carbon Nanotubes In Various Orientations Within A Data Track

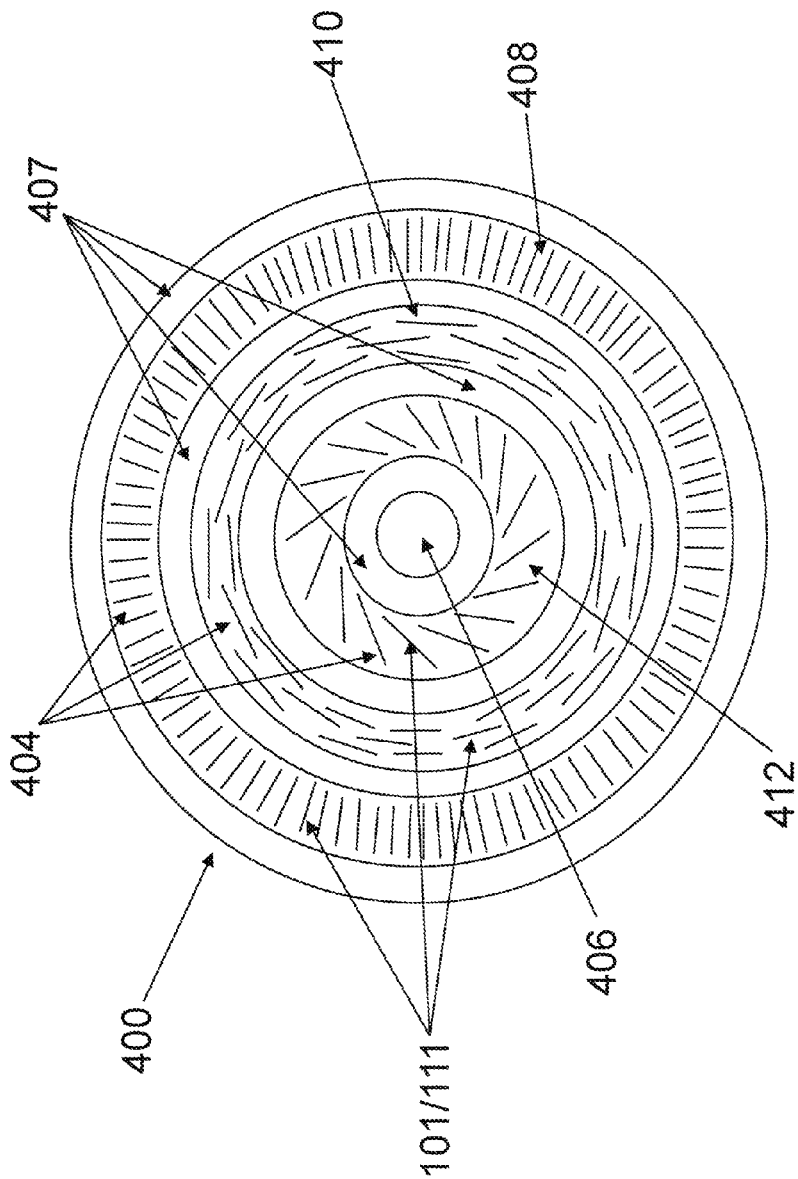
FIG. 9 – A Magnetic Disk Having Carbon Nanotubes In Various Orientations Within An Annular Data Track

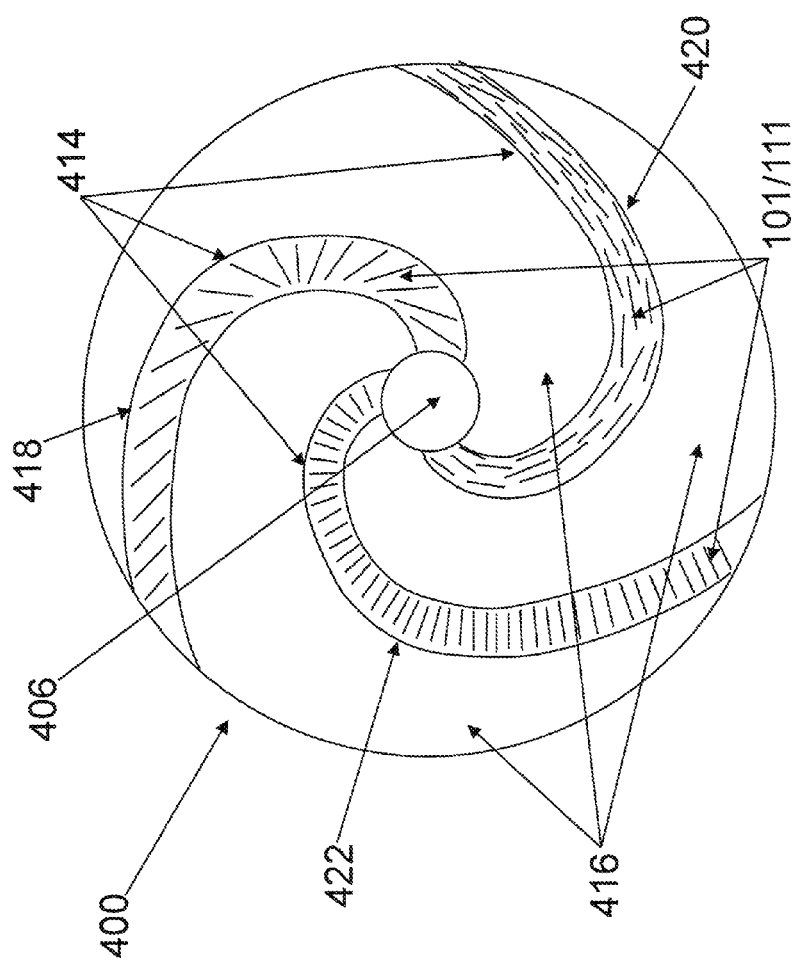
FIG. 10 – A Magnetic Disk Having Carbon Nanotubes In Various Orientations Within A Spiral Data Track

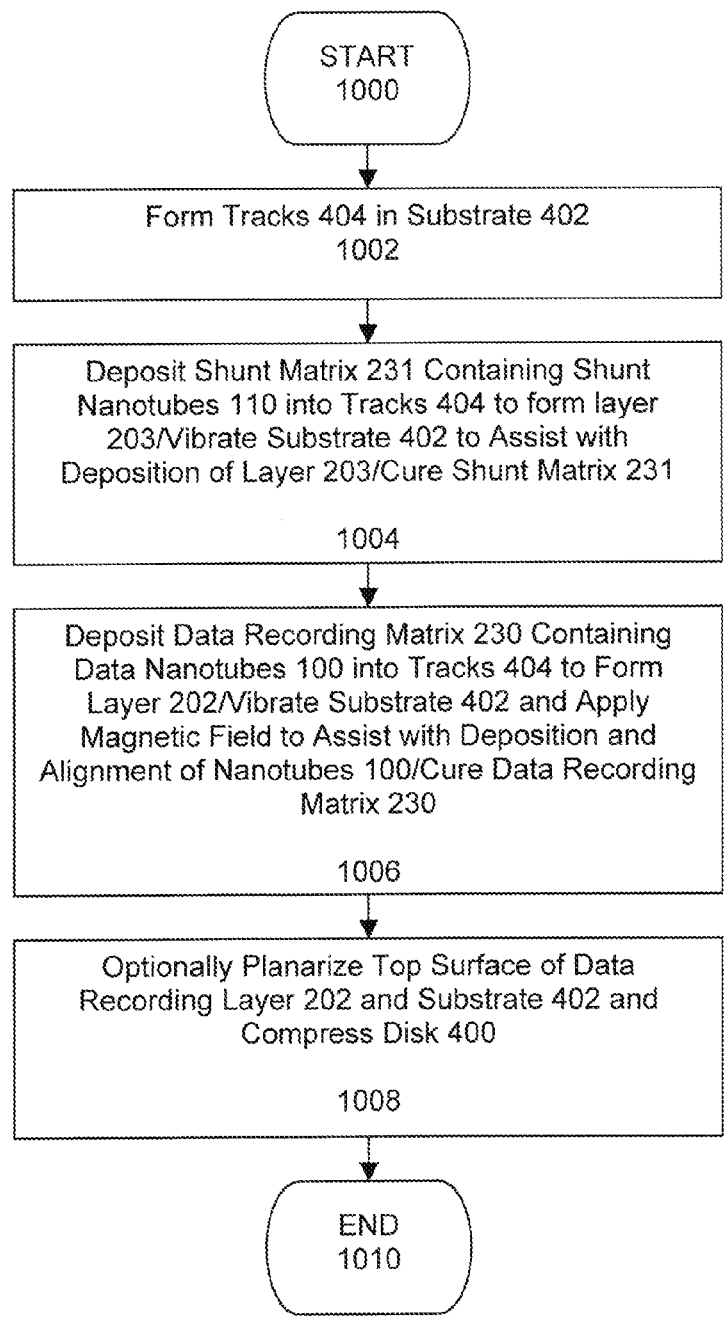
FIG. 11 – A Flow Chart for Manufacturing a Magnetic Disk Having Carbon Nanotubes

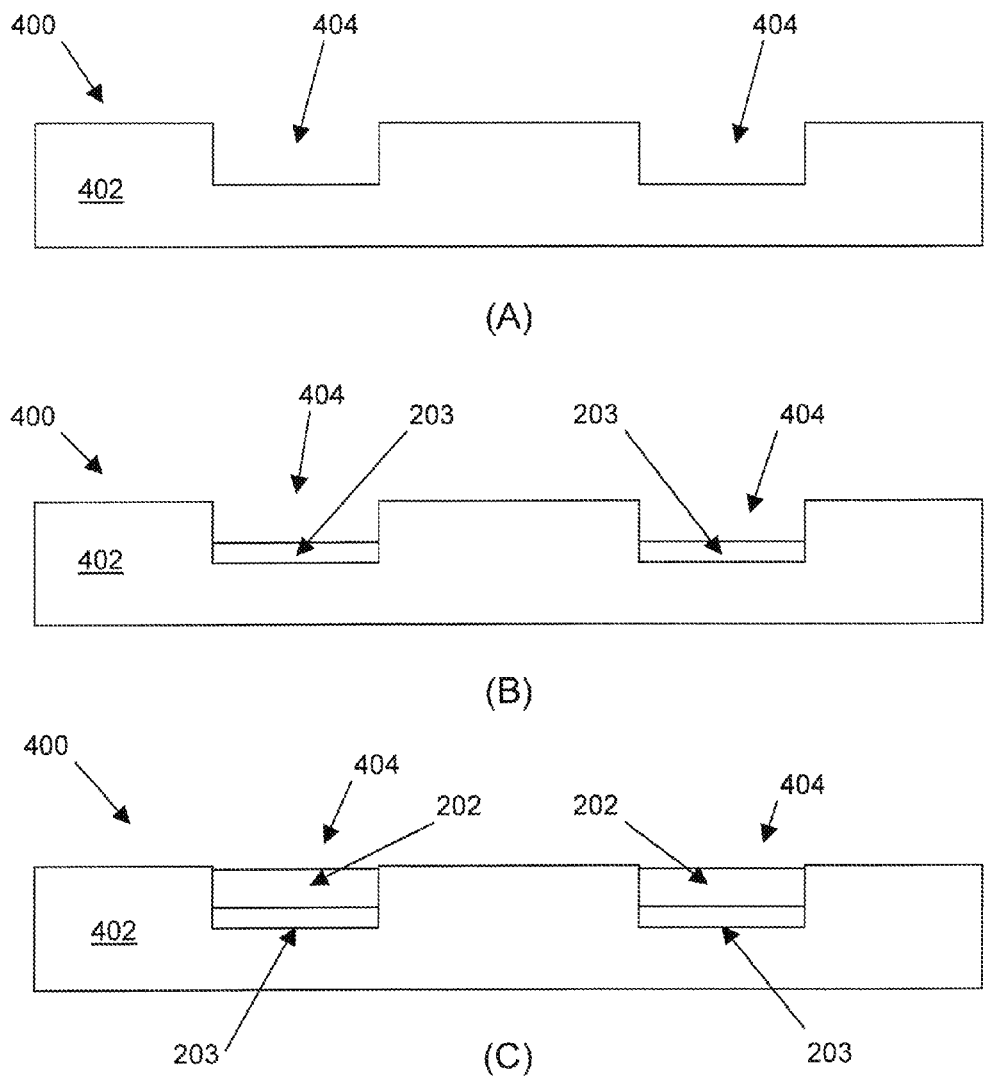
FIG. 12 – Cross-Sectional Flow Diagram for Manufacturing a Magnetic Disk Having Carbon Nanotubes

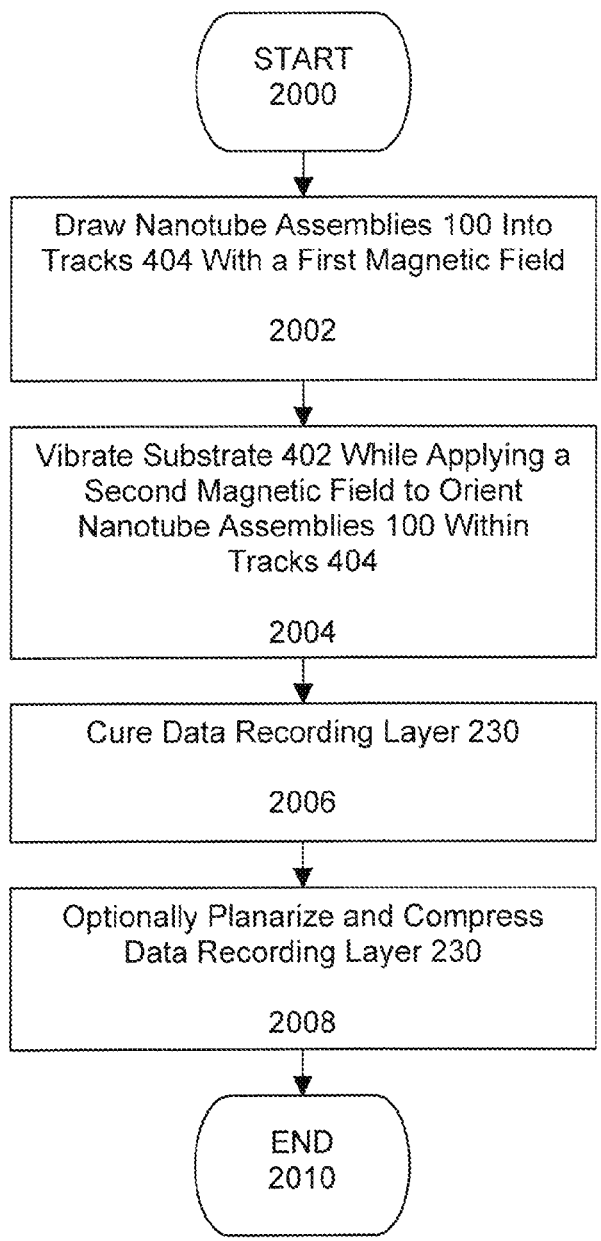
FIG. 13 – A Flow Chart for Manufacturing a Data Recording Layer

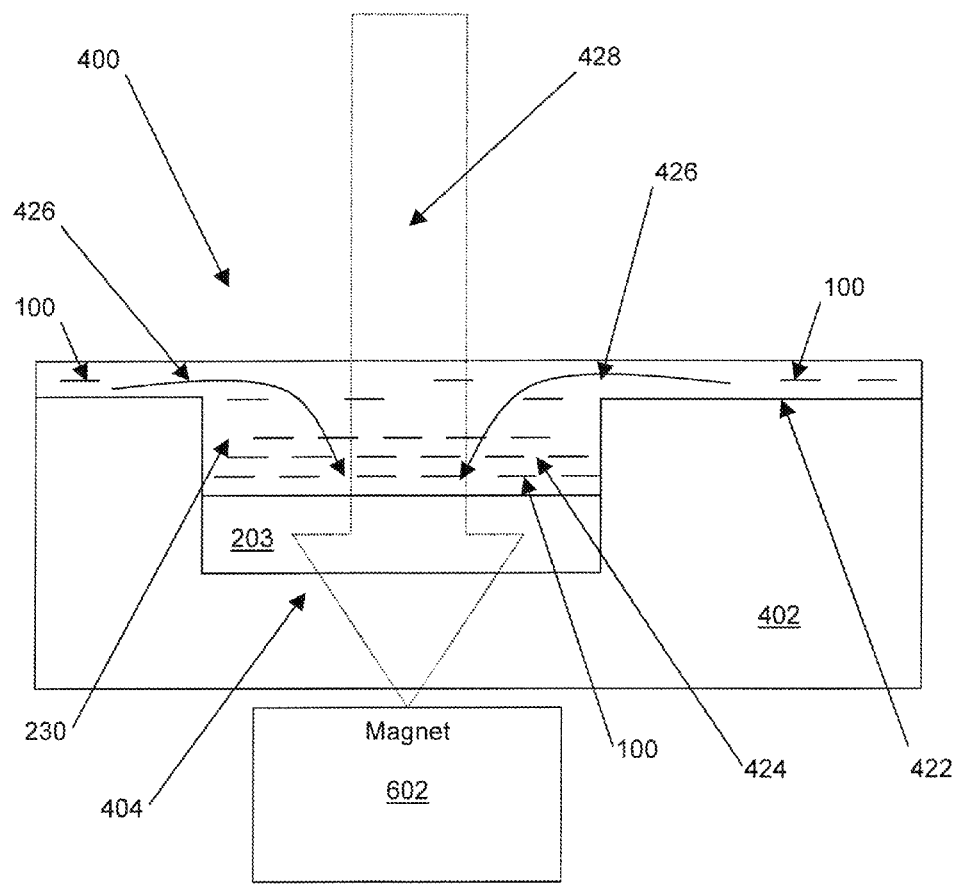
FIG. 14 – Application of Magnetic Field to Data Recording Layer to Draw Nanotubes into Tracks

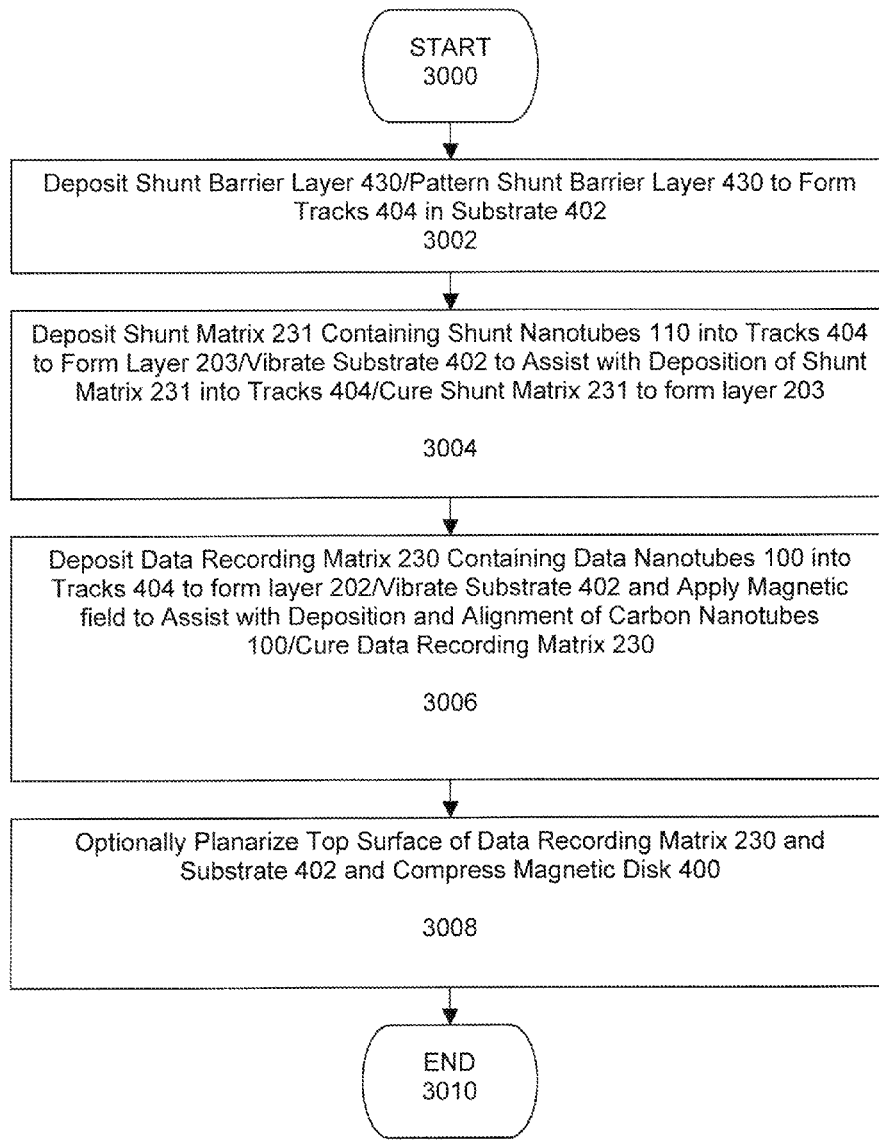
FIG. 15 – A Flow Chart for Manufacturing a Magnetic Disk Having Carbon Nanotubes

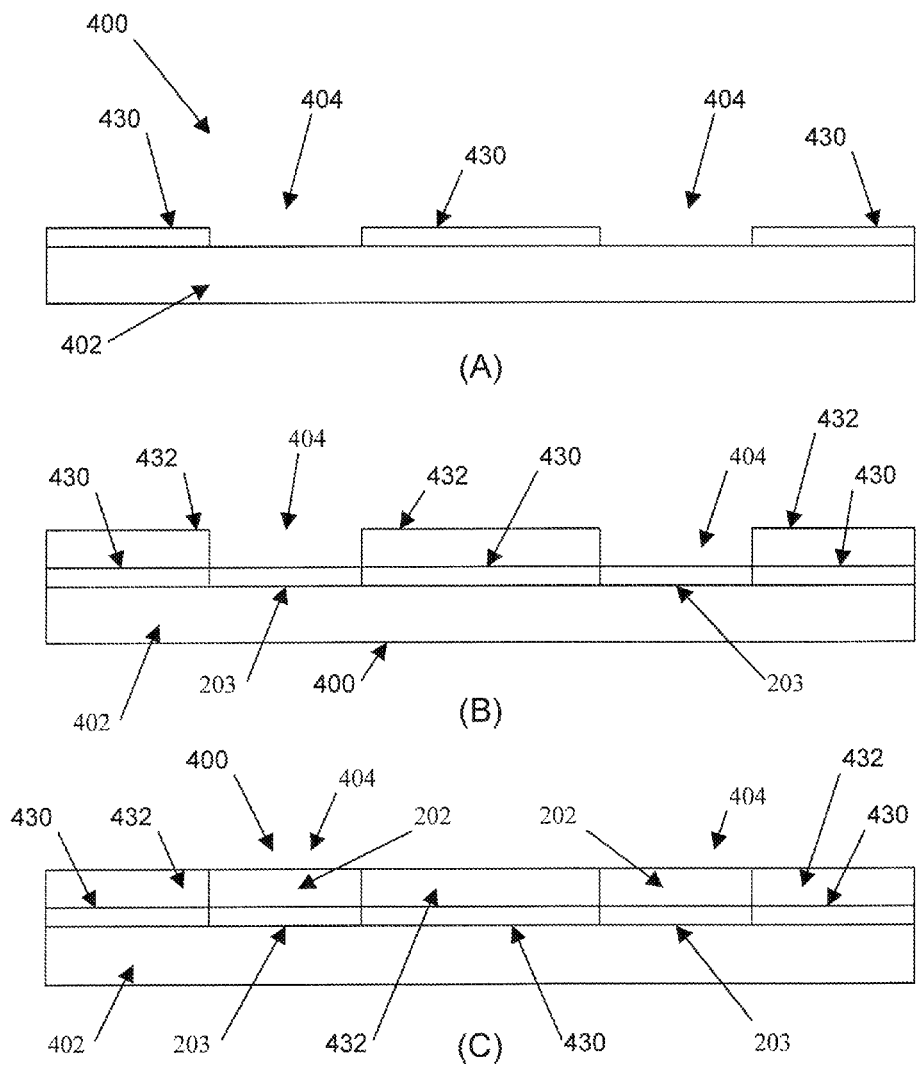
FIG. 16 – Cross-Sectional Flow Diagram for Manufacturing a Magnetic Disk Having Carbon Nanotubes

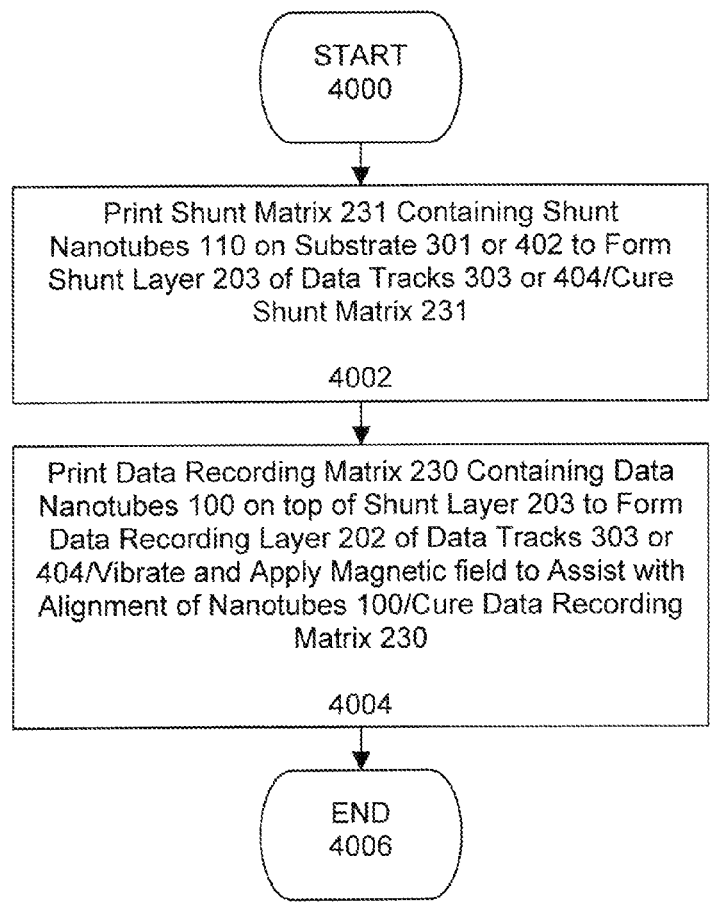
FIG. 17 – A Flow Chart for Manufacturing a Magnetic Tape or a Flexible Magnetic Disk Having Carbon Nanotubes

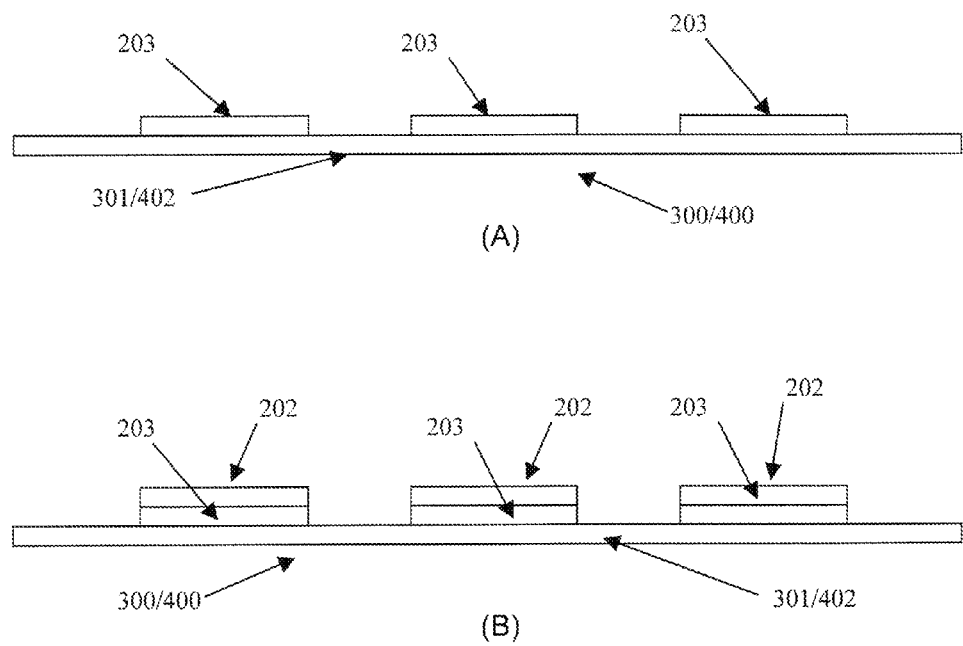
FIG. 18 – Cross-Sectional Flow Diagram for Manufacturing a Flexible Magnetic Disk or Magnetic Tape Having Carbon Nanotubes

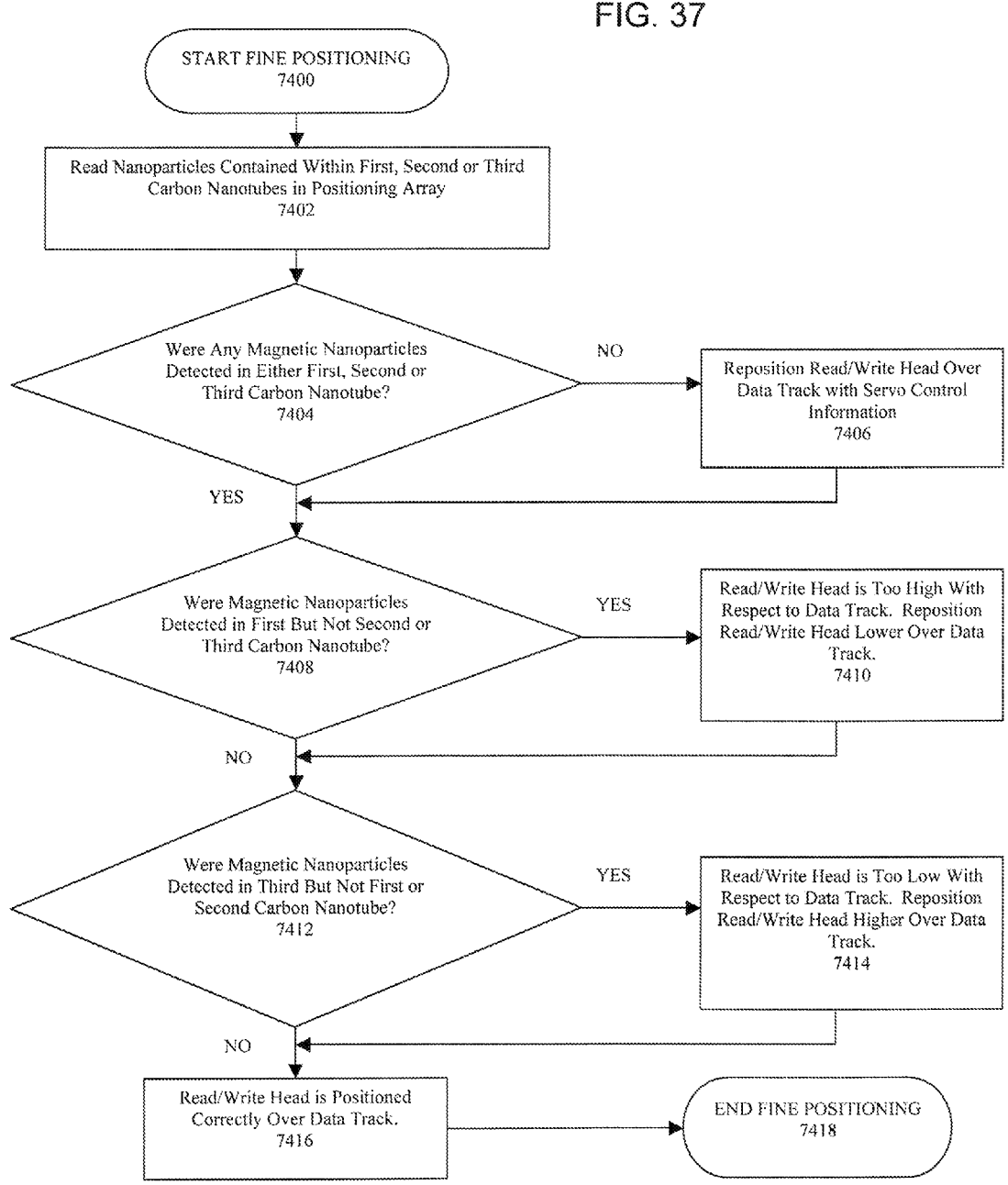

MAGNETIC STORAGE MEDIUM COMPRISED OF MAGNETIC NANOPARTICLES CONTAINED WITHIN NANOTUBES

CROSS-REFERENCES TO RELATED APPLICATIONS

This application is a divisional of U.S. patent application Ser. No. 12/569,353, filed on Sep. 29, 2009, which is a continuation-in-part of U.S. patent application Ser. No. 12/403,729, filed Mar. 13, 2009, both of which are hereby incorporated by reference in their entirety. U.S. patent application Ser. No. 12/569,353 also claims the benefit of U.S. Provisional Patent Application No. 61/243,347, filed on Sep. 17, 2009, and is also hereby incorporated by reference in its entirety.

BACKGROUND

The pursuit of higher performance computing systems is driving the reduction in scale of magnetic storage media. Higher storage densities allow for the reduction of device sizes, an enhancement of device capabilities, and a reduction in data storage costs. To facilitate this increase in magnetic data storage density, industry is constantly searching for structures and processes to reduce the size of information storage sectors and tracks on magnetic tape and magnetic disks.

Current magnetic media technology is based upon the ability to magnetize cells of magnetic materials that are deposited directly on a substrate material. These substrate materials are flexible, in the case of magnetic tape of floppy disks, or rigid, in the case of hard disks. The laws of physics place an eventual limit on the ability to increase the storage density of media that is formed of magnetic particles deposited directly on such a storage tape or disk. In the near future, the magnetic storage media industry will reach this storage density limit. It is therefore essential to find new technologies to replace direct deposition of magnetic materials to facilitate further increases in magnetic storage media density.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure includes a method of writing information to a magnetic storage media that includes positioning a magnetic field generator over the magnetic storage media. The magnetic field generator can be formed of a carbon nanotube containing a magnetic nanoparticle. The magnetic storage media is formed of a plurality of carbon nanotubes that each contains a plurality of magnetic nanoparticles. The method includes generating a magnetic field with the magnetic field generator and imparting a polarization to at least one of the magnetic nanoparticles in the magnetic media with the magnetic field. The polarization represents information.

The present disclosure also includes a method of writing information to a magnetic storage media that includes positioning a magnetic field generator, which is a Helmholtz coil, over the magnetic storage media. The Helmholtz coil includes a nano-wire wrapped around a carbon nanotube. The magnetic storage media includes a plurality of carbon nanotubes each containing a magnetic nanoparticle. The method includes generating a magnetic field with the magnetic field generator and imparting a polarization to the magnetic nanoparticles in the magnetic media with the magnetic field where the polarization represents information.

The present disclosure also includes a method of writing information to a magnetic storage media that includes reading servo control information from a servo sector located on the magnetic storage media. The servo control information is stored on the magnetic polarization of a plurality of magnetic nanoparticles within the servo sector. The method includes positioning a write-head over the magnetic storage media based on the servo control information and writing information to the magnetic storage media with a magnetic field generator.

The present disclosure also includes a method of reading information from magnetic storage media that includes positioning a read-head over the magnetic storage media. The magnetic storage media includes a plurality of carbon nanotubes that each contains a magnetic nanoparticle. The read-head includes a magnetic force microscopy probe. The method of reading includes detecting a polarization of a magnetic nanoparticle contained within the magnetic storage media. The polarization represents data. The magnetic force microscopy probe then communicates the polarization to a controller.

The present disclosure also includes a method of reading information from magnetic storage media that includes positioning a read-head over a magnetic storage media. The magnetic storage media includes a plurality of carbon nanotubes that each contains a magnetic nanoparticle. The read-head includes a cantilevered nanostructure having a probe end. The method includes deflecting the probe end with a polarization of the magnetic nanoparticle contained within the magnetic storage media. This deflection generates a piezoelectric response in the cantilevered nanostructure. It is then possible to determine the polarization of a magnetic nanoparticle contained within the magnetic storage media by measuring the piezoelectric response of the cantilevered nanostructure.

The present disclosure also includes a magnetic storage media that includes a plurality of data sectors. Each of these data sectors includes first carbon nanotubes that each contains a first magnetic nanoparticle. The magnetic storage media also includes a plurality of servo sectors. Each of these servo sectors includes second carbon nanotubes that each contains a second magnetic nanoparticle. The first and second magnetic nanoparticles have a different coercivity.

The present disclosure also includes a magnetic storage media configured to store information with a plurality of carbon nanotubes that each contains a magnetic nanoparticle. The information is represented by a polarization of each of the magnetic nanoparticles. Each of the magnetic nanoparticles is held in a static position within each of the carbon nanotubes by friction.

The present disclosure also includes a write-head for magnetic storage media. The write-head includes a carbon nanotube containing a magnetic nanoparticle and a nano-wire coiled around the carbon nanotube. An electrical current within the nano-wire generates a magnetic field within the carbon nanotube containing the magnetic nanoparticle.

The present disclosure also includes a write-head for magnetic storage media that includes a Helmholtz coil. The Helmholtz coil includes first and second carbon nanotubes. Each of the nanotubes is wrapped with a nano-wire. Passing an electric current through each nano-wire generates a magnetic field through said Helmholtz coil.

The present disclosure also includes a read-head for magnetic storage media that includes a magnetic force microscopy probe configured to detect the polarization of a magnetic nanoparticle contained within a carbon nanotube that is encapsulated within a data layer.

The present disclosure also includes a read-head for magnetic storage media that includes a cantilevered carbon nanotube structure having a probe tip. A magnetic nanoparticle contained within the probe tip is configured to interact with the magnetization of magnetic nanoparticles contained within carbon nanotubes encapsulated within a magnetic storage media. The probe tip is deflected in response to the polarization of the magnetic storage media causing a change in the conductivity of the cantilevered carbon nanotube structure from which information stored on the magnetic storage media can be read.

The present disclosure also includes a magnetic storage media that includes a carbon nanotube and a first magnetic nanoparticle configured to store binary information through polarization. The first magnetic nanoparticle is contained within the carbon nanotube. The media also includes a second magnetic nanoparticle configured to store binary information through polarization. The second magnetic nanoparticle is also contained within the carbon nanotube. The media further includes a non-magnetic nanoparticle that is contained within the carbon nanotube between the first and second magnetic nanoparticles.

The present disclosure also includes a method of writing servo control information to magnetic storage media. The method includes positioning magnetic storage media within a bulk magnetic field. The magnetic storage media includes a plurality of carbon nanotubes each containing a magnetic nanoparticle. The carbon nanotubes are encapsulated within a matrix. The method further includes permanently magnetically polarizing first magnetic nanoparticles with the bulk magnetic field. The first magnetic nanoparticles are contained within carbon nanotubes located within a servo sector. The magnetic polarization represents servo control information.

The present disclosure also includes a method for manufacturing magnetic storage media that includes heating a magnetic nanoparticle above its respective Curie temperature to demagnetize the magnetic nanoparticle, cooling the magnetic nanoparticle and inserting the magnetic nanoparticle into a carbon nanotube.

The present disclosure also includes a rotational marker on a magnetic storage disk. The magnetic storage disk has a center and an outer edge. The rotational marker includes a plurality of carbon nanotubes and a plurality of magnetic nanoparticles located within each of the carbon nanotubes. Each of the carbon nanotubes extend horizontally within a plane of the magnetic storage disk between the center and the outer edge of the magnetic storage disk.

The present disclosure also includes grey code that includes a carbon nanotube containing magnetic nanoparticles magnetically polarized in a uniform direction to signify a first digital state, and a non-magnetic nanostructure having no magnetic polarization to signify a second digital state.

The present disclosure also includes a servo sector that includes grey code and fine positioning information. The grey code includes a carbon nanotube containing magnetic nanoparticles magnetically polarized in a uniform direction to signify a first digital state, and a non-magnetic nanostructure having no magnetic polarization to signify a second digital state. The fine positioning information is configured to indicate where a read/write head should be optimally positioned over a data track. The fine positioning information includes a patterned array of magnetic nanoparticles that are magnetically polarized.

The present disclosure also includes a data sector that includes a data header marker formed of a first carbon nanotube containing permanently magnetized magnetic nanoparticles interlaced with non-magnetic nanoparticles. The data sector further includes a data header identifier comprised of rewritable magnetic nanoparticles positioned adjacent to the permanently magnetized nanoparticles within the first carbon nanotube. The data sector also includes a data block comprised of rewritable magnetic nanoparticles positioned adjacent to the data header within the first carbon nanotube. In addition, the data sector includes error correction code positioned adjacent to said data block within said first carbon nanotube. The error correction code may include magnetic nanoparticles.

The present disclosure also includes a positioning nanostructure for fine-positioning a read/write head over a data track on magnetic media. The positioning nanostructure includes an array of parallel carbon nanotubes positioned perpendicular or at a gently curving arc relative to a direction of movement of the magnetic media. The array of parallel carbon nanotubes includes a patterned array of magnetic nanoparticles. The patterned array of magnetic nanoparticles informs a controller as to whether the read/write head is optimally positioned over a data track, or if it is positioned too high or too low.

The present disclosure also includes a method for positioning a read/write head over a data track of a magnetic storage medium. The method includes passing a read/write head over a first carbon nanotube containing first magnetically polarized magnetic nanoparticles and non-magnetic nanoparticles. The method further includes detecting whether there are any first magnetically polarized magnetic nanoparticles under the read/write head. The method also includes passing a read/write head over a second carbon nanotube containing second magnetically polarized magnetic nanoparticles and non-magnetic nanoparticles. The method still further includes detecting whether there are any second magnetically polarized magnetic nanoparticles under the read/write head. In addition, the method includes directing the read/write head to remain in position over a data track with a controller if the read/write head detected both the first and second magnetically polarized magnetic nanoparticles. Also, the method includes directing the read/write head to change position over the data track with a controller if the read/write head does not detect both the first and second magnetically polarized magnetic nanoparticles.

The use of magnetic nanoparticles to store information facilitates a vast increase in the storage density capability of magnetic storage media. Encapsulation of these magnetic nanoparticles within carbon nanotubes allows for the organization of the magnetic nanoparticles into tracks and sectors of information storage media that a read/write head of a storage device can store information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 depicts an isometric view of magnetic nanoparticles encapsulated within carbon nanotubes;

FIG. 2 depicts an isometric view of shunt nanoparticles encapsulated within a shunt carbon nanotubes;

FIG. 3 depicts a cross section of a nano-scale magnetic medium having magnetic and shunt nanoparticles encapsulated within respective carbon nanotubes that are on a substrate;

FIG. 4 depicts a view of an arrangement of carbon nanotube data storage tracks on a magnetic tape;

FIG. 5 depicts a view of an arrangement of carbon nanotube data storage tracks on a disk;

FIG. 6 illustrates the magnetically enhanced cure of magnetic tape to assist in the orientation of carbon nanotubes that encapsulate magnetic nanoparticles;

FIG. 7 illustrates the magnetically enhanced cure of a magnetic disk to assist in the orientation of carbon nanotubes that encapsulate magnetic nanoparticles;

FIG. 8 illustrates a magnetic tape having carbon nanotubes in various orientations within a data track;

FIG. 9 illustrates a magnetic disk having carbon nanotubes in various orientations within an annular data track;

FIG. 10 illustrates a magnetic disk having carbon nanotubes in various orientations within a spiral data track;

FIG. 11 illustrates a flow chart for manufacturing a magnetic disk having carbon nanotubes;

FIG. 12 illustrates a cross-sectional flow diagram for manufacturing a magnetic disk having carbon nanotubes;

FIG. 13 illustrates a flow chart for manufacturing a data recording layer;

FIG. 14 illustrates formation of a data recording layer;

FIG. 15 illustrates a flow chart for manufacturing a magnetic disk having carbon nanotubes;

FIG. 16 illustrates a cross-sectional flow diagram for manufacturing a magnetic disk having carbon nanotubes;

FIG. 17 illustrates a flow chart for manufacturing a magnetic tape or a flexible magnetic disk having carbon nanotubes;

FIG. 18 illustrates a cross-sectional flow diagram for manufacturing a magnetic tape or a flexible magnetic disk having carbon nanotubes;

FIG. 37 illustrates a process flow diagram depicting a method for fine positioning of a read/write head over a data track.

DETAILED DESCRIPTION

Figure 19A:
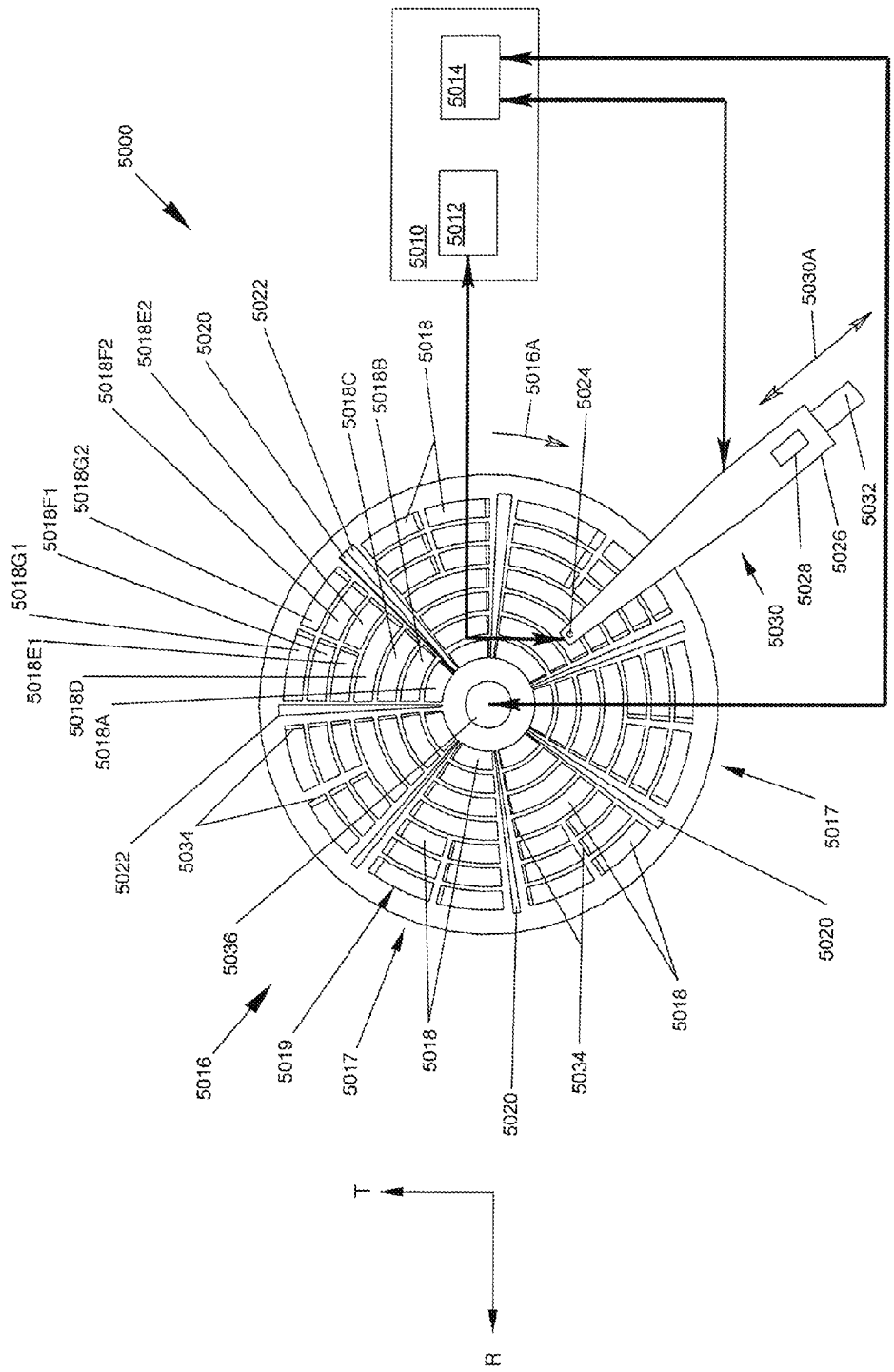
FIGS. 19A, 19B and 19C illustrate a Hard Disk Drive (HDD) including a hard disk, a read/write head mounted to a servo-controlled arm and a controller.

FIG. 1 shows magnetic carbon nanotube assembly 100 comprising carbon nanotube 101. Carbon nanotube 101 is illustrated as a single-wall hollow tube formed of a single layer of carbon atoms in either hexagonal lattice pattern 102 or 112 (FIG. 2). Since carbon nanotube 101 is hollow, it can contain nanoparticles 103 and 104. Carbon nanoparticle 103 has a high magnetic coercivity so that it can permanently retain a first magnetic field until that field is changed to a second magnetic field. Also, nanoparticle 103 is a particle which preferably does not oxidize or rust on ambient air, such as $CrO_2$ (chromium dioxide). Such oxidation would cause the loss of the stored magnetic field. Nanoparticle 104 also has a high magnetic coercivity, so that it can permanently retain a first magnetic field until that field is changed to a second magnetic field. Nanoparticle 104 contains high coercivity core 105 which holds the permanent magnetic field. To prevent oxidation, core 105 is encapsulated in shell 106. An example of core 105 is pure Fe (iron) and shell 106 is iron oxide, such as $Fe_2O_3$, which can be formed for example by chemical vapor deposition (CVD) or atomic layer deposition (ALD). Another example of shell 106 is aluminum oxide, $Al_2O_3$, commonly referred to as alumina, which can be formed for example by chemical vapor deposition (CVD). Another example of shell 106 is a diamond-like film coating. Amorphous (a-C) and hydrogenated amorphous carbon (a-C:H) diamond-like films have high hardness, low friction, electrical insulation, chemical inertness, optical transparency, biological compatibility, ability to absorb photons selectively, smoothness, and resistance to wear. Several methods have been developed for producing diamond-like carbon films: primary ion beam deposition of carbon ions (IBD); sputter deposition of carbon with or without bombardment by an intense flux of ions (physical vapor deposition or PVD); and deposition from an RF plasma, sustained in hydrocarbon gases, onto substrates negatively biased (plasma assisted chemical vapour deposition or PACVD). Silicon and Silicon Oxide, Si and $SiO_2$, or any oxide, may also be used for shell 106, which can be formed for example by chemical vapor deposition (CVD). Carbon nanotube 101 may contain a single nanoparticle 103 or 104. Alternatively, carbon nanotube 101 may contain multiple nanoparticles 103 or 104 and in any combination thereof.

FIG. 2 shows shunt carbon nanotube assembly 110 comprising carbon nanotube 111. Like carbon nanotube 101, carbon nanotube 111 is illustrated as a single-wall hollow tube preferably formed of a single layer of carbon atoms in either hexagonal lattice pattern 112 or 102 (FIG. 1). Hexagonal lattice 112 is rotated ninety degrees from hexagonal lattice 102 and suitable nanotubes comprising either lattice can be used. Since carbon nanotube 111 is hollow, it can contain nanoparticles 113 and 114. Carbon nanoparticle 113 has a low or zero magnetic coercivity so that it does not permanently retain a first magnetic field, which allows nanoparticle 113 to act as a magnetic shunt. Also, nanoparticle 113 is a particle which does not oxide or rust in ambient air, such as a soft-ferrite. Nanoparticle 114 also has low or zero coercivity, so that it does not permanently retain a first magnetic field. Nanoparticle 114 contains low or zero coercivity core 115 which provides the desired magnetic shunt. To prevent oxidation, core 115 is encapsulated in shell 116. An exemplary material for nanoparticle 114 is a soft-ferrite. Soft-ferrites, like other shunt materials, duct magnetic flux without retaining any "after field." An example of shell 116 is iron oxide, such as $Fe_2O_3$, which can be formed for example by chemical vapor deposition (CVD) or atomic layer deposition (ALD). Another example of shell 116 is aluminum oxide, $Al_2O_3$, commonly referred to as alumina, which can be formed for example by chemical vapor deposition (CVD). Another example of shell 116 is a diamond-like film coating. Amorphous (a-C) and hydrogenated amorphous carbon (a-C:H) diamond-like films have high hardness, low friction, electrical insulation, chemical inertness, optical transparency, biological compatibility, ability to absorb photons selectively, smoothness, and resistance to wear. Several methods have been developed for producing diamond-like carbon films: primary ion beam deposition of carbon ions (IBD); sputter deposition of carbon with or without bombardment by an intense flux of ions (physical vapor deposition or PVD); and deposition from an RF plasma, sustained in hydrocarbon gases, onto substrates negatively biased (plasma assisted chemical vapour deposition or PACVD). Silicon and Silicon Oxide, Si and $SiO_2$, may also be used for shell 116, which can be formed for example by chemical vapor deposition (CVD). Carbon nanotube 111 may contain a single nanoparticle 113 or 114. Alternatively, carbon nanotube 111 may contain multiple nanoparticles 113 or 114 and in any combination thereof.

FIGS. 1-2 show Z axis along the length of nanotubes 101 and 111. Nanotubes 101 and 111 can either be Single-Walled carbon NanoTubes (SWNT) or Multi-Walled carbon NanoTubes (MWNT). MWNT's may be formed with 2, 3, or more layers. The diameter D of nanotubes 101 and 111 is measured in nanometers. The diameter of the nanotubes, up to 12 nm, limits the size of nanoparticles 103-104 and 113-114. In addition to those materials already mentioned, exemplary materials for magnetic nanoparticles 103-104 or 113-114 include Cobalt (Co), Cobalt (Co) and their alloys, Cobalt-ferrite, Cobalt-nitride, Cobalt-oxide (Co—O), Cobalt-palladium (Co—Pd), Cobalt-platinum (Co—Pt), Iron (Fe), Iron (Fe) and their alloys, Iron-Gold (Fe—Au), Iron-Chromium (Fe—Cr), Iron-nitride (Fe—N), Iron-oxide ($Fe_3O_4$), Iron-palladium (Fe—Pd), Iron-platinum (Fe—Pt), Fe—Zr—Nb—B, Mn-nitride (Mn—N), Nd—Fe—B, Nd—Fe—B—Nb—Cu, Nickel (Ni), Nickel (Ni) and their alloys, and soft-ferrite. These magnetic nanoparticles can be manufactured with sizes of 10 nm or less, such that these nanoparticles can fit within nanotubes 101 and 111. Examples of soft-ferrites include Mn—Zn, single crystal Mn—Zn, and Ni—Zn.

FIG. 3 shows magnetic storage medium 200. The T axis is along the thickness direction of magnetic storage medium 200. If magnetic medium 200 is magnetic tape, then the L axis is along the length of the tape and the W axis is along the width of the tape. Magnetic storage medium 200 comprises substrate 201, data recording layer 202, and optional shunt layer 203 in between substrate 210 and data recording layer 202. For magnetic tape and floppy disks, substrate 201 is typically polytetrafluoroethelyne (PTFE), which is commonly known by the trade name MYLAR™. For hard disks, substrate 201 can be aluminum, glass, or a stiff plastic, such as polycarbonate.

Data recording layer 202 comprises a plurality magnetic carbon nanotube assemblies 100 which are embedded in a polymer matrix, such as HDPE 230 (High Density Poly Ethylene). Alternately, nanotube assemblies 100 are first encapsulated in HDPE and then embedded in a second polymeric matrix. Nanotubes 100 provide a home for nanoparticles 103-104 so they do not clump into large masses within the data recording layer. Nanotubes 100 may be infused into matrix 230 while matrix 230 is in a liquid form. Matrix 230 may be then coated on to substrate 201 to form data layer 202. As described in FIGS. 6-10, a magnet 601 may be used to orient nanotubes 100 within matrix 230 with respect to substrate 201. Once nanotubes 100 have been moved into a desired orientation by a magnetic field, matrix 230 may then be cured, thereby making the orientation of nanotubes permanent.

Shunt layer 203 comprises a plurality magnetic carbon nanotube assemblies 110 which are embedded in a matrix comprising HDPE 231. Alternately, nanotube assemblies 110 are first encapsulated in HDPE and then embedded in a second polymeric matrix. Nanotubes 110 provide a home for the shunt nanoparticles 113-114, so they do not clump into large masses within the shunt layer. Use of shunt layer 203 is optional, but it yields improved data recording when included in magnetic storage medium 200. Nanotubes 110 may be infused into shunt matrix 231 while shunt matrix 231 is in a liquid form. Matrix 231 may be then coated on to substrate 201 to form shunt layer 203. As described in FIGS. 6-10, a magnet 601 may be used to orient nanotubes 110 within shunt matrix 231 with respect to substrate 201. Once nanotubes 100 have been moved into a desired orientation by a magnetic field, shunt matrix 231 may then be cured, thereby making the orientation of nanotubes permanent.

Magnetic recording head 210 comprises write element 212 mounted on a soft ferrite matrix 211. Write element 212 is essentially a U-shaped piece of low coercivity material and a wire coil, which forms an electro-magnet. That portion of write element 212 adjacent to magnetic storage medium 200 is open, to allow magnetic flux 213 to leave recording head 210 and penetrate magnetic storage medium 200 and imprint data in the form of 1's and 0's based on the magnetic polarity of flux 213. Shunt layer 203 completes the magnetic circuit (analogous to completing an electrical circuit) and keeps flux 213 from "fringing" excessively. Shunt layer 203 permits more crisp edge transitions, thus permitting higher data densities on magnetic storage medium 200. Thus, data is stored in layer 202 with the assistance of shunt layer 203. Similarly, shunt layer 203 can assist in the reading of data. Write element 212 may further comprise a Metal-In-Gap (MIG) write head. Carbon nanotube assemblies 100 and 110 are positioned generally parallel to a top surface of substrate 201 and have a region of matrix material positioned between substrate 201 and carbon nanotube assemblies 100 and 110, as shown in FIG. 3 with respect to axis W.

Data is read from magnetic storage medium 200, by means of a non-limiting example, via a magnetoresistive head, a spin-valve head which is alternately knows as a giant magnetoresistive "GMR" head, or a tunnel magnetoresistive "TMR" head.

The process for forming magnetic storage medium 200 is to first apply shunt layer 203 onto substrate 201. This may be done as a thin monolayer of nanotubes by running magnetic tape through a solution of HDPE 231 containing nanotubes 110. This may also be done as a thin monolayer of nanotubes 100 by spin coating a solution of HDPE 231 containing nanotubes 100 onto a magnetic disk. Multiple shunt monolayers can be layered on top of the first monolayer forming shunt layer 203 through repeating this process. To maximize dispersal of nanotubes 100 and 110, ethylene or another material that disperses carbon nanotubes may be used.

Once shunt layer 203 is cured, which may include supplemental heating or compression by rollers, data recording layer 202 is then added. This may be done as a thin monolayer of nanotubes by running magnetic tape through a solution of HDPE 230 containing nanotubes 100, and then curing the data layer 202. This may also be done as a thin monolayer of nanotubes 100 by spin coating a solution of HDPE 230 containing nanotubes 100 onto a disk, and then curing the data layer. Multiple data recording monolayers can be layered on top of the first monolayer forming data layer 202 through repeating this process. To maximize dispersal of nanotubes 100 and 110, ethylene another material that disperses carbon nanotubes may be used. Nanotubes 100 and 110 may be coated with an initial shell of HDPE before being added to HDPE 230 and 231. Nanotube assemblies 100 and 110 are oriented generally parallel to a top surface of substrate 201.

FIG. 4 shows magnetic tape media 300 comprising substrate 301, magnetic data-recording layer 202, and shunt layer 203. The L axis is along the length of tape 300, the W axis is along the width of the tape, and the T axis is along the thickness of the tape. Tape media 300 has substrate 301 typically formed of polytetrafluoroethelyne (PTFE), which is commonly known by the trade name MYLAR™. Shunt layer 203 is formed on substrate 301. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticles 103 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed that field is changed to a second magnetic field, allowing for data storage. Carbon nanotubes 101 and 111 are oriented such that they are generally parallel to the length wise direction tape media 300. Data tracks 303 are shown, from magnetic flux transitions recorded by magnetic head 210 in magnetic data-recording layer 202.

FIG. 5 shows magnetic disk 400 with monolayer rings 404 of layer 202 and 203 formed in layers about the center 406 of disk 400. These layers may be further masked into individual rings 404. Rings 404 may be formed as distinct rings on disk 400 to form independent tracks. If disk 400 is a hard disk, substrate 402 can be aluminum, glass, or a stiff plastic, such as polycarbonate. If disk 400 is a floppy disk, substrate 402 is typically polytetrafluoroethelyne (PTFE), which is commonly known by the trade name MYLAR™. Z is the direction perpendicular to the disk and the R axis is the radial direction. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticle 113 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed that field is changed to a second magnetic field, allowing for data storage. Carbon nanotubes 101 and 111 may be oriented such that they extend radially from the center of disk 400. Alternatively, carbon nanotubes 101 and 111 may be oriented such that they extend in a spiral pattern from the center of the disk 400.

One method of forming rings 404 is through a photo-etching process. Layers 202 and 203 are first deposited onto disk 400 preferably through a spin coating process. A layer of photoresist material is then deposited on top of layers 202 and 203. This layer of photoresist is exposed through a mask, thereby patterning layers 202 and 203. A removal process leaves the patterned layers 202 and 203. While shown as rings 404, layers 202 and 203 may be patterned into any desirable track or sector pattern for data storage. Alternatively, when disk 400 is made of polycarbonate, rings 404 could be formed through a molding process. A top surface of data recording layer 202 may further comprise buckyballs 299, which would act to reduce friction between the recording layer 202 and the magnetic head 210.

FIG. 6 illustrates the magnetically enhanced cure of magnetic tape to assist in the orientation of carbon nanotubes that encapsulate magnetic nanoparticles. FIG. 7 illustrates the magnetically enhanced cure of a magnetic disk to assist in the orientation of carbon nanotubes that encapsulate magnetic nanoparticles. By use of magnet 601, a constant magnetic field is applied to the magnetic tape 300 and disk 400 to assist with the proper orientation of the nanotube assemblies 100 while tape 300 and disk 400 is cured (polymer matrix 230 containing nanotube assemblies 100 and 110 adheres to the substrate 201 and 301). Nanotube assemblies 100 are free to move within polymer matrix 230 prior to the curing of polymer matrix 230 as polymer matrix 230 is in a liquid, gel, or powdered state when initially applied to substrate 301 or 402. Matrix 231 may also be applied in a liquid, get, or powdered state. When nanotube assemblies 100 are free to move within polymer matrix 230, magnet 601 is able to assist in the orientation of nanotube assemblies 100 with respect to magnetic tape 300 or disk 400 by applying a magnetic field that acts upon nanotube assemblies 100. Note that within a preferred embodiment, nanotube assemblies 100 are only present within data tracks 303 and 404. In this preferred embodiment, the space between data tracks 303 and 404 is preferably void of any nanotube assemblies 100. Magnet 601 is merely drawn in FIGS. 6 and 7 as being exemplary of the application of magnetism relative to magnetic tape 300 or disk 400. Specific magnet configurations that can create suitable field lines to properly orient carbon nanotubes 101 as shown in FIGS. 8, 9 and 10 are well known and exist in many varieties, and for example are disclosed in the publication authored by Oleg D. Jefimenko, Electricity and Magnetism: An Introduction to the Theory of Electric and Magnetic Fields, second edition, (ISBN 0-917406-08-7), which is hereby incorporated by reference. Nanotube assemblies 100 preferably contain more than one nanoparticle 103/104 so that magnet 601 can magnetically align nanotubes 101.

By applying the magnetic field, magnet 601 is able to orient nanotube assemblies 100 into a generally uniform orientation with respect to substrates 301 or 402. For example, magnet 601 may be manipulated with respect to magnetic tape 300 to orient nanotube assemblies 100 parallel to the lengthwise axis of each data track. Alternatively, magnet 601 may be manipulated with respect to magnetic tape 300 to orient nanotube assemblies 100 perpendicular to the lengthwise axis of each data track. Magnet 601 may be manipulated with respect to disk 400 to orient nanotube assemblies 100 radially with respect to the center of disk 400. Alternatively, magnet 601 may be manipulated with respect to disk 400 to orient nanotube assemblies 100 parallel to the direction of data rings 404 such that each nanotube is generally perpendicular the radial axis of disk 400. Please note that these orientations shown in this Figure are merely exemplary and any alignment of nanotubes is conceived. Magnet 601, which may be either a permanent magnet or an electromagnet, exerts a constant magnetic field on tape 300 and disk 400 as the polymer matrix cures. If magnet 601 is a permanent magnet, it may be made out of magnetized soft iron. If magnet 601 is an electromagnet, then a electrical coil (not shown) is wound around the ferrite body of magnet 601 and when a DC current flows through this electrical coil, a magnetic field is created.

FIG. 8 illustrates a magnetic tape 300 having carbon nanotubes 101 in various orientations within a data track 303. Magnet 601 can align carbon nanotubes 101 to an orientation 305 in which the longitudinal axis of carbon nanotubes 101 is parallel to the lengthwise axis of data track 303. Alternatively, magnet 601 can align carbon nanotubes 101 to an orientation 306 in which the longitudinal axis of carbon nanotubes 101 is rotated 45 degrees with respect to the lengthwise axis of data track 303. In addition, magnet 601 can align carbon nanotubes 101 to an orientation 307 in which the longitudinal axis of carbon nanotubes 101 is perpendicular to the lengthwise axis of data track 303. The areas 304 between each data track 303 may, in a preferred embodiment, be void of any carbon nanotubes 101. In a preferred embodiment, shunt layer 203 is not present in areas 304. A pair of parallel plates in a configuration like a capacitor could generate a magnetic field between the plates having linear magnetic field lines that could create a magnetic field that would orient nanotubes 101 in the manner shown in orientations 305, 306, or 307. For example, having data tracks 303 run parallel to the magnetic field lines would create the orientation 305. Rotating data tracks 303 by 45 degrees with respect to the magnetic field lines would create the orientation 306. Positioning the data tracks 303 to run perpendicular to the magnetic field lines would create the orientation 307. Please note that these magnet 601 and magnetic tape 300 orientations are based upon the carbon nanotubes orienting themselves parallel to the magnetic field lines. Also, please note that these orientations shown in this Figure are merely exemplary and any alignment of nanotubes is conceived.

FIG. 9 illustrates a magnetic disk 400 having carbon nanotubes 101 in various orientations within an annular data track 404. Magnet 601 can align carbon nanotubes 101 to an orientation 410 in which the longitudinal axis of carbon nanotubes 101 is parallel to a tangent of annular data track 404. For example, an isolated uniformly charged sphere or rod placed at the center 406 of disk 400 would create magnetic field lines that would orient nanotubes 101 in the manner shown in orientation 410. Alternatively, magnet 601 can align carbon nanotubes 101 to an orientation 412 in which the longitudinal axis of carbon nanotubes 101 is rotated 45 degrees with respect to a radial axis of disk 400. In addition, magnet 601 can align carbon nanotubes 101 to an orientation 408 in which the longitudinal axis of carbon nanotubes 101 is aligned to a radial axis of disk 400. For example, a uniformly charged rod extending through center 406 with a uniformly charged cylinder surrounding disk 400 could create a magnetic field that would orient nanotubes 101 in the manner shown in orientation 408. Alternatively, placing a uniformly charged sphere at the center 406 and surrounding disk 400 with another uniformly charged sphere could create magnetic field lines that would orient nanotubes 101 in the manner shown in orientation 408. The areas 407 between each data track 404 may, in a preferred embodiment, be void of any carbon nanotubes 101. In a preferred embodiment, layer 202 is present only in data tracks 404. However, carbon nanotubes 111 may still be present within areas 407. In a preferred embodiment, shunt layer 203 is not present in areas 407. Alternatively, shunt layer 203 may extend partially into areas 407 on either side of data track 404 to prevent fringing at the boundaries of data track 404. Please note that these orientations shown in this Figure are merely exemplary and any alignment of nanotubes is conceived.

FIG. 10 illustrates a magnetic disk 400 having carbon nanotubes 101 in various orientations within a spiral data track 414. Magnet 601 can align carbon nanotubes 101 to an orientation 420 in which the longitudinal axis of carbon nanotubes 101 is parallel to a tangent of spiral data track 414. Alternatively, magnet 601 can align carbon nanotubes 101 to an orientation 418 in which the longitudinal axis of carbon nanotubes 101 is rotated 45 degrees with respect to a tangent of spiral data track 414. In addition, magnet 601 can align carbon nanotubes 101 to an orientation 422 in which the longitudinal axis of carbon nanotubes 101 is perpendicular to a tangent of spiral data track 414. The areas 416 between each data track 414 may, in a preferred embodiment, be void of any carbon nanotubes 101. In a preferred embodiment, layer 202 is present only in data tracks 414. Preferably, shunt layer 203 is not be present in areas 416 or shunt layer 203 may extend partially into areas 416 on either side of data track 414 to prevent fringing at the boundaries of data track 414.

FIG. 11 illustrates a flow chart for manufacturing a magnetic disk 400 having carbon nanotubes 101 and 111. This flow chart begins at START, step 1000. Substrate 402 for magnetic disk 400 is, in one embodiment, a rigid substrate made for example of glass, aluminum, or an aluminum oxide. Substrate 402 is manufactured to have tracks 404 formed in substrate 402 in step 1002. Tracks 404 may be formed, for example, by a stamping process with a glass substrate. Alternatively, for example, tracks 404 may be formed through a photolithography process. Note that for FIGS. 11-16, tracks 414 may be substituted for tracks 404. Once tracks 404 are formed, shunt matrix 231 containing shunt nanotube assemblies 110 are deposited into tracks 404 to form layer 203 in step 1004. Shunt matrix 231 may be in liquid, gel, or powered form. During the deposition of shunt matrix 231 containing shunt nanotube assemblies 110, substrate 404 may be vibrated to aid shunt matrix 231 with filling tracks 404. Substrate 404 may be vibrated with subsonic, sonic, or ultra-sonic vibrations. While being deposited, shunt matrix 231 is preferably in a liquid state, or may be in a gel, or powdered state. Once shunt matrix 231 is deposited within tracks 404, shunt matrix 231 is cured into a solid state. In step 1006, data recording matrix 230 containing nanotube assemblies 100 is deposited into tracks 404 to form layer 203. Substrate 402 is vibrated with subsonic, sonic, or ultra-sonic vibrations to assist data recording matrix with filling tracks 404. Data recording matrix 230 is preferably in a liquid state when deposited into tracks 404. As shown in FIGS. 13 and 14, a magnetic field created by magnet 602 may be used to draw nanotube assemblies 100 out of a top portion 422 of the deposited data recording matrix 230 and concentrate nanotube assemblies 100 in the lower portion 424 of deposited data recording matrix 230 within track 404. Also, as discussed above, magnet 601 may be used to then align nanotubes 100 with respect to track 404. In addition, vibrating substrate 402 aids magnet 601 with orienting nanotubes 100 with respect to track 404. Once nanotube assemblies 100 are oriented with respect to tracks 404, data recording matrix 230 is cured into a solid state, thereby forming layer 202. In step 1008, layer 202 may be planarized to be flush with the sidewalls formed in substrate 402 that extend on either side of channel 404. Disk 400 may then be optionally compressed. This process then terminates in step 1010.

FIG. 12 illustrates a cross-sectional flow diagram for manufacturing a magnetic disk 400 having carbon nanotubes 101 and 111 in accordance with the process described in FIG. 11. In view A, tracks 404 are formed in substrate 402 as described above in step 1002. Note that tracks 404 form a channel. In view B, shunt layer 203 is deposited within tracks 404 as described above in step 1004. In view C, data recording layer 202 is deposited within tracks 404 as described above in steps 1006 and 1008.

FIG. 13 illustrates a flow chart for manufacturing a data recording layer 202. The manufacturing process begins with step 2000 when liquid data recording layer matrix 230 has been deposited on substrate 402 and within data tracks 404. Data recording matrix 230 may also be applied in powered or gel form. In step 2002, a magnet 602, shown in FIG. 14, creates a magnetic field 428 through track 404 that acts upon nanotube assemblies 100. Magnetic field 428 draws carbon nanotubes 100 along paths 426 from the upper portion 422 of data recording layer matrix 230 down into the lower portion 424 of data recording matrix 230 within track 404, thereby creating an increased concentration of nanotubes 100 within track 404. In step 2004, substrate 402 is then vibrated to aid the data recording layer matrix 230 with filling track 404. In addition, vibrating substrate 402 aids magnet 601 with orienting nanotubes 100 with respect to track 404. Once nanotubes 100 are in the proper orientation, data recording matrix 230 is cured into a solid state, step 2006, thereby forming layer 202. In step 2008, data recording layer 202 may be planarized to be flush with the sidewalls formed in substrate 402 that extend on either side of channel 404. Disk 400 may then be optionally compressed. This process then terminates in step 2010.

FIG. 14 illustrates an exemplary formation of a data recording layer 202 in accordance with the process described in FIG. 13. Magnet 602, is shown in this exemplary embodiment, to be positioned underneath data track 404. The magnetic field 428 generated by magnet 602 pulls nanotubes 100 down into track 404. Consequently, upper portions 422 of data recording matrix 230 have lower concentrations of nanotubes 100 than lower portion 424 of data recording matrix 230 within track 404 over shunt layer 203. Thus, this process increases the density of carbon nanotubes 100 within track 404 than otherwise existed in data recording matrix 230 when it was deposited.

FIG. 15 illustrates a flow chart for manufacturing a magnetic disk 400 having carbon nanotubes 101 and 111. The process begins in step 3000. A shunt barrier layer 430 is deposited over substrate 402 in step 3002. Shunt barrier layer 430 may be comprised of a shunt matrix 231 material that does not include nanotube assemblies 110. Alternatively, shunt barrier layer 430 may be formed of an oxide, silicon, glass, or other material. Shunt barrier layer 430 is then patterned to form tracks 404 through a photolithographic process, a stamping process, or other process capable of forming channels 404. In step 3004, shunt matrix 231 containing shunt nanotubes 110 is deposited into tracks 404 to form layer 203. Substrate 402 is then vibrated to assist the liquid shunt matrix 231 with filling tracks 404. Shunt matrix 231 is then cured into a solid state to form layer 203. In step 3006, data recording matrix 230 containing nanotubes 100 is deposited into tracks 404 to form layer 202. Substrate 402 is sonically or sub-sonically vibrated to assist the liquid data recording matrix 230 with filling tracks 404. In addition, substrate 402 is then vibrated to assist magnet 601 with orienting nanotubes 100 within tracks 404. Once nanotubes 100 are oriented into a desired position, data recording matrix 230 is cured into a solid state thereby forming layer 202. In step 3008, data recording layer 202 may be planarized to be flush with the sidewalls formed in substrate 402 that extend on either side of channel 404. Disk 400 may then be optionally compressed. This process then terminates in step 3010.

FIG. 16 illustrates a cross-sectional flow diagram for manufacturing a magnetic disk 400 having carbon nanotubes 101 and 111 in accordance with the process described in FIG. 15. In view A, tracks 404 are formed in substrate 402. In view B, shunt layer 203 is deposited within tracks 404. In view C, data recording layer 202 is deposited within tracks 404.

FIG. 17 illustrates a flow chart for manufacturing a magnetic tape 300 or a flexible magnetic disk 400 having carbon nanotubes 101 and 111. The process being with step 4000. In step 4002, shunt matrix 231 containing shunt nanotubes 110 is printed onto substrate 301 or 402 to form tracks 303 or 404. Shunt matrix containing shunt nanotubes 110 may be in a liquid state that is then cured into a solid state to form shunt layer 203, or a powder form that is then baked into a solid state to form shunt layer 203. In step 4004, data recording matrix 230 containing nanotubes 100 is printed on top of shunt layer 203 in tracks 303 or 404. Data recording matrix containing nanotubes 100 may be in a liquid state that is then cured into a solid state to form data recording layer 202, or a powder form that is then baked into a solid state to form data recording layer 202. The process then ends in step 4006.

FIG. 18 illustrates a cross-sectional flow diagram for manufacturing a magnetic tape 300 or a flexible magnetic disk 400 having carbon nanotubes 100 or 101 in accordance with the process described in FIG. 17. In view A, tracks 303 or 404 are formed by printing layer 203 on substrate 301 or 402. In view B, tracks 303 or 404 are further formed by printing layer 202 on top of layer 203. Note that while shown printed on a substrate 301 or 402, ink containing carbon nanotubes 100 having magnetic particles may be printed on any other printable surface and used for applications that include, for example, RFID applications, bar codes, or other printed identifiers. In addition, carbon nanotubes containing magnetic nanoparticles may be infused in a pattern in paper currency to reduce the possibility of counterfeiting.

FIG. 19A illustrates a Hard Disk Drive (HDD) 5000. HDD 5000 is a non-volatile storage device that stores digitally encoded data on a rotating magnetic disk 5016, which is an example of disk 400. Disk 5016 is rotating clockwise in FIG. 19A, as designated by the curved arrow 5016A. A control system 5010 controls the operation of HDD 5000. A spindle motor 5036 supports one or a plurality of magnetic disks 5016. FIG. 19A shows a single disk 5016. However, it is contemplated that multiple disks 5016 may be vertically stacked in a column within HDD 5000. Spindle motor 5036 may operate at a fixed speed or a variable speed as measured in revolutions per minute (RPM). A magnetic read/write head 5024 is mounted to the tip of arm 5030. Magnetic read/write head 5024 reads digital data from and writes digital data to magnetic disk 5016. A base 5026 of arm 5030 is provided with a slot 5028 that is coupled to a piston 5032 that moves armature 5030 along a radial axis of disk 5016, thereby allowing read/write head 5024 to be positioned over any location on magnetic disk 5016 as disk 5016 rotates underneath. Disk 5016 is shown next to coordinate axis T and R which show the tangential and radial axis directions with respect to disk 5016 respectively. Piston 5032 is typically an electromagnet, but could alternately be pneumatic, hydraulic, or electrostatic. Disk 5016 is an example of disk 400.

It is desirable to control the distance between read/write head 5024 and disk 5016 to optimize the ability of read/write head 5024 to write and read magnetic polarities on disk 5016. One method of controlling the distance between read/write head 5024 and disk 5016 is by forming armature 5030 of a piezoelectric ceramic. When armature 5030 is formed of a piezoelectric material, the distance between read/write head 5024 and disk 5016 is controlled by controller 5010 by applying an electric field to the piezoelectric ceramic causing armature 5030 to deform, thereby positioning read/write head 5024 at a desired distance from disk 5016. The piezoelectric effect is reversible in that materials exhibiting the direct piezoelectric effect (the production of an electric potential when stress is applied) also exhibit the reverse piezoelectric effect (the production of stress and/or strain when an electric field is applied). For example, lead zirconate titanate crystals, $(Pb[Zr_xTi_{1-x}]O_3$ $0<x<1)$, more commonly known as PZT, will exhibit a maximum shape change of about 0.1% of the original dimension. Lead zirconate titanate is a common piezoelectric ceramic that may be used for armature 5030. Other piezoelectric ceramic materials include barium titanate ($BaTiO_3$), lead titanate ($PbTiO_3$), potassium niobate ($KNbO_3$), lithium niobate ($LiNbO_3$), lithium tantalate ($LiTaO_3$), sodium tungstate ($Na_2WO_3$), $Ba_2NaNb_5O_5$, and $Pb_2KNb_5O_{15}$.

When spindle motor 5036 rotates disk 5016, disk 5016 may wobble about its central axis. This wobble may be compensated for with control system 5010 by synchronously varying the distance between armature 5030 and disk 5016. One exemplary model of a wobbling disk 5016 that may be used by control system 5010 for controlling piezoelectric armature 5030 to compensate for the wobbling of disk 5016 is given below by Equation 1:

$$Z_{wobble} = H_w * (r/R_o) * \sin(w*t + phi) \qquad \text{EQN. [1]}$$

$H_w$ is the maximum amplitude of the wobble of disk 5016 caused by disk 5016 spinning at an angle offset from the vertical, or another datum angle. $H_w$ is measured at $R_o$. Note $Z_{wobble}$ increases with increasing I/O radius r.

r=radius of where I/O being performed, Rin≤r≤Ro
Ro=Radius of outer track
Phi=phase angle relative to marker radial line (or arc)
w=RPM of disk
t=time Note that w*t is equal to an angle of rotation Theta, which may be substituted for in Equation 1.

It is desirable for disk 5016 to have the configuration of a flat disk. However, it is contemplated that disk 5016 may be partially distorted when manufactured forming, for example, a cone shape. An exemplary model that may be used by controller 5010 for controlling armature 5030 for a cone shaped disk is given below by Equation 2. Note $Z_{cone}$ increases with increasing I/O radius r. $Z_{cone}$ at zero radius is zero because disk 5016 is attached at its center. Therefore the center of disk 5016 becomes the elevation datum.

$$Z_{cone} = -H_c * [r/Ro] \qquad \text{EQN. [2]}$$

$H_c$=Cone height. $H_c$ may be positive for a concave cone or negative for a convex cone. $H_c$=zero for a perfectly flat disk. A third exemplary model that may be used by controller 5030 for controlling armature 5030 that compensates for both wobbling of disk 5016 and a cone-shaped distortion of disk 5016 is given below by Equation 3.

$$Z_{total} = Z_{wobble} + Z_{cone} \qquad \text{EQN. [3]}$$

$Z_{total}$ may be found, for example, by taking several measurements, such as every 45 degrees along disk 5016, and doing a least squares fit. Disk 5016 may include various other positional and structural non-idealities similar to those described above that may be similarly compensated for by other analogous models.

Control system 5010 includes a read/write channel 5012 that controls the operation of read/write head 5024, as depicted by the double-arrowed bi-directional communication line between channel 5012 and read/write head 5024. In addition, channel 5012 communicates data to read/write head 5024 during write operations and receives read data from read/write head 5024 during read operations. Drive circuit 5014 controls the mechanical operation of spindle motor 5036 and the movement of arm 5030 along the radial axis of disk 5016 in order to position read/write head 5024 over disk 5016 to enable read and write operations. Such positioning of read/write head 5024 is sometimes referred to a "seek." In addition, controller 5010 may receive feedback from motor 5036 and piston 5032. Further, controller 5010 may apply an electric field to armature 5030 to cause a piezoelectric material forming armature 5030 to deform in order to optimize the distance between read/write head 5024 and disk 5016.

Disk 5016 includes a data layer 202 as shown in FIG. 3. Disk 5016 may optionally also include a shunt layer 203 and a substrate 201. Data layer 202 faces read/write head 5024 and is organized into a plurality of data sectors 5017. Substrate 201 is furthest from read/write head 5024, and shunt layer 203, if used, is sandwiched between data layer 202 and substrate 201. A data sector 5017 is a portion of disk 5016 defined by two nonequal radii extending from the center of disk 5016, and a corresponding angle, forming what is mathematically defined as a sector of an annulus. Each data sector 5017 may be placed between two servo sectors 5020. Each data sector 5017 includes a plurality of data blocks 5018 that may be organized in concentric circular tracks 5019, and there is an integral number of data blocks 5018 in a circular track 5019. However, data blocks 5018 could be laid out on a single spiral. Disk 5016 is referred to as "banded" as the three outermost tracks 5019 of disk 5016 have 14 data blocks 5018 while the four innermost tracks 5019 of disk 5016 have 7 data blocks 5017. The four innermost tracks 5019 of disk 5016 are referred to as data band 0 because each has seven data blocks, and the three outermost tracks 5019 of disk 5016 are referred to as data band 1 as each has fourteen data blocks. The number of data blocks 5018 and data tracks 5019 and data sectors 5017 shown in FIG. 19A is merely exemplary and is not intended to be limiting. It is contemplated that disk 5016 may include any number or combination of data sectors 5017, data blocks 5018 and data tracks 5019. In addition, the number of servo sectors 5020 shown in FIG. 19A is merely exemplary and non-limiting. It is contemplated that disk 5016 may include any number of servo sectors 5019. Disk 5016 is shown FIG. 19A as being formatted as banded media. The band zero includes one data block 5018 per data sector 5017. Band zero includes the four inner tracks 5019. The first band includes two data blocks 5018 per data sector 5017. The first band includes the three outermost data tracks 5019. FIG. 19A is merely an exemplary implementation of banded media, which may include fewer or greater numbers of data blocks 5018 per each track 5019 and sector 5017. The number of data blocks per revolution is given by Equation 4 below.

$$\text{Number of Data Blocks Per Revolution} = (m+1)*N \quad \text{EQN. [4]}$$

m=data band number
N=number of servo sectors on disk

Each data block 5018 is provided with a data header 5034, which is typically read first before the data in data block 5018 is accessed. Data band zero is further described as the data blocks 5018 in the first, second, third and fourth tracks 5019 nearest the center of disk 5016 that each contain one data block 5018 per data sector 5017. The data block in the first track nearest the center of disk 5016 are labeled 5018A. The data blocks in the second track 5019 are labeled 5018B. The data blocks in the third track 5019 are labeled 5018C. The data blocks in the fourth track 5019 are labeled 5018D. Data band one is further described as the fifth, sixth, and seventh tracks 5019 each have two data blocks 5018 per data sector 5017. The two data blocks in the fifth data track 5019 are labeled 5018E1 and 5018E2. The two data blocks in the sixth data track 5019 are labeled 5018F1 and 5018F2. The two data blocks in the seventh data track 5019 are labeled 5018G1 and 5018G2. Data tracks 5019 are tangentially aligned to disk 5016.

Data sectors 5017 are pie shaped wedges on disk 5016 that are positioned in between servo sectors 5020. Servo sectors 5020 are formed during the manufacture of disk 5016 and remain a permanent part of disk 5016. Servo sectors 5020 include grey code that provides positioning information to controller 5010 to position arm 5030 over disk 5016. Rotational reference marker 5022 is associated with one of the servo sectors 5022 to indicate which servo sector 5020 is the first servo sector 5020. Rotational reference marker 5022 may include grey code. Data headers 5034 include grey code and may also include a sector and track number that identifies each data block 5018.

Data blocks 5018, data headers 5034, servo sectors 5020, and marker 5022 are all formed of arrays of nanotube assemblies 110 that contain magnetic nanoparticles 103 or 104. Disk structures 5018, 5020, 5022, and 5034 may have nanotube assemblies 110 that contain nanoparticles that have differing coercivities unique to the individual disk structure 5018, 5020, 5022, and 5034. Additionally, non-magnetic nanoparticles may be used in any combination with the magnetic nanoparticles forming structures 5018, 5020, 5022, and 5034. In one embodiment of the disclosure, servo sectors 5020 are formed with nanotube assemblies 110 that are filed with nanoparticles 103 or 104 that have a higher coercivity than the nanoparticles forming data blocks 5018. Since servo sectors 5020 are permanent features of disk 5016, it is desirable that they are made of a higher coercivity material. Data blocks 5018 are made of lower coercivity nanoparticles 103 or 104, which are easier to write to with read/write head 5024. It is desirable that marker 5022 be made of nanotube assemblies 110 having nanoparticles 103 or 104 that have a higher coercivity than the nanoparticles 103 or 104 forming data blocks 5018, but a lower coercivity than the nanoparticles forming servo sectors 5020. It is also desirable that data headers 5034 be made of nanotube assemblies 110 having nanoparticles 103 or 104 that have a higher coercivity than the nanoparticles of data blocks 5018, but a lower coercivity than the nanoparticles of maker 5022 or servo sector 5020. It is desirable to utilize nanoparticles 103 or 104 that have different levels of coercivity to form the different structures 5018, 5020, 5022, and 5034 on disk 5016 to enhance the performance of their respective different functions. Alternatively, it is envisioned that all structures 5018, 5020, 5022, and 5034 be made of nanoparticles 103 or 104 that have the same level of coercivity. It is also contemplated that any one or more individual disk structures 5018, 5020, 5022, or 5034 may be made with nanoparticles 103 or 104 having a different coercivity from the other structures 5018, 5020, 5022, or 5034 on disk 5016. For example, servo sectors 5018 may be made of nanoparticles 103 or 104 that have a higher coercivity than data blocks 5018. However, rotational reference marker 5022 may be made of nanoparticles 103 or 104 that have the same coercivity as servo sectors 5020. In addition, data headers 5034 may be made of nanoparticles 103 or 104 that have the same coercivity as data blocks 5018. Any combination of difference of coercivity of nanoparticles is contemplated for each disk structure 5018, 5020, 5022, and 5034. Exemplary and non-limiting ranges of coercivity and materials for each disk structure 5018, 5020, 5022, and 5034 are provided below in Table 1. Rotational reference marker 5022 may be formed of a single nanotube assembly 110 containing nanoparticles having a high coercivity. Alternatively, rotational reference marker 5022 may be formed of multiple nanotube assemblies 110. An exemplary and non-limiting range of coercivities for disk structures 5018, 5020, 5022, and 5034 is provided below in Table 1 for a disk 5016 having an exemplary non-limiting coercitivity range of 0.5 T to 3.0 T, where T is Tesla. Disk 5016 and disk structures 5018, 5020, 5022, and 5034 may have overlapping or non-overlapping ranges of coercivities that exceed those shown in Table 1. Additional exemplary and non-limiting coercivity ranges for disk structures 5018, 5020, 5022, and 5034 are provided below in Tables 2 and 3. The coercivities of exemplary nanoparticles that may be used for disk structures 5018, 5020, 5022, and 5034 are provided below in Table 4.

TABLE 1

First Exemplary Coercivity Ranges for Disk 5016 Structures

| Disk 5016 Structure | Exemplary Coercivity Range (Tesla T) |
|---|---|
| Servo Sector 5020 | 0.300 T-0.225 T |
| Marker 5022 | 0.250 T-0.200 T |
| Data Header 5034 | 0.200 T-0.100 T |
| Data Block 5018 | 0.175 T-0.050 T |

TABLE 2

Second Exemplary Coercivity Ranges for Disk 5016 Structures

| Disk 5016 Structure | Exemplary Coercivity Range (Tesla T) |
|---|---|
| Servo Sector 5020 | 2.25 T-1.50 T |
| Marker 5022 | 2.00 T-1.25 T |
| Data Header 5034 | 1.50 T-0.50 T |
| Data Block 5018 | 0.150 T-0.01 T |

TABLE 3

Third Exemplary Coercivity Ranges for Disk 5016

| Disk 5016 Structure | Exemplary Coercivity Range (Tesla T) |
|---|---|
| Servo Sector 5020 | 0.200 T-0.125 T |
| Marker 5022 | 0.150 T-0.100 T |
| Data Header 5034 | 0.125 T-0.075 T |
| Data Block 5018 | 0.125 T-0.050 T |

TABLE 4

Exemplary Nanoparticles and Their Associated Coercivities

| Material | Coercivity (T) |
|---|---|
| $BaFe_{12}O_{19}$ | 0.36 |
| Alnico IV | 0.07 |
| Alnico V | 0.07 |
| Alcomax I | 0.05 |
| MnBi | 0.37 |
| $Ce(CuCo)_5$ | 0.45 |
| $SmCo_5$ | 1 |
| $Sm_2Co_{17}$ | 0.6 |
| $Nd_2Fe_{14}B$ | 1.2 |
| FePt | 1.0 |
| CoPt | 0.23-2.4 |
| $Co_2FeO_4$ | 0.68-2.2 |
| $Fe_3C$, $Fe_3O_4$, α-Fe | 0.027-0.2 |
| NanoCAP (Disclosed in the publication, which is hereby incorporated by reference in its entirety: (Sasaki, Usuki, Matsuo, and Kishimoto: *Development of NanoCAP (Nano Composite Advanced Particles) Technology for High Density Recording*, Development and Technology Division, Hitachi Maxell, Kyoto, Japan; IEEE Transactions on Magnetics, Vol. 41, No. 10, October 2005, pages 3241-3243) | 0.3 |

Figure 19B:
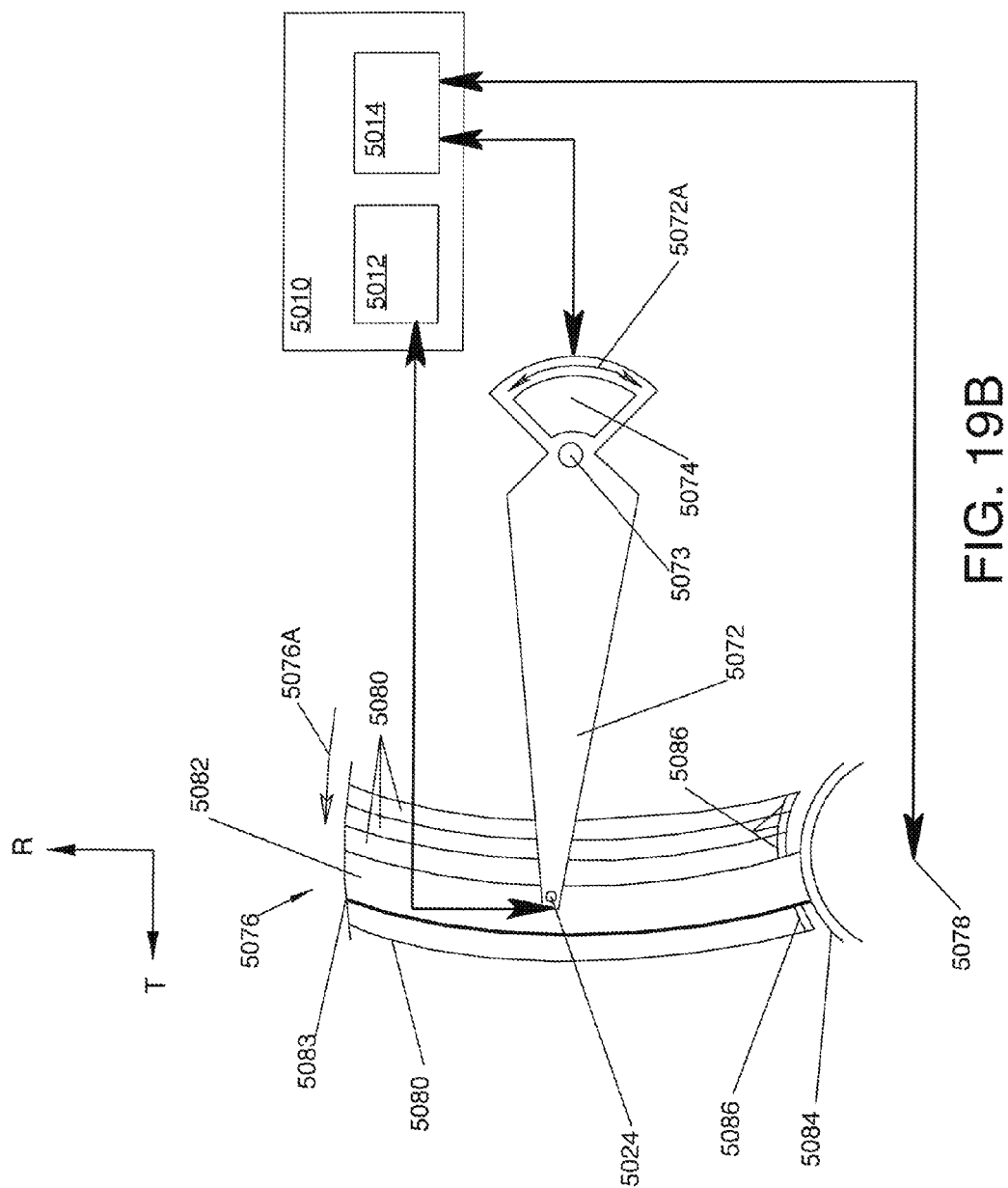

FIG. 19B illustrates a diagram of a magnetic disk 5076 that has data tracks 5080 and servo sector 5082 arranged in a 'gentle-arc' configuration. This 'gentle-arc' configuration is used in combination with a read/write head 5024 which is pivotally mounted relative to pivot 5073. Read/write head 5024 is mounted to arm 5072 that is pivotally attached to a DC electromagnetic motor 5074. The rotation of disk 5076 and pivoting of arm 5072 back and forth along direction 5072A is controlled by drive circuit 5014. A motor for spinning disk 5076 supports disk 5076 at the center 5078 of disk 5076. Read/write channel 5012 controls read/write head 5024 and transmits data to be written to disk 5076 by read/write head 5024, or receives data read from disk 5076. The configuration of the 'gentle-arc' of data tracks 5080 and servo track 5082 matches the arcing path of read/write head 5024 as read/write head 5024 is pivoted on arm 5072 by motor 5074. Data tracks 5080 extend from the inner radius of disk 5076 to the outer radius of disk 5076 in a gentle-arc. Motor 5074 is typically an electromagnet. A spacer region 5084 is provided between the center of disk 5078 and servo sector 5082. Data headers 5086 are provided for identifying each data block 5080. A rotational marker 5083 is provided to identify the first servo sector 5082. Armature 5072 may also be made of a piezoelectric material that is deformed by application of an electric field by controller 5010 in order to control the distance between read/write head 5024 and disk 5076.

As discussed above with respect to disk 5016, servo sectors 5082, marker 5083, data blocks 5080, and data headers 5086 all include nanotube assemblies 110. However, each of these structures 5082, 5083, 5080, and 5086 may include nanotube assemblies 110 that are filled with nanoparticles 103 or 104 that have different coercivities. For example, it is desirable that servo sector 5082 have nanoparticles that have a higher coercivity than the nanoparticles forming data headers 5086 or data blocks 5080. It is also desirable to that data headers 5084 be formed of nanoparticles that have a higher coercivity than the nanoparticles that form data blocks 5080. In addition, it is desirable that marker 5083 have nanoparticles that have a higher coercivity than the nanoparticles forming data header 5086 or data blocks 5080, but that also have a lower coercivity than the nanoparticles forming maker 5083. Exemplary and non-limiting ranges of coercivity and exemplary particles for these structures are given above in Tables 1, 2, and 3. Exemplary nanoparticles are shown above in Table 4. Disk 5076 rotates in direction 5076A.

Figure 19C:
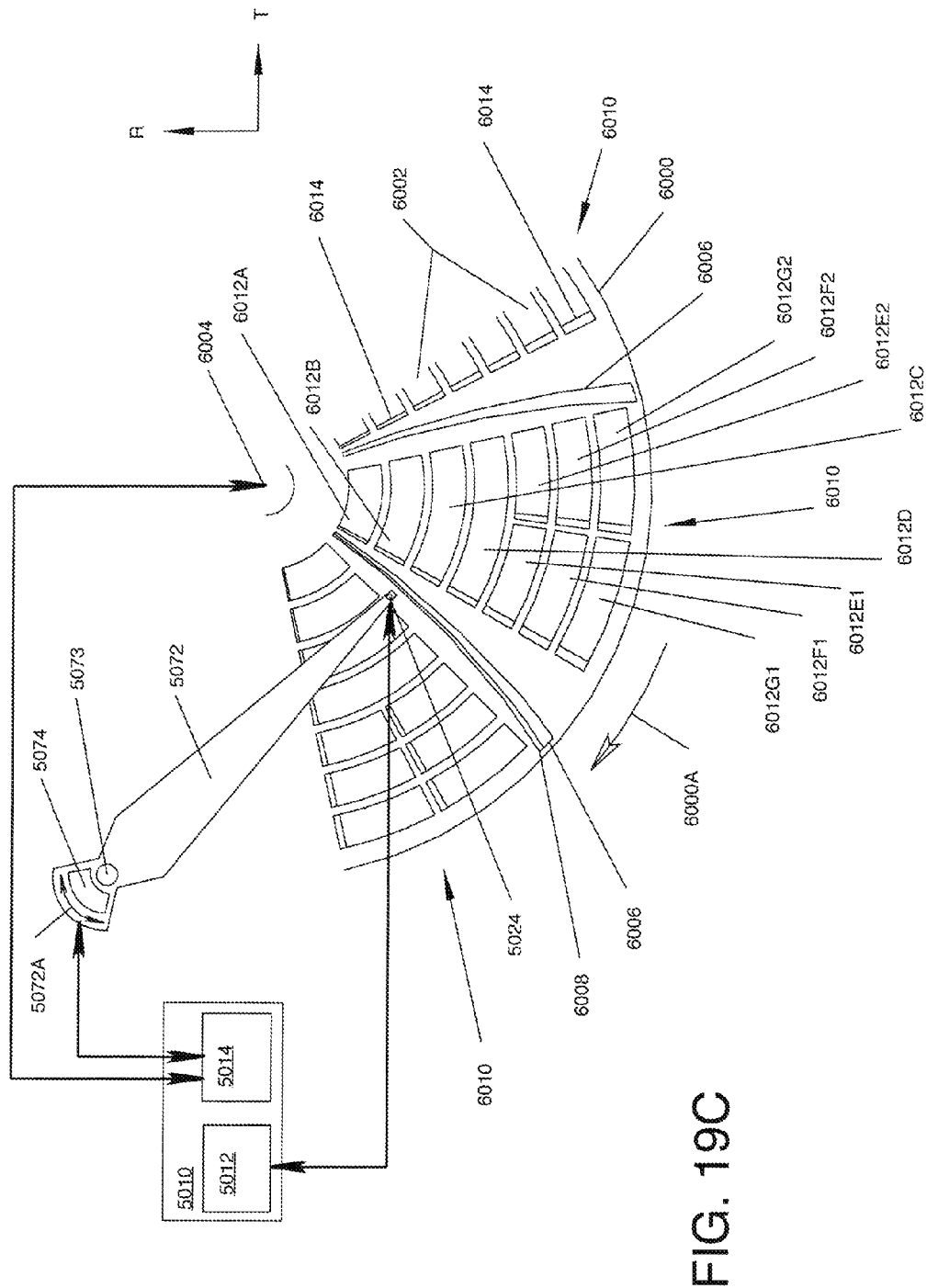

FIG. 19C illustrates a diagram of a magnetic disk 6000 that has data tracks 6002 arranged tangentially about the center 6004 of disk 6000. Disk 6000 also includes servo sectors 6006 that are arranged in a 'gentle-arc' configuration. This 'gentle-arc' configuration is used in combination with a read/write head 5024 which is pivotally mounted relative to pivot 5073. Read/write head 5024 is mounted to arm 5072 that is pivotally attached to a DC electromagnetic motor 5074. The rotation of disk 6000 and pivoting of arm 5072 is controlled by drive circuit 5014. A motor for spinning disk 6000 supports disk 6000 at the center 6004 of disk 6000. Read/write channel 5012 controls read/write head 5024 and transmits data to be written to disk 6000 by read/write head 5024, or receives data read from disk 6000. The configuration of the 'gentle-arc' of servo track 6006 matches the arcing path of read/write head 5024 as read/write head 5024 is pivoted on arm 5072 by motor 5074. The direction of pivot is shown by arrow 5072A. Data tracks 6002 extend tangentially around disk 6000. Motor 5074 is typically an electromagnet. A rotational marker 6008 is provided to identify the first servo sector 6006. Each data track 6002 may include multiple data sectors 6010, as with disk 5016 in FIG. 19A. Each data sector may include one or more data blocks 6012. Data headers 6014 are provided for identifying each data block 6012. Disk 6000 rotates in direction 6000A.

As discussed above with respect to disk 5016, servo sectors 6006, marker 6008, data blocks 6012 and data headers 6014 all include nanotube assemblies 110. However, each of these structures 6006, 6008, 6012, and 6014 may include nanotube assemblies 110 that are filled with nanoparticles 103 or 104 that have different coercivities. For example, it is desirable that servo sector 6006 have nanoparticles that have a higher coercivity than the nanoparticles forming data headers 6014 or data blocks 6012. It is also desirable to that data headers 6014 be formed of nanoparticles that have a higher coercivity than the nanoparticles that form data blocks 6012. In addition, it is desirable that marker 6008 have nanoparticles that have a higher coercivity than the nanoparticles forming data header 6014 or data blocks 6012, but that also have a lower coercivity than the nanoparticles forming maker 6008. Exemplary and non-limiting ranges of coercivity and exemplary particles for these structures are given above in Tables 1, 2, and 3. Exemplary nanoparticles are shown in Table 4.

Each data block 6012 is provided with a data header 6014, which is typically read first before the data in data block 6012 is accessed. Data band zero is described as the data blocks 6012 in the first, second, third and fourth tracks 6002 nearest the center of disk 6000 that each have one data block 6012 per data sector 6010. The data block in the first track nearest the center 6004 of disk 6000 are labeled 6012A. The data blocks in the second track 6002 are labeled 6012B. The data blocks in the third track 6002 are labeled 6012C. The data blocks in the fourth track 6002 are labeled 6012D. Data band one is further described as the fifth, sixth, and seventh tracks 6002 that each have two data blocks 6012 per data sector 6010. The two data blocks in the fifth data track 6002 are labeled 6012E1 and 6012E2. The two data blocks in the sixth data track 6002 are labeled 6012F1 and 6012F2. The two data blocks in the seventh data track 6002 are labeled 6012G1 and 6012G2. Data tracks 6002 are tangentially aligned to disk 6000.

Figure 20:
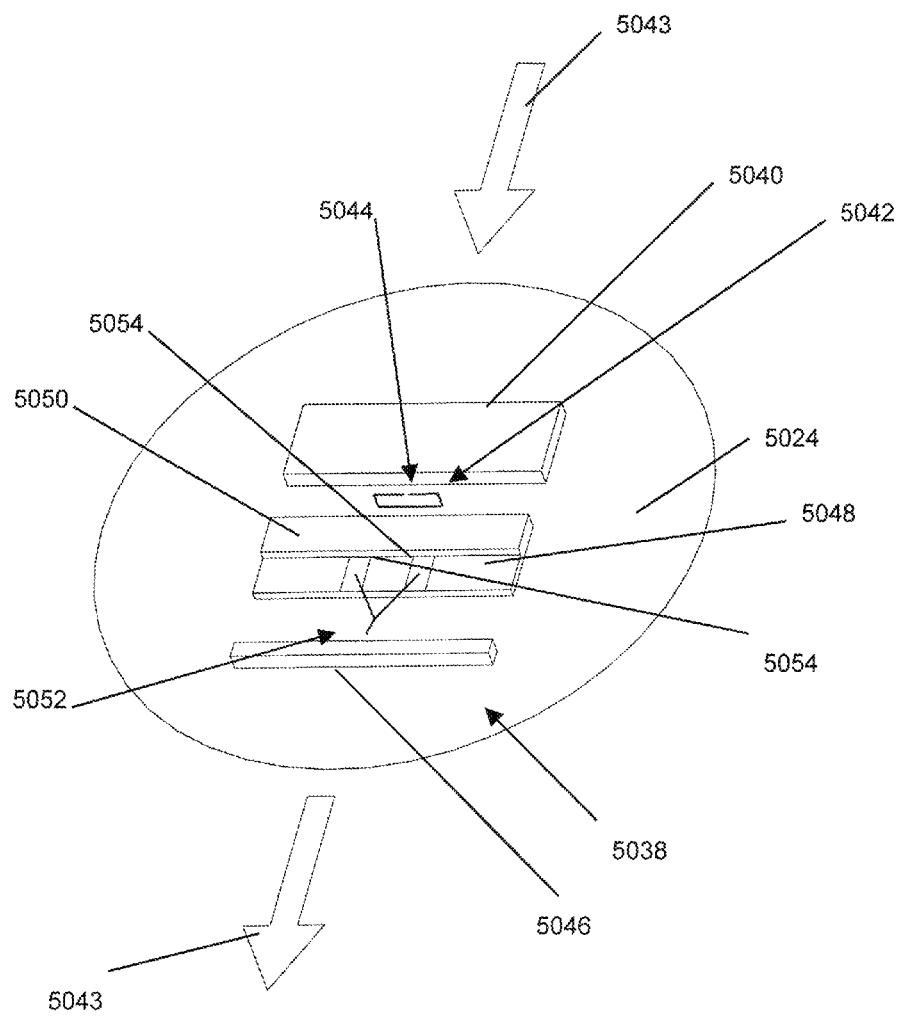
FIG. 20 illustrates a perspective view of a read/write head having a cantilevered nanostructure read-head and a carbon nanotube write-read.

FIG. 20 illustrates a perspective view of a read/write head 5024 having a "Y" shaped cantilevered piezoelectric nanostructure read-head 5052 and a carbon nanotube write-head 5042. FIG. 20 illustrates a bottom portion 5038 of read/write head 5024 that is placed adjacent to magnetic disk 5016 and data layer 202, as shown in FIGS. 19A-C. Detailed views of read-head 5052 are provided in FIGS. 21 and 24. A detailed view of write-head 5042 is provided in FIG. 23. Read-head 5052 and write-head 5042 are controlled by controller 5010 (FIGS. 19A-C) through read/write channel 5012. Blocks 5040 and 5046 provide mechanical protection to write-head 5042, such as wear resistance and mechanical spacing. Write-head 5042 is a device that generates a magnetic field sufficient to magnetically polarize magnetic nanoparticles 103 or 104 within a data header 5034/5086 or a data block 5018/5080. Write-head 5042 is formed of a carbon nanotube 101 containing magnetic nanoparticles 103/104 (shown in FIG. 23) that is generally configured into a "C" shape having a gap 5044 from which a magnetic field is emitted. A nanowire 5060 (shown in FIG. 23) is wrapped around the carbon nanotube 101 forming an inductive element that generates a magnetic field in gap 5044. Write-head 5042 magnetically polarizes magnetic nanoparticles 103/104 within data layer 202. Read/write head 5024 is aligned to track along data blocks 5018, 5080, and 6002, as shown by arrow 5043, such that write element 5042 tracks along data blocks 5018, 5080, and 6002 before read element 5052. This configuration allows for the write-verification of data that is written by write head 5042 by reading the written data with read head 5052. In addition, the "Y" shaped nanostructure forming read element 5052 is preferably pointed along the direction of movement 5043 of read/write head 5024 so that read head 5052 is not placed into a buckling condition with the rotation of disk 5016, 5076, or 6000.

Figure 21:
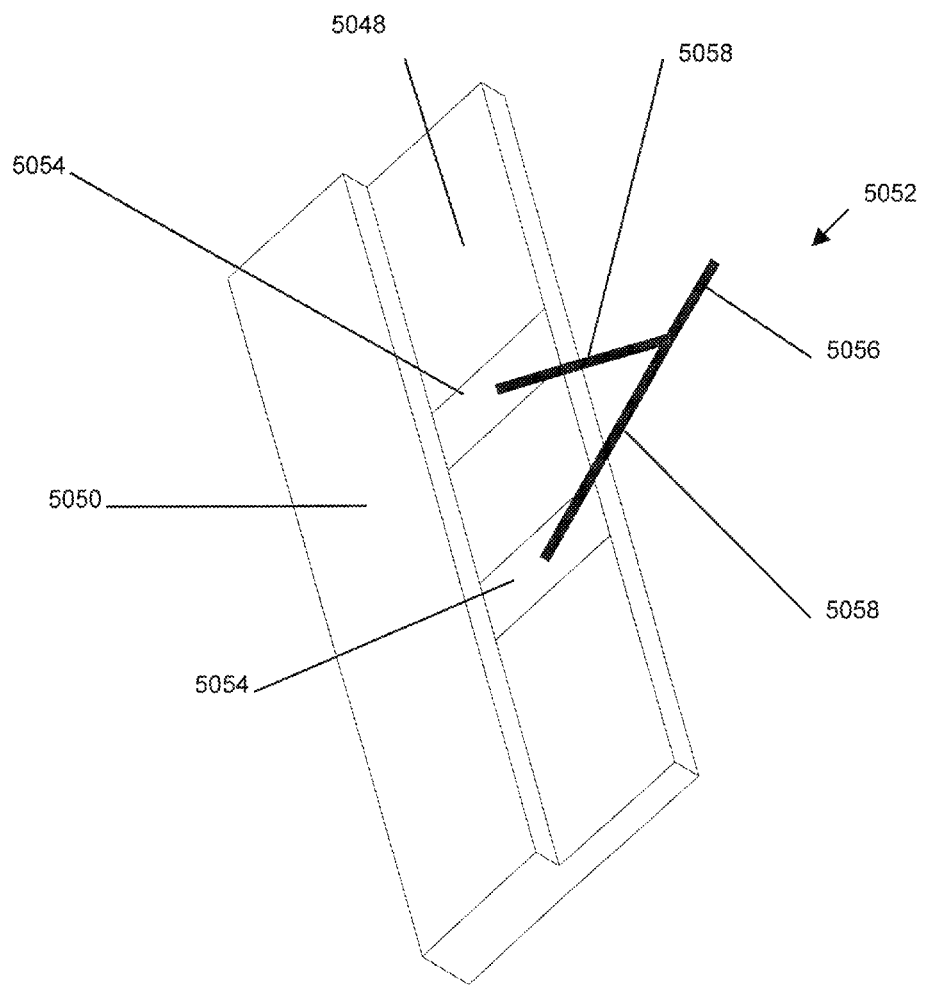
FIG. 21 illustrates a perspective view of a read-head having a cantilevered nanostructure.
Figure 24:
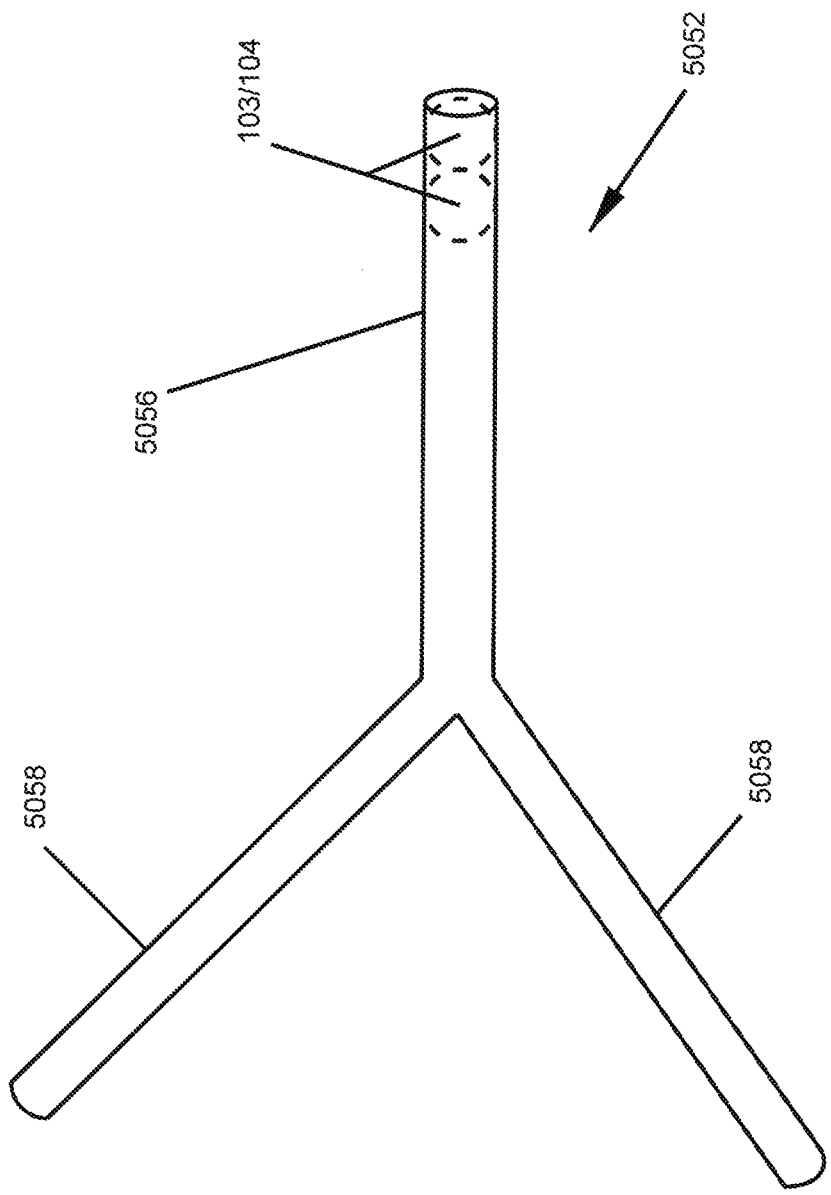
FIG. 24 illustrates a cantilevered nanostructure forming a component of a read-head.

Read-head 5052 detects the magnetic polarization of magnetic nanoparticles 103/104 within data layer 202. Read-head 5052 is comprised of a "Y" shaped nanostructure 5052. FIG. 21 illustrates a perspective view of a read-head 5052 having a "Y" shaped nanostructure 5052. The "Y" shaped nanostructure includes two base ends 5058 and a probe end 5056. Each of the base ends 5058 are electrically connected to an electrical contact 5054. Electrical contacts 5054 are supported on surface 5048 and are in communication with read/write channel 5012 of controller 5010. Probe tip 5056 is bent downward toward a top surface of magnetic disk 5016 in order to be in sufficient proximity of the magnetic disk 5016 to interact with the magnetic polarization of magnetic nanoparticles 103/104 within data layer 202. Raised portion 5050 provides mechanical protection to the "Y" nanostructure 5052. "Y" shaped nanostructure is configured to interact with the polarization of magnetic nanoparticles 103/104 within data layer 202. Probe tip 5056 contains magnetic nanoparticles 103/104, as shown in FIG. 24. The magnetic polarization of magnetic nanoparticles 103/104 within data layer 202 interacts with magnetic nanoparticles 103/104 within probe tip 5056 causing probe tip 5056 to either be deflected towards or away from the magnetic disk depending if they have the same or different magnetic polarization. This deflection in probe tip 5056 causes a change in the conductivity of "Y" shaped nanostructure 5052 across base ends 5058 that indicates the magnetic polarization of the magnetic nanoparticles within data layer 202. The changes in conductivity of "Y" shaped nanostructure 5052 are measured across contacts 5054 and communicated to controller 5010 through read/write channel 5012. While shown in a "Y" configuration, this configuration of read-head 5052 is merely exemplary and is not limiting. Read-head 5052 may be formed of carbon nanotube structures formed having an "X" configuration, a "V" configuration, a "T" configuration, a "W" configuration, or may be formed of a simple nanotube employed as a cantilever beam.

Figure 22:
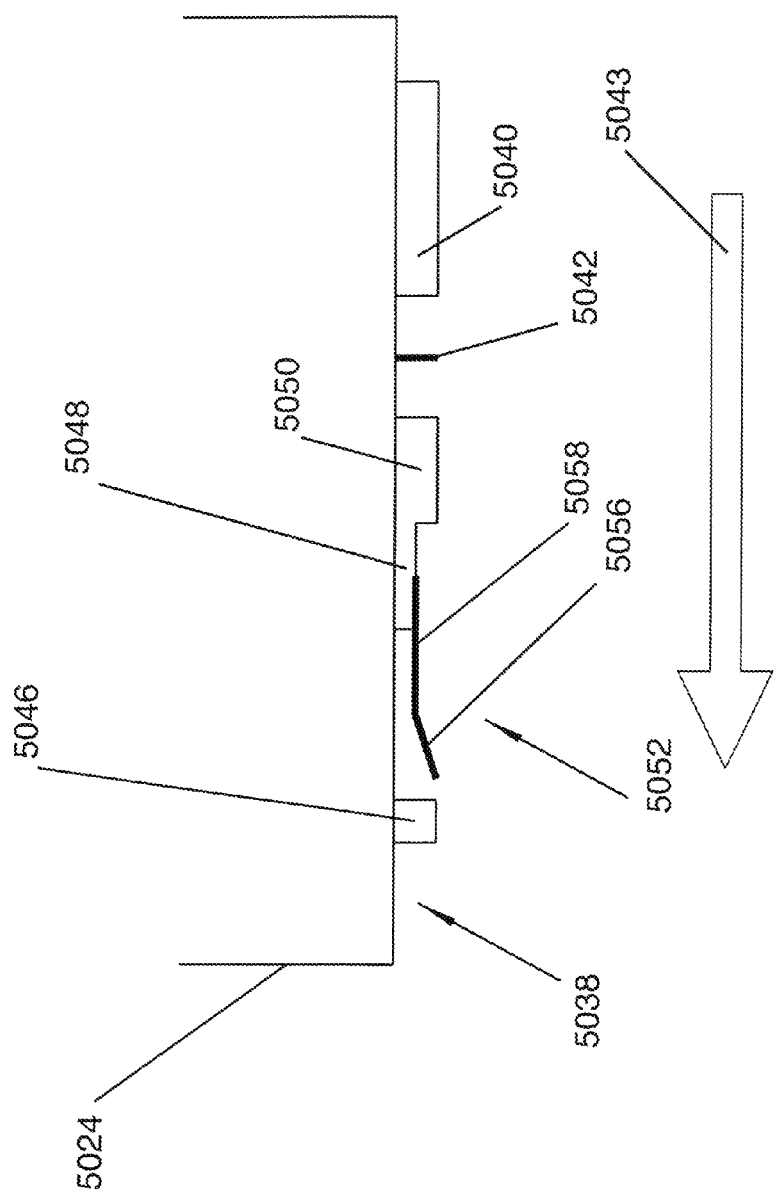
FIG. 22 illustrates a side view of a read/write head having a cantilevered nano structure read-head and a carbon nanotube write-read.

FIG. 22 illustrates a side view of a read/write head 5024 having a "Y" shaped nano structure read-head 5052 and a carbon nanotube write-read 5042. Note that base ends 5058 of nanostructure 5052 are parallel to the surface of contacts 5054. Probe tip 5056 is bent down toward the top surface of a magnetic disk in order to magnetically interact with the magnetic polarization of magnetic nanoparticles 103/103 within data layer 202. Write-head 5042 and read-head 5052 and blocks 5040, 5046, and 5050 are positioned such that they are generally the same distance from the top surface of a magnetic disk when read/write head 5024 is positioned over a magnetic disk. The direction of movement 5043 of read/write head 5024 is shown. The direction of movement 5043 means that write head 5042 encounters the media before read head 5052. This direction of movement 5043 allows of write-verify operations where read head 5052 reads what write head 5042 just wrote.

Figure 23:
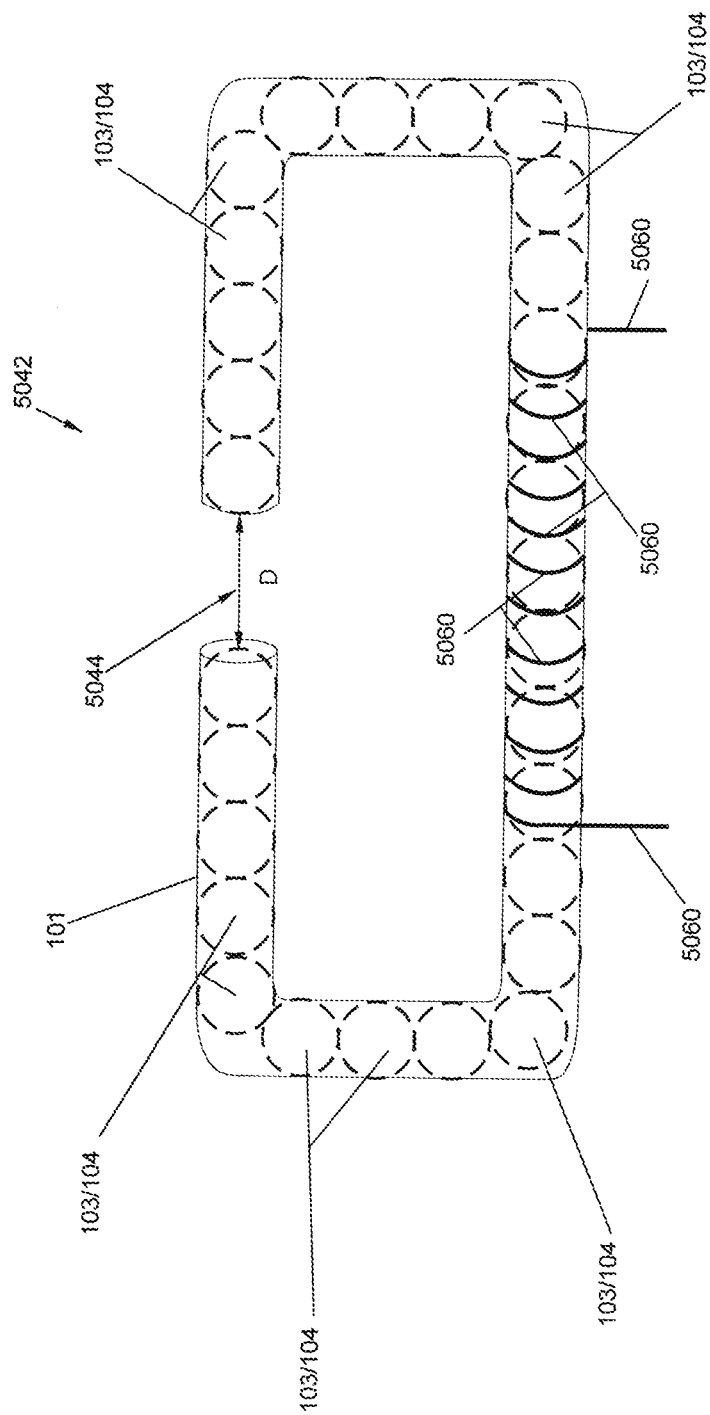
FIG. 23 illustrates a magnetic field generator formed of a shaped carbon nanotube that contains a plurality of magnetic nanoparticles.

FIG. 23 illustrates a magnetic field generator 5042 formed of a shaped carbon nanotube 101 that contains a plurality of magnetic nanoparticles 103/104. Carbon nanotube 101 is shown in a "C" shape configuration. The use of a "C" configuration is merely exemplary. Carbon nanotube 101 may also be formed in a "U" shaped or "horseshoe" shaped configuration. Carbon nanotube 101 is filed with nanoparticles 101 made of a soft-ferrite material that conducts and directs magnetic flux induced by nanowire 5060. The direction of magnetization of soft-ferrites is easily reversed without dissipating much energy (hysteresis losses) due to the low coercivity of soft-ferrites. In addition, soft-ferrites typically have a high resistivity that prevents eddy currents in the core, which is another source of energy loss in switching direction of the magnetic field. This ability to easily reverse the direction of magnetization supports the write function of generator 5042. Most modern magnetically soft ferrites have a cubic (spinel) structure. The general composition of such ferrites is $MeFe_2O_4$, where Me represents one or several of the divalent transition metals such as manganese (Mn), zinc (Zn), nickel (Ni), cobalt (Co), copper (Cu), iron (Fe) or magnesium (Mg). The most popular combinations are manganese and zinc (MnZn) or nickel and zinc (NiZn). Other soft ferrites includes $Ni_{45}Fe_{55}$, and $Ni_{80}Fe_{20}$. These compounds exhibit good magnetic properties below a certain temperature, called the Curie Temperature ($T_C$). They can easily be magnetized and have a rather high intrinsic resistivity. These materials can be used up to very high frequencies without laminating, as is the normal requirement for magnetic metals. NiZn ferrites have a very high resistivity and are most suitable for frequencies over 1 MHz, however, MnZn ferrites exhibit higher permeability ($\mu_i$) and saturation induction levels ($B_S$) and are suitable up to 3 MHz. For certain special applications, single crystal ferrites can be produced, but the majority of ferrites are manufactured as polycrystalline ceramics.

A space 5044 is located at the opening of the "C" shape configuration of carbon nanotube 101. Space 5044 has a distance marked "D." The distance "D" of space 5044 corresponds to an area of a data layer 202 on to which write-head 5042 can write data. It is desirable that space 5042 have a separation distance "D" that is at least large enough to magnetically polarize a single magnetic nanoparticle 103/104 within data layer 202. Carbon nanotube 101 is wrapped with a nanowire 5060. Nanowire 5060 forms an inductive element when it is wrapped in a coil around carbon nanotube 101, thereby creating a magnetic field within space 5044. Examples of materials for nanowires include Ni (Nickel), Pt (Platinum), and Au (Gold).

FIG. 24 illustrates a "Y" shaped nanostructure 5052 forming a component of a read-head 5052. Base portions 5058 and probe tip 5056 are formed of carbon nanotubes 101. An end of probe tip 5056 includes magnetic nanoparticles 103/104 in order to enhance the ability of probe tip 5056 to interact with the magnetic polarization of nanoparticles 103/104 present within data layer 202. "Y" shaped nanostructure 5052, which is a cantilevered piezoelectric nanostructure, may be formed of a single branching carbon nanotube. Carbon nanotubes 101 possess piezoelectric properties that allow for the internal detection of the movement of cantilevered carbon nanotubes such as "Y" nanostructure 5052 across electrodes 5054. While shown in a "Y" configuration, it is contemplated that nanostructure 5052 may also have a "V," "T," or "X" configuration. A more detailed description of cantilevered carbon nanotube probes is provided in U.S. Pat. No. 7,462,270 entitled "Cantilever Probes for Nanoscale Magnetic and Atomic Force Microscopy," issued on Dec. 9, 2008, which is hereby incorporated by reference in its entirety. Nanostructure 5052 and controller 5010 are configured to operate to read binary data. Thus, nanostructure 5052 is required to at least provide sufficient piezoelectric response to indicate a positive or negative magnetic polarization upon at least one magnetic nanoparticle 103/104.

Figure 25:
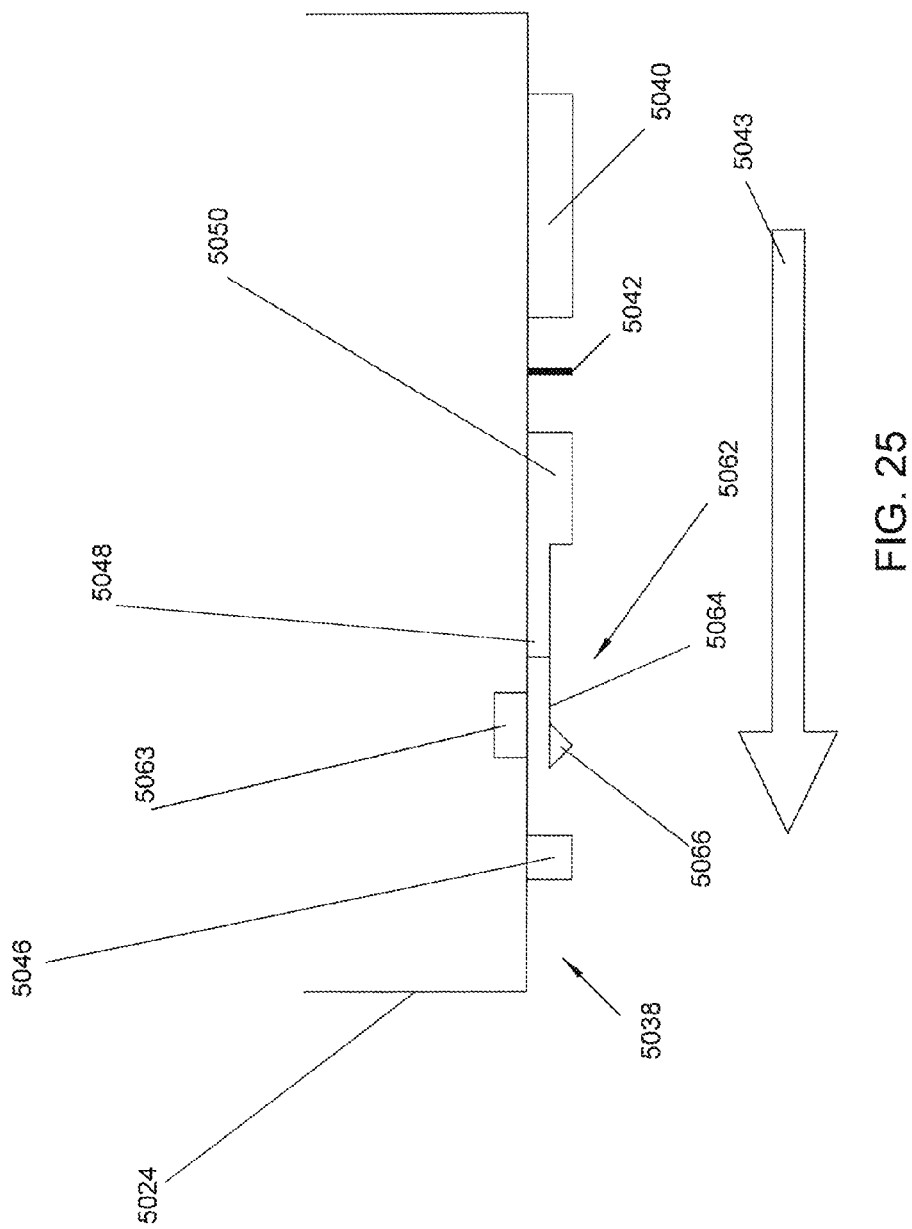
FIG. 25 illustrates a side view of a read/write head having a magnetic force microscopy probe read-head.

FIG. 25 illustrates a side view of a read/write head 5024 having a magnetic force microscopy probe read-head 5062. Magnetic Force Microscopy (MFM) probe read-head 5062 derives from an Atomic Force Microscope (AFM). When an AFM is augmented with a magnetized tip 5066 which is used to detect the magnetic polarization of magnetic nanoparticles 103/104, and thus, the tip-sample magnetic interactions are detected, this augmented structure is called a MFM. In MFM measurements, the magnetic force F between the sample and tip can be described by:

$$F=\mu_o(m^*\nabla)H \qquad \text{Equation 1}$$

where m is the magnetic moment of the tip (approximated as a point dipole), H is the magnetic stray field from the sample surface, and $\mu_o$ is the magnetic permeability of free space. MFM resolutions as low as 10 to 20 nm are attainable with permanent magnets. It is possible to increase this resolution by using an electromagnet on the tip 5066. Tip 5066 is suspended on cantilever 5064. Cantilever 5064 can be formed of any material capable of deflecting under the magnetic interaction of probe tip 5066 with polarized magnetic nanoparticles 103/104 within data layer 202, such as carbon nanotubes, or thin sheets of metal, plastic, piezoelectric ceramic, or other composite material. The deflection of the probe tip 5066 on cantilever 5064 is optically measured by an optical detector 5067 contained within read/write head 5024. Probe head 5062, optical detector 5067 and controller 5010 are configured to read binary data on a magnetic disk. Thus, probe head 5062, optical detector 5067 and controller 5010 are at least required to determine positive and negative magnetic polarizations of magnetic nanoparticles 103/104 contained within data layer 202. Cantilever 5064 is preferably positioned such that tip 5066 points along the direction of movement 5043 of read/write head 5024, thereby preventing cantilever 5064 from being placed in a buckling position with respect to disk 5016, 5076, or 6000.

Figure 26:
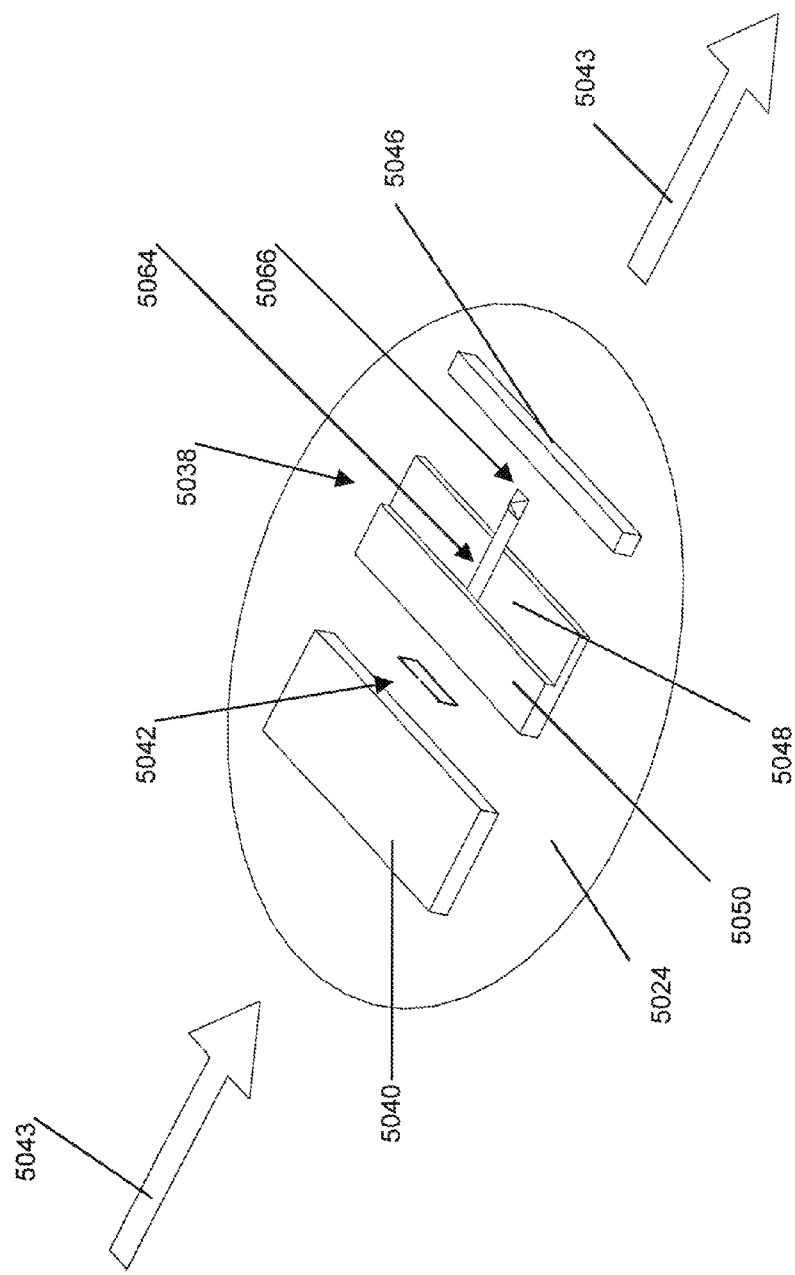
FIG. 26 illustrates a perspective view of a read/write head having a magnetic force microscopy probe read-head.

FIG. 26 illustrates a perspective view of a read/write head 5024 having a magnetic force microscopy probe read-head 5064. Note how probe tip 5066 is suspended from cantilever 5064 that is attached to surface 5048, as shown in FIG. 25. Blocks 5050 and 5046 are provided for mechanical protection of read-head 5064. The probe tip 5066, blocks 5050, 5046, and 5040, and write-head 5042 are all positioned to generally have the same height above the top surface of a magnetic disk when read/write head 5024 is positioned above a magnetic disk. Read/write head 5024 is aligned to track along data blocks 5018, 5080, and 6002, as shown by arrow 5043, such that write element 5042 tracks along data blocks 5018, 5080, and 6002 before read element 5066. This configuration allows for the read-verification of data that is written by write head 5042. In addition, the cantilever 5064 and tip 5066 forming the read element 5062 is preferably pointed away from the direction of movement of read/write head 5024 so that read head 5062 is not placed into a buckling condition with the rotation of disk 5016, 5076, or 6000. Cantilever 5064 may be formed of a polymer, metal, ceramic, composite material, or one or more carbon nanotubes, for example.

Figure 27:
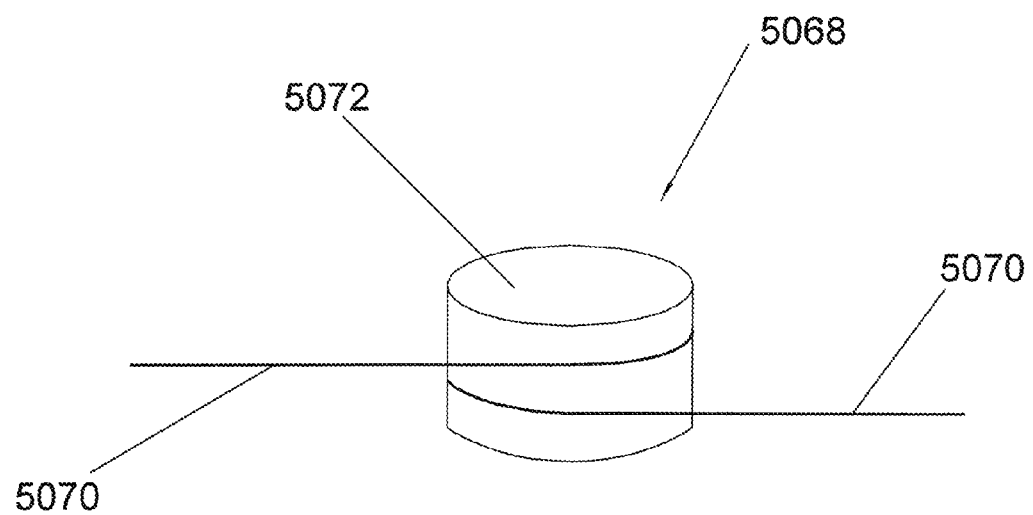
FIG. 27 illustrates a portion of a Helmholtz coil that includes a nano-wire wrapped around a bobbin formed of a carbon nanotubes.
Figure 28:
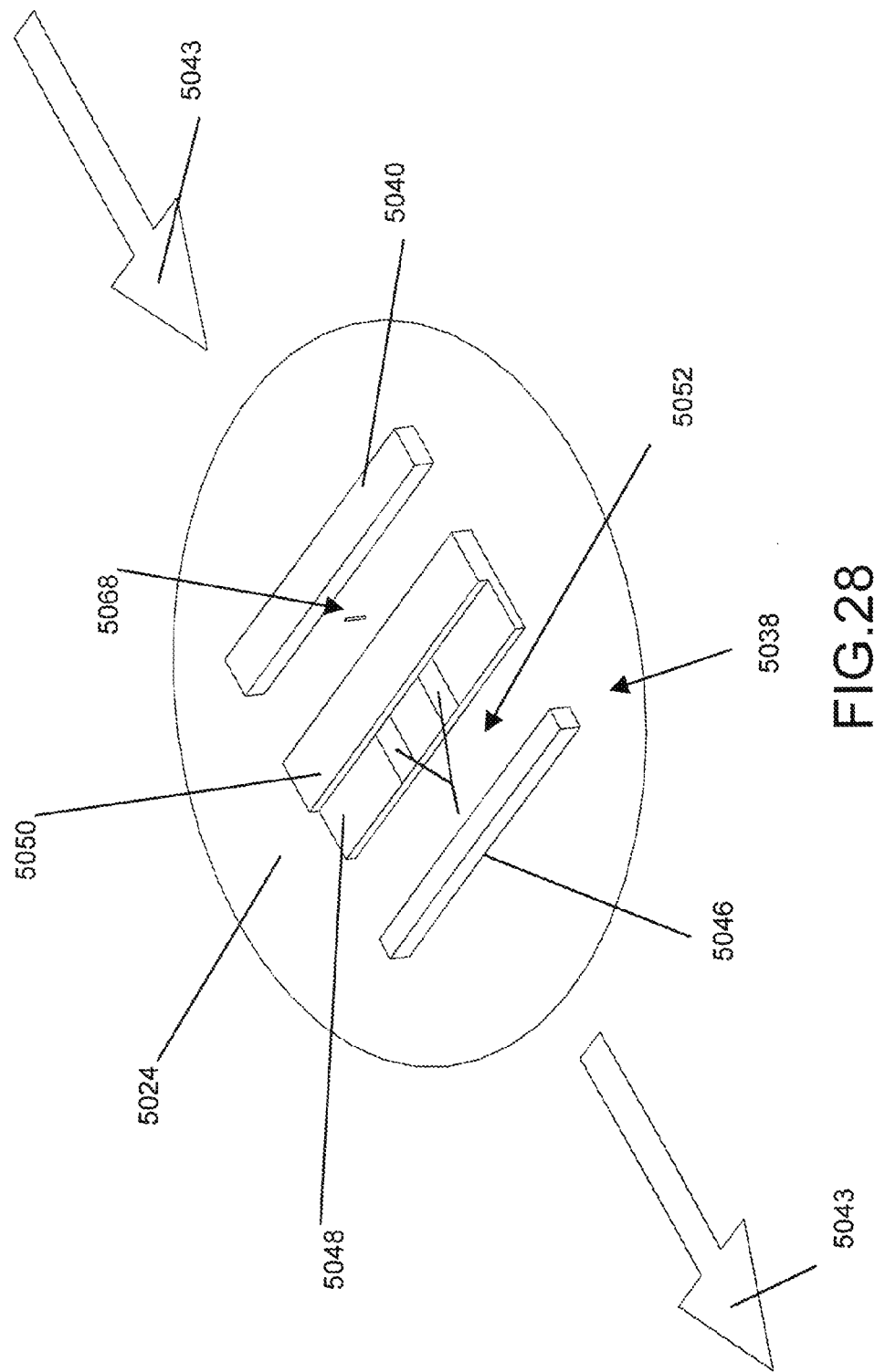
FIG. 28 illustrates a perspective view of a read/write head showing a portion of a write/head formed of a Helmholtz coil.
Figure 29:
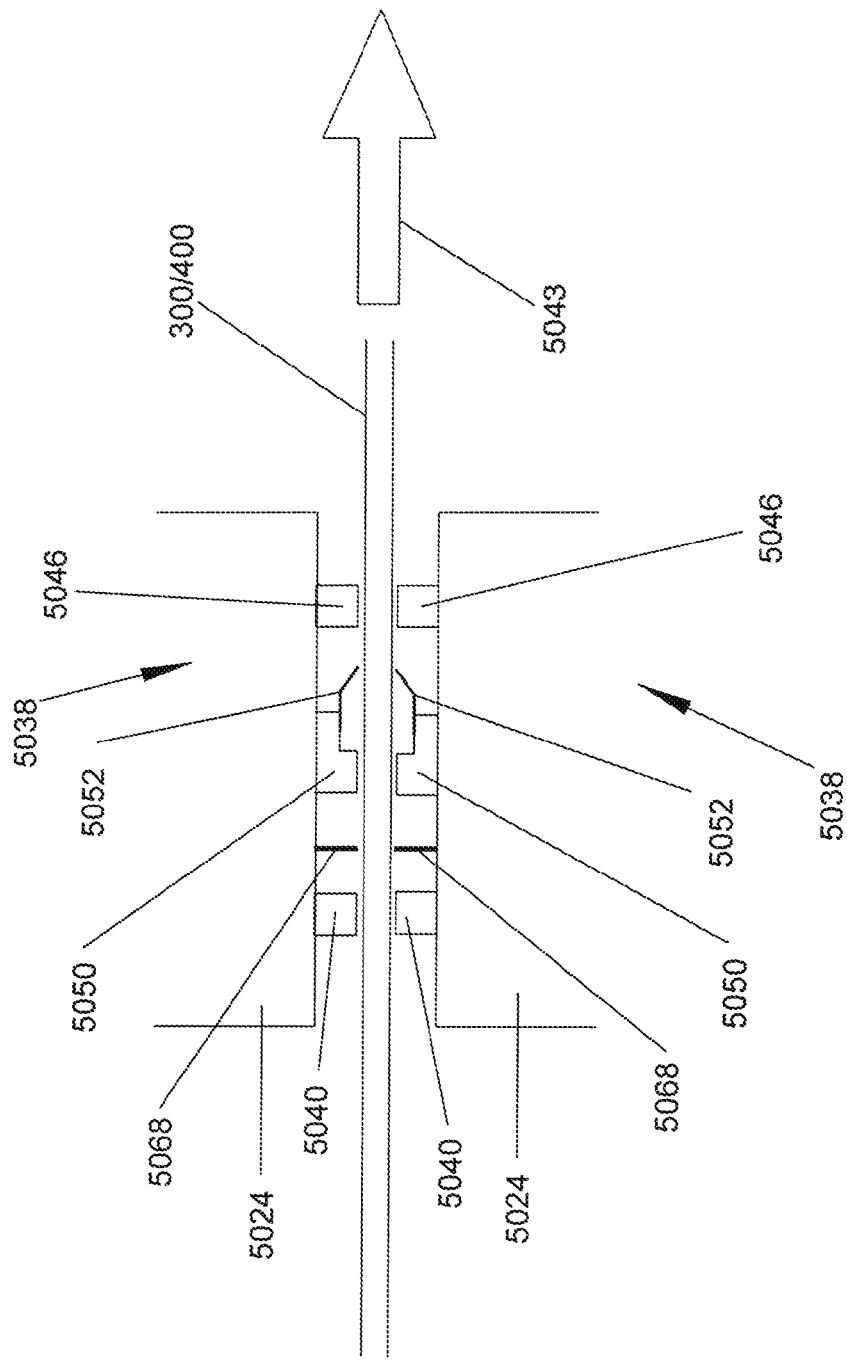
FIG. 29 illustrates a side view of a read/write head formed of a Helmholtz coil and accompanying magnetic storage media.

FIGS. 27-29 illustrate a write head formed of a Helmholtz coil. A Helmholtz coil is formed of two identical circular magnetic coils that are placed symmetrically one on each side of the area of a magnetic disk 400 or tape 300, shown in FIG. 29, to which data is to be written to along a common axis, and separated by a distance h equal to the radius R of the coil. Each coil carries an equal electrical current flowing in the same direction. Setting h=R, which is what defines a Helmholtz pair, minimizes the nonuniformity of the field at the center of the coils. FIG. 27 illustrates a single coil 5068 forming one-half of a Helmholtz coil pair that includes a nano-wire 5070 wrapped around a bobbin 5072 formed of a carbon nanotube. Carbon nanotubes can be formed having the properties of a metal, a semiconductor, or an insulator. Bobbin 5072 is formed of a non-conducting carbon nanotube that has the properties of an insulator. Nanowire 5070 is shown wrapped around bobbin 5072 once. However, this embodiment is merely exemplary and nanowire 5070 may be wrapped multiple times around bobbin 5072. Examples of materials for nanowires include Ni (Nickel), Pt (Platinum), and Au (Gold).

FIG. 28 illustrates a perspective view of a read/write head 5024 showing a portion 5068 of a write-head formed of a Helmholtz coil. A bottom portion 5038 of read/write head 5024 is shown. As discussed above, two such coils 5068 are required to form a Helmholtz coil. Blocks 5040 and 5046 provide mechanical protection to coil 5068. In this Figure, write-coil 5068 is shown together with read-head 5052 merely for exemplary purposes. It is also contemplated that write-head 5068 may be coupled with read-head 5062. Blocks 5040, 5046, and 5050 are positioned together with write-head 5068 and read-head 5052 in such a manner that all of these features are generally the same distance from the top surface of a magnetic disk when read/write head 5024 is positioned over a disk 300, or tape 400, as shown in FIG. 29. Read/write head 5024 is aligned to track along data blocks 5018, 5080, and 6002, as shown by arrow 5043, such that write element 5068 tracks along data blocks 5018, 5080, and 6002 before read element 5052. This configuration allows for the read-verification of data that is written by write head 5068. In addition, the "Y" shaped nanostructure forming the read element 5052 is preferably pointed away from the direction of movement of read/write head 5024 so that read head 5052 is not placed into a buckling condition with the rotation of disk 5016, 5076, or 6000.

FIG. 29 illustrates a side view of a read/write head 5024 that includes a Helmholtz coil formed of a pair of coils 5068 and accompanying magnetic storage media 300/400. As discussed above, the magnetic field generated for writing to magnetic media is between a pair of magnetic coils 5068. Thus, magnetic media 300/400 is positioned between a pair of read/write heads 5024, each of which support one coil 5068, thereby forming a Helmholtz coil. Note that in this Figure, a pair of read-heads 5052 are shown positioned on either side of magnetic media 300/400 in order to enhance the ability of read-head 5052 to detect the magnetic polarization of magnetic nanoparticles 103/104 in data layer 202 of media 300/400. Write-head 5068 is configured write data on perpendicular magnetic media. Write-head 5052 is configured to write data on longitudinal media.

Figure 30:
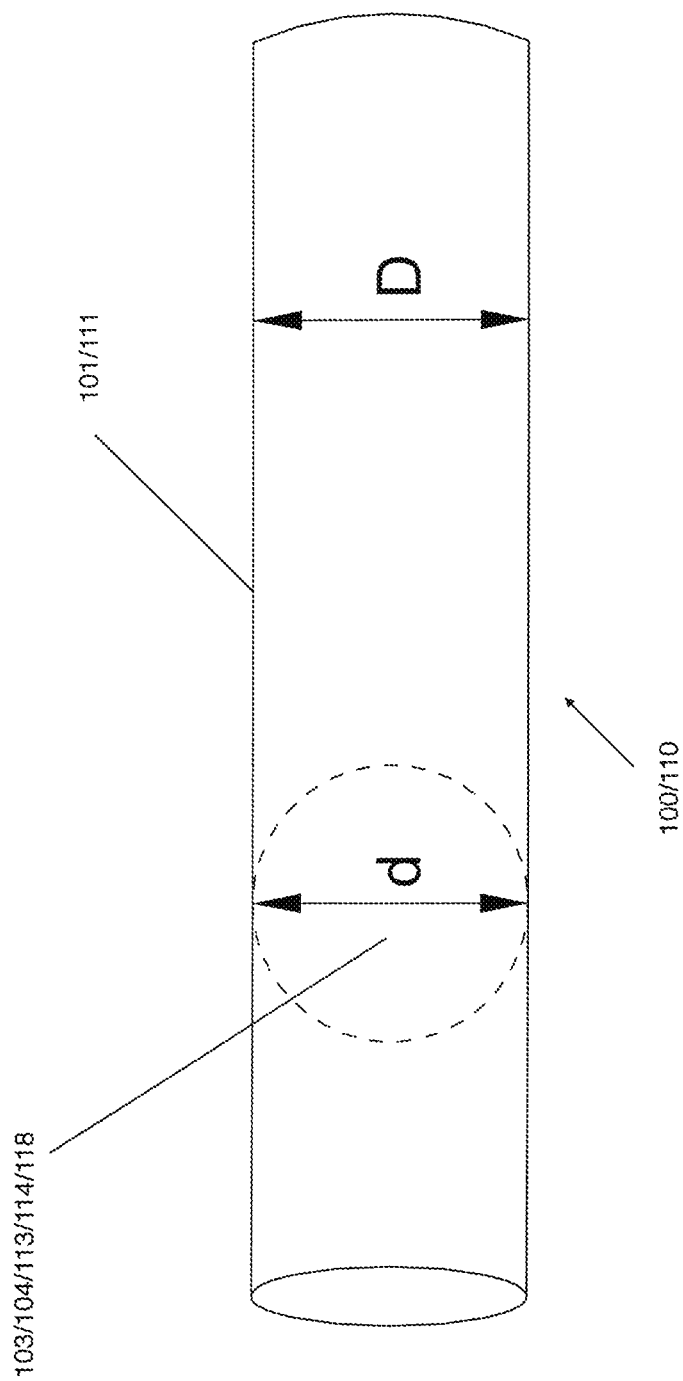
FIG. 30 illustrates a magnetic nanoparticle frictionally fit within a carbon nanotubes.

FIG. 30 illustrates a magnetic nanoparticle 103/104/113/114 or non-magnetic particle 118 frictionally fit within a carbon nanotube 101/111. In order to form magnetic media 300/400, it is desirable that the magnetic nanoparticles 103/104/113/114 forming the magnetic media remain stationary within carbon nanotubes 101/111. One method of maintaining nanoparticles 103/104/113/114 in a fixed position with respect to carbon nanotubes 101/111 is to form a frictional fit between nanoparticles 103/104/113/114 and carbon nanotube 101/111. A frictional fit is formed when the diameter "d" of nanoparticles 103/104/113/114 is equal to or slightly exceeds the diameter "D" of carbon nanotube 101/111. Nanotube assemblies 100 and 110 are formed by press fitting nanoparticles 103/104/113/114 within carbon nanotubes 101/111.

Figure 31:
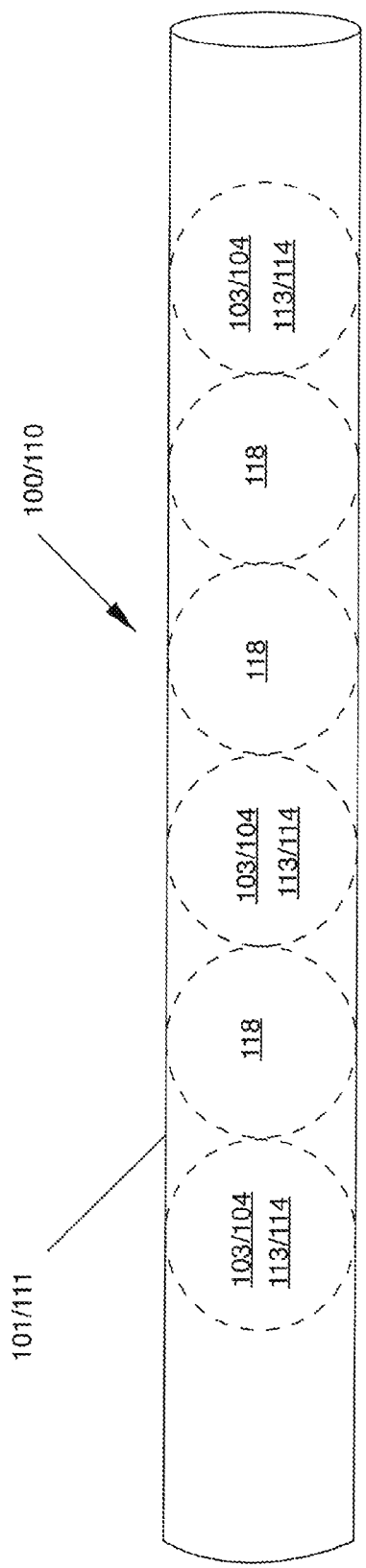
FIG. 31 illustrates a carbon nanotube containing magnetic nanoparticles and non-magnetic nanoparticles.

FIG. 31 illustrates a carbon nanotube 101 containing magnetic nanoparticles 103/104 or 113/114 and non-magnetic nanoparticles 118. A single nanotube 101 may contain a single nanoparticle 103/104, or numerous nanoparticles 103/104. Non-magnetic nanoparticles 118 may separate individual magnetic nanoparticles 103/104 from abutting each other. Non-magnetic nanoparticles 118 may also separate chains of multiple magnetic nanoparticles 103/104 that abut each other from other magnetic nanoparticles 103/104. Separating individual nanoparticles 103/104 or chains of nanoparticles 103/104 with non-magnetic nanoparticles 118 functions to isolate and maintain the integrity of the magnetic polarizations of magnetic nanoparticles 103/104. In addition, it enhances the ability of a read/write head 5024 to locate and detect the polarization of a single nanoparticle 103/104 or chains of nanoparticles 103/104 when there are non-magnetic particles 118 separating the magnetic nanoparticles 103/104 from each other.

Two exemplary data encoding schemes for disk 5016, 5076, and 6000 are now described. The first encoding method is simple: a first polarity indicates a first data bit and a second polarity indicates a second data bit. Thus, SNNNSSSNNNSSSSN=011100011100001, where S indicates a SOUTH polarization and N indicates a NORTH polarization. A second and more complicated scheme involves the transitions between the first and second polarity being a first data bit and no-transitions are counted as zeroes. This counting transitions between polarities as a 1 is because there is a "double difference" in polarity, relative to 0, in other words, you go from +300 Oe to −300 Oe with a NS transition, or −300 Oe to +300 Oe with a SN transition, and thus transitions are easier to detect. Thus, a pair of dislike polarities define a 1. Everything not involved in a transition is counted as a zero. Thus, SNNNSSSNNNSSSSN=1010101001. This second encoding method is therefore considered to be more robust than the first encoding method.

Figure 32:
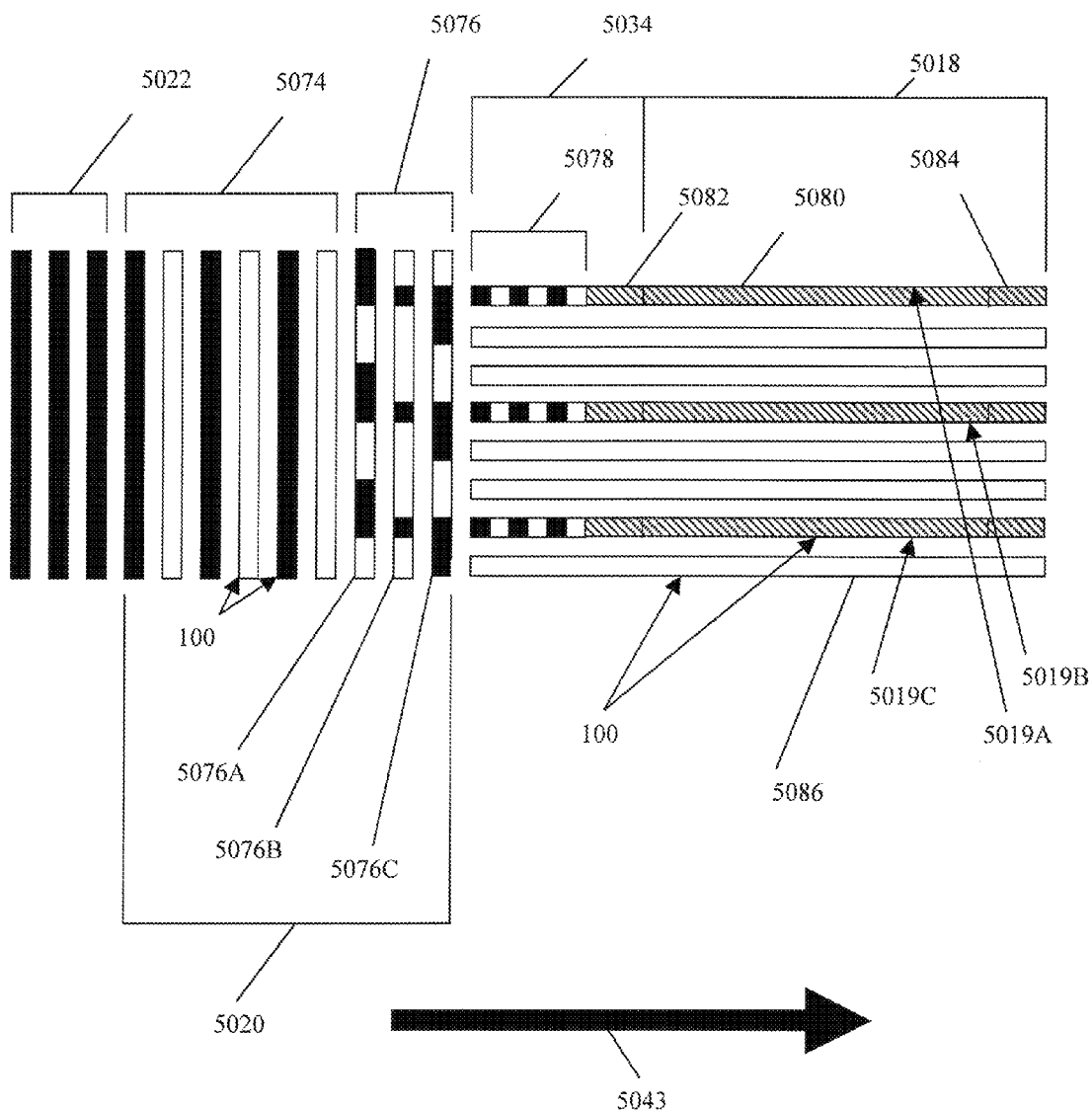
FIG. 32 depicts exemplary array of nanotube assemblies forming a rotational marker, a servo sector, a data header and a data block, as shown in FIGS. 19A and 19C.

FIG. 32 depicts exemplary array of nanotube assemblies forming a rotational marker 5022, a servo sector 5020, a data header 5034 and a data block 5018, as shown in FIGS. 19A and 19C. In general, FIG. 32 illustrates a series of long rectangular boxes 100. Each of these long rectangular boxes is a carbon nanotube assembly 100. The carbon nanotube assemblies 100 forming rotational marker 5022 and servo sector 5020 are generally perpendicular to the carbon nanotube assemblies 100 forming data header 5034 and data sector 5018. However, this orientation is merely exemplary. The carbon nanotube assemblies 100 forming rotational marker 5022 and servo sector 5020 may be positioned in a gently curving arc relative to the carbon nanotube assemblies 100 forming data header 5034 and data sector 5018. The direction of tracking of read/write head 5024 over rotational marker 5022, a servo sector 5020, a data header 5034, and a data block 5018 is shown by the blackened arrow 5043.

Rotational marker 5022 is depicted as being formed of carbon nanotube assemblies 100 that are continuously filled with permanently magnetized magnetic nanoparticles 103 or 104, as illustrated by the long black rectangles 100. The depiction of three parallel carbon nanotube assemblies 100 forming rotational marker 5022 is merely exemplary. Rotational marker 5022 may be formed of any number of carbon nanotube assemblies 100 that are continuously filled with permanently magnetized magnetic nanoparticles 103 or 104.

Servo sector 5020 includes grey code 5074 and fine positioning information 5076. Grey code 5074 is formed of a combination of carbon nanotube assemblies 100 that are continuously filled with permanently magnetized magnetic nanoparticles 103 or 104, as depicted by the long black rectangles, interlaced with non-magnetic carbon nanotube assemblies 100 that are either devoid of containing any nanoparticles 103 or 104 or are filled with non-magnetic nanoparticles 118, as illustrated by the empty long rectangles that are filled with the color white. The carbon nanotube assemblies forming grey code 5074 may include any combination of carbon nanotube assemblies 100 that are continuously filled with permanently magnetized magnetic nanoparticles 103 or 104 and non-magnetic carbon nanotube assemblies 100. The carbon nanotube assemblies 100 that are continuously filled with permanently magnetized magnetic nanoparticles 103 or 104 represent one of two digital magnetic states while the non-magnetic carbon nanotube assemblies 100 represents the other one of two digital magnetic states. Note that the non-magnetic carbon nanotube assemblies 100 may include a hollow carbon nanotube 101 that contains no nanoparticles 103, 104 or 118.

Fine positioning information 5076 is formed of carbon nanotube assemblies 100 that include permanently magnetized magnetic nanoparticles 103 or 104, depicted as being blackened boxes within long rectangles 100, and non-magnetic nanoparticles 118, depicted as being white boxes interlaced with the black boxes within long rectangles 100. The permanently magnetized magnetic nanoparticles 103 or 104 in carbon nanotubes 5076A, 5076B, and 5076C form a patterned array that informs a controller as to how to fine position the read/write head 5024 over data track 5019 to read data block 5018. The permanently magnetized magnetic nanoparticles 103 or 104 contained in carbon nanotube assembly 5076A indicate whether the read/write head 5024 is optimally positioned over data tracks 5019A, 5019B, or 5019C or whether it is positioned too high with respect to data tracks 5019A, 5019B, or 5019C. Carbon nanotube assembly 5076B contains permanently magnetized magnetic nanoparticles 103 or 104 that indicate whether read/write head 5024 is optimally positioned over data track 5019. The permanently magnetized magnetic nanoparticles 103 or 104 contained in carbon nanotube assembly 5076A indicate whether the read/write head 5024 is optimally positioned over data track 5019 or whether it is positioned too low with respect to data tracks 5019A, 5019B, or 5019C. If as read/write head 5024 tracks along direction 5043 over fine positioning information 5076 and detects magnetic nanoparticles 103 or 104 in carbon nanotube 5076A, but not in carbon nanotubes 5076B or 5076C, then the controller 5010 knows that the read/write head 5024 is positioned too high with respect to the data track 5019, 5019B, or 5019C and must reposition read/write head 5024. If read/write head 5024 detects magnetic nanoparticles 103 or 104 in carbon nanotube 5076C, but not in carbon nanotubes 5076B or 5076A, then the controller 5010 knows that the read/write head 5024 is positioned too low with respect to the data tracks 5019, 5019B, or 5019C and must reposition read/write head 5024. If read/write head 5024 detects magnetic nanoparticles 103 or 104 in carbon nanotubes 5076A, 5076B, and 5076C, then the controller 5010 knows that the read/write head 5024 is optimally positioned respect to the data tracks 5019A, 5019B, or 5019C.

FIG. 32 depicts three data tracks 5019A, 5019B and 5019C, which are shown for non-limiting exemplary purposes as being a single carbon nanotube assembly 100. Each data track 5019A, 5019B, and 5019C may be positioned adjacent to a non-magnetic carbon nanotube 5086. Non-magnetic carbon nanotube 5086 may be formed of a single empty carbon nanotube that contains no magnetic nanoparticles 103 or 104. Alternatively, non-magnetic carbon nanotube 5086 may be filed with non-magnetic nanoparticles 118. Examples of non-magnetic nanoparticles include alumina, $SiO_2$, and dielectric materials. Each data block 5018 is preceded by a data header 5034 that includes a header indicator 5078 and header identification information 5082. Header indicator 5078 is shown in this example as being formed of alternating regions of permanently magnetized magnetic nanoparticles 103 or 104 interlaced with non-magnetic nanoparticles 118. Header indicator 5078 may for example be formed of single magnetic nanoparticles 103 or 104 interlaced with single permanently magnetized non-magnetic nanoparticles 118. Header indicator 5078 informs controller 5010 that it is about to encounter header identification information 5082. Header identification information 5082 is formed of rewritable magnetic nanoparticles 103 or 104, as shown by the dashed lines. Header identification information 5082 identifies the specific data block 5080. Data block 5080 is formed of rewritable magnetic nanoparticles 103 or 104. The rewritable magnetic nanoparticles may have a lower coercivity than the permanently magnetized magnetic nanoparticles. Data block 5080 is then followed by error correction code 5084, which is formed of magnetic nanoparticles 103 or 104, which may be rewritable in a formatting process, or permanently magnetized in a servo writing process.

Figure 33:
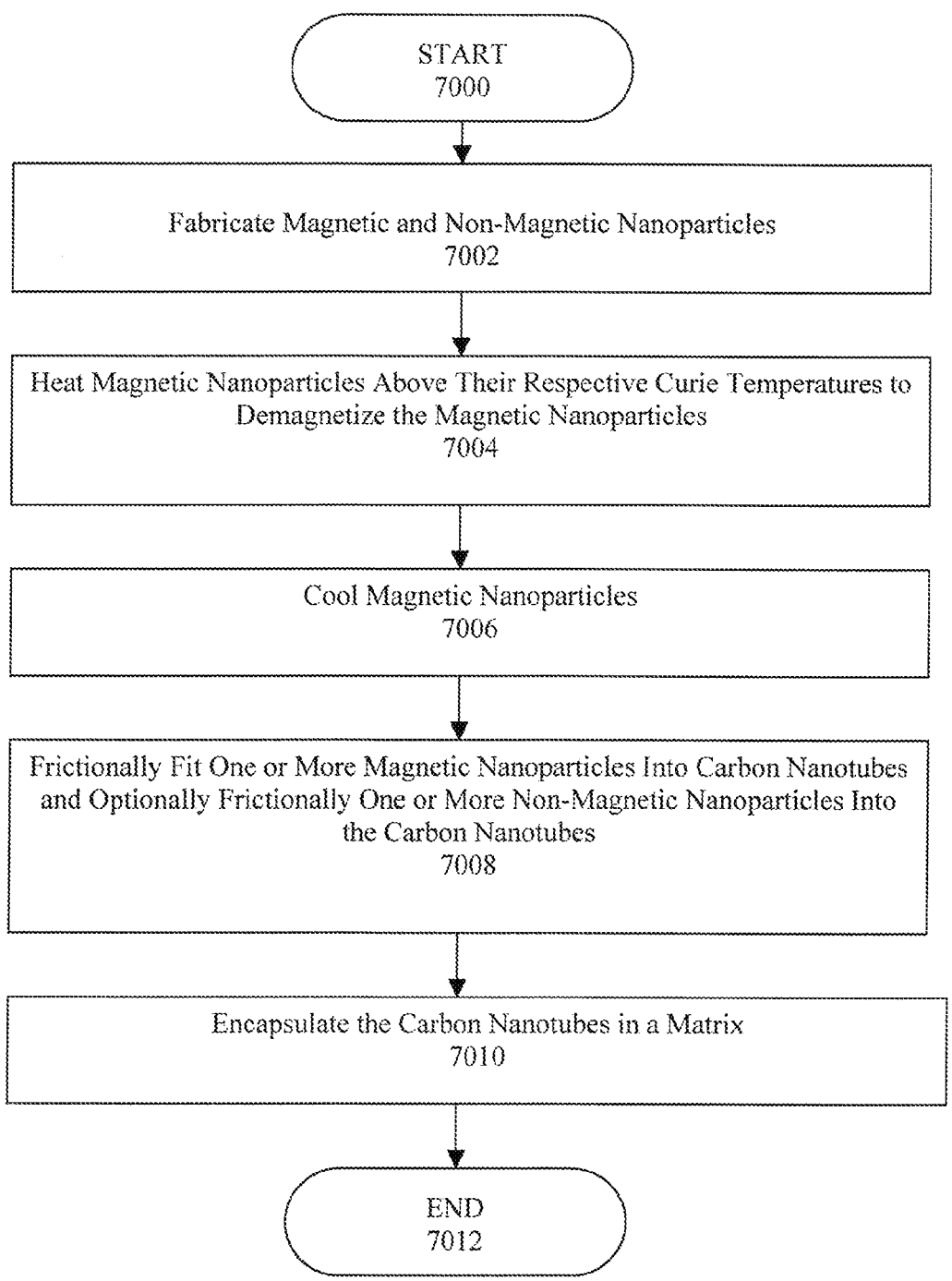
FIG. 33 depicts a process flow diagram illustrating a method for fabricating magnetic media having magnetic nanoparticles contained within carbon nanotubes encapsulated within a matrix.

FIG. 33 depicts a process flow diagram illustrating a method for fabricating magnetic media having magnetic nanoparticles 103/104 or 113/114 contained within carbon nanotubes 101 or 111 encapsulated within a matrix 230 or 231. The process begins with START 7000. In step 7002, magnetic nanoparticles 103/104 or 113/114 and non-magnetic nanoparticles 118 are fabricated. In step 7004, the magnetic nanoparticles 103/104 or 113/114 are heated above their respective Curie temperatures to demagnetize them. Demagnetizing the magnetic nanoparticles 103/104 or 113/114 prevents them from sticking together magnetically while attempting to frictionally insert them into carbon nanotubes 101 or 111. In step 7006, the magnetic nanoparticles 103/104 or 113/114 are cooled. In step 7008, the magnetic nanoparticles 103/104 or 113/114 and/or non-magnetic nanoparticles 118 are frictionally fit into carbon nanotubes 101 or 111 so that the nanoparticles remain in a static position with respect to carbon nanotubes 101 or 111 to form nanotube assemblies 100 or 110. In step 7010, carbon nanotube assemblies 100 or 110 are encapsulated in a matrix. The process ends in step 7012. Note that this process is exemplary and non-limiting. For example, carbon nanotubes may be grown over the magnetic and non-magnetic nanoparticles. Note that this process is not required when magnetic nanoparticles 103/104 are heated above their Curie temperature during fabrication step 7002 and are not later exposed to magnetic fields which would cause the particles to obtain a polarization prior to step 7008.

Figure 34:
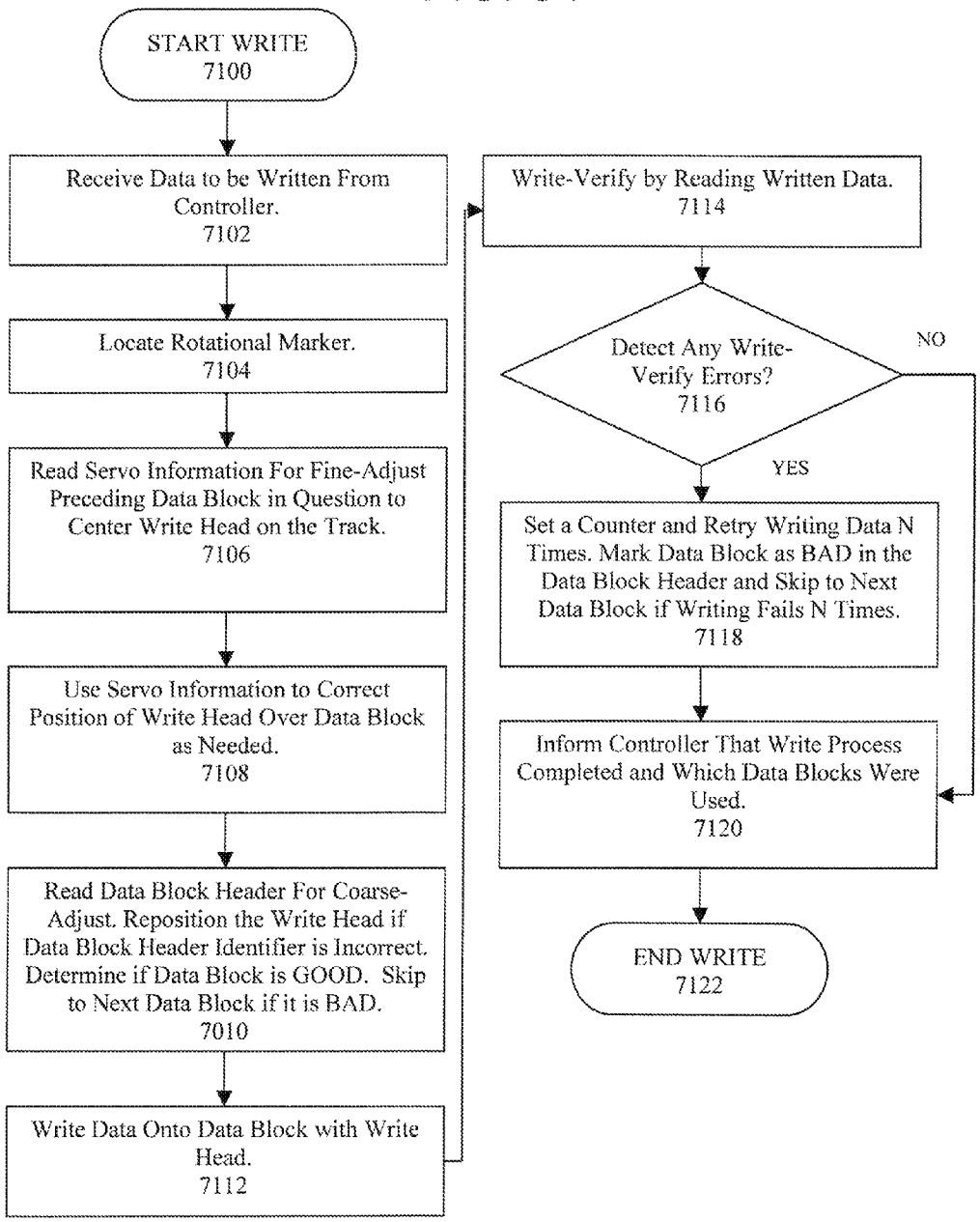
FIG. 34 illustrates a process flow diagram depicting a method of writing information to magnetic storage media that includes a carbon nanotube containing magnetic nanoparticles.

FIG. 34 illustrates a process flow diagram depicting a method of writing information to magnetic storage media that includes a carbon nanotube 101 containing magnetic nanoparticles 103 or 104. The write process begins with START in step 7100. In step 7102, read/write head 5024 receives data to be written from controller 7102. In step 7104, read/write head 5024 locates the rotational marker 5022. In step 7106, servo information 5076 is read for fine-positioning of read/write head 5024 preceding data block 5018 to center read/write head 5024 over the desired data track 5019. In step 7108, servo information is used to correct the position of read/write head 5024 over data block 5018 as needed. In step 7110, read/write head 5024 reads data header information 5078 for coarse adjustment of read/write head 5024. If the data header information 5078 does not match the desired data block that controller 5010 wishes to position the read/write head 5024 over, then controller 5010 directs read/write head 5024 to another location. The controller then reads the data header information to determine if the data block is GOOD or BAD. If it is BAD, the read/write head 5024 is directed by controller 5010 to skip to the next data block 5018. If it is GOOD, controller 5010 directs read/write head 5024 to write data onto data block 5018 in step 7112. Then in step 7114, the controller 5010 performs a write-verify process by reading the written data with read/write head 5024. In step 7116, the controller determines whether any errors were detected. If errors were detected, in step 7118 a counter is reset and read/write head 5024 is directed to attempt to rewrite the data N times. If read/write head 5024 is unable to rewrite the data after N attempts, the data block 5018 is marked as BAD in the data header information 5082 and the read/write head 5024 is directed to skip to the next data block 5018. If no errors were detected, in step 7120 the controller 5010 is informed that the write process was completed and which data blocks 5018 were used. The write process ENDS in step 7122.

Figure 35:
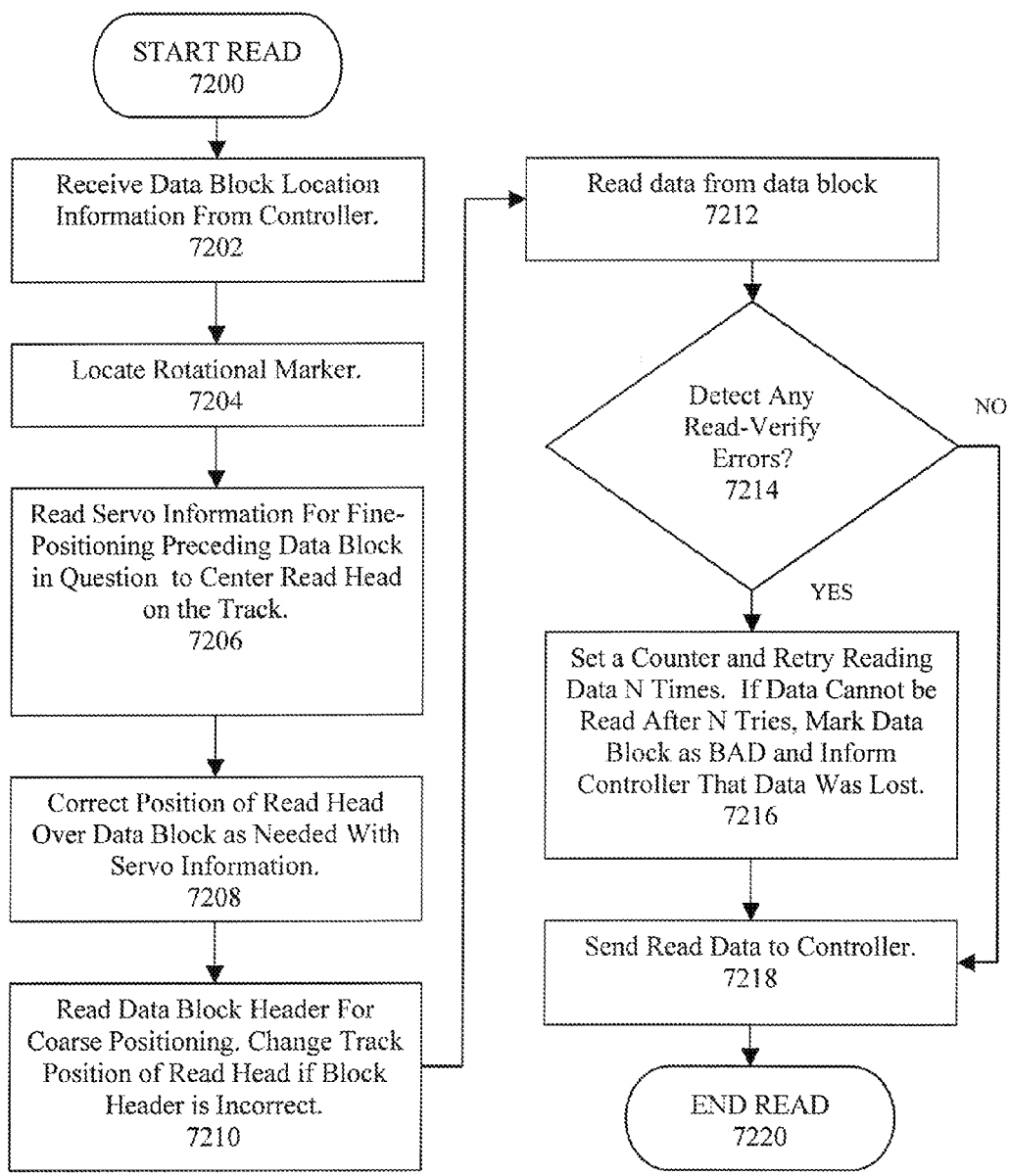
FIG. 35 illustrates a process flow diagram depicting a method of reading information from a magnetic storage media that includes a carbon nanotube containing magnetic nanoparticles.

FIG. 35 illustrates a process flow diagram depicting a method of reading information from a magnetic storage media that includes a carbon nanotube 101 containing magnetic nanoparticles 103 or 104. The process begins with START READ in step 7200. In step 7202, read/write head 5024 and armature 5030 receives data block 5018 location information from controller 5010. In step 7204, read/write head 5024 first locates rotational marker 5022. Then in step 7206, read/write head 5024 reads servo information 5076 for fine-positioning preceding the data block 5018 to center the read/write head 5024 over the data track 5019. Then in step 7208, controller 5010 corrects the position of read/write head 5024 over data block 5018 and data track 5019 as needed with servo information 5076. In step 7210, read/write head 5024 reads data block header 5034 for coarse positioning. If the data bock header 5034 contains information showing that read/write head 5024 is located at the correct data block 5018, the read/write head remains in position. If the data block header 5034 contains information showing that read/write head 5024 is located at the incorrect data block, controller 5010 will direct armature 5030 to move position to a different data track 5019. In step 7212, read/write head 5024 reads information from the data block 5018. In step 7214, the controller 5010 determines if there are any read-verify errors with the error correction code. If there are read/verify errors, in step 7216 the controller will set a counter and reattempt to read the data N times. If the data cannot be read after N attempts, the controller 5010 will direct the read/write head 5024 to mark the data sector as BAD in the data header information 5082. If no errors were detected, the read data is sent to controller 5010 in step 7218. The read process then ENDS in step 7220.

Figure 36:
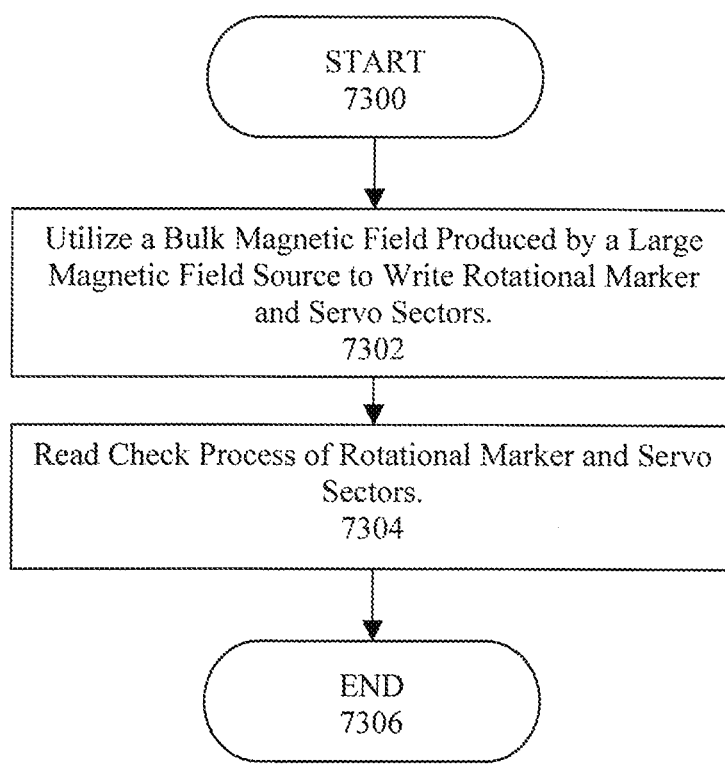
FIG. 36 illustrates a process flow diagram depicting a method of writing servo control information to magnetic storage media.

FIG. 36 illustrates a process flow diagram depicting a method of writing servo control information 5020, rotational marker information 5022 and header identifiers 5078 to magnetic storage media. The process begins in step 7300. In step 7302, a strong bulk magnetic field is produced by a large magnetic field source. The entire disk 5016 is exposed to this bulk magnetic field. The bulk magnetic field magnetically polarizes all of the magnetic nanoparticles 103 or 104 forming the servo sectors 5020, the rotational marker 5022 and the header identifiers 5078. The magnetic nanoparticles 103 or 104 forming the other parts of disk 5016 are then repolarized to a desired magnetic polarization during a disk format or data writing process. The magnetic nanoparticles 103 or 104 forming the servo sectors 5020, the rotational marker 5022 and header identifier 5078 are permanently magnetized in this process and are not altered during disk formatting or data writing processes. As discussed earlier, the magnetic nanoparticles forming servo sectors 5020, rotational marker 5022 and header identifier 5078 may have a higher coercivity than the other structures of disk 5016 such as data blocks 5018. By having a higher coercivity, data sectors 5020, rotational marker 5022 and header identifier 5078 cannot have their magnetic polarizations changed when a weaker magnetic field is used to magnetically polarize the magnetic nanoparticles having a lower coercivity that form data blocks 5018. Note that the permanently magnetized magnetic nanoparticles 103 or 104 form one digital state. The non-magnetic nanoparticles 118 or empty carbon nanotubes 101 which also form portions of servo sectors 5020 and header identifiers 5078 form the other digital state. In this manner a single step bulk magnetic field can write all of the servo control and marker and identifier information. In step 7304, a read check process is performed to determine if the servo sectors 5020, marker 5022, and identifier 5078 have been properly written. The process ENDS in step 7306.

FIG. 37 illustrates a process flow diagram depicting a method for fine positioning of a read/write head 5024 over a data track 5019. The fine positioning process begins with START 7400. In step 7402, read/write head 5024 reads carbon nanotubes 5076A, 5076B, and 5076C within positioning array 5076. In step 7404, if it is determined that no magnetic nanoparticles 103 or 104 were detected, the controller goes to step 7406 and repositions the read/write head 5024 over data track 5019 with servo control information. If magnetic nanoparticles 103 or 104 are detected in step 7404, then the controller 5010 determines if magnetic nanoparticles 103 or 104 were detected in carbon nanotube 5076A and 5076B but not in carbon nanotube 5076C in step 7408. If controller 5010 determines that magnetic nanoparticles 103 or 104 were detected in carbon nanotube 5076A and 5076B, but not carbon nanotube 5076C, then in step 7410 the controller 5010 determines that the read/write head 5024 is positioned to high with respect to data track 5019 and repositions the read/write head 5024 lower over data track 5019. In step 7412, if controller 5010 determines that magnetic nanoparticles 103 or 104 were detected in carbon nanotubes 5076C and 5076B, but not carbon nanotube 5076A, the controller 5010 determines that the read/write head 5024 is positioned too low with respect to data track 5019 and correspondingly moves read/write head 5024 to a higher position over data track 5019. If controller 5010 determines that read/write head 5024 detected magnetic nanoparticles 103 or 104 in both carbon nanotubes 5076A and 5076C as well as 5076B, then the read/write head 5024 is correctly positioned over data track 5019. Then fine positioning process then ends in step 7418.

While the technology has been shown and described with reference to a particular embodiment thereof, it will be understood to those skilled in the art, that various changes in form and details may be made therein without departing from the spirit and scope of the disclosure.

The embodiments of the invention in which an exclusive property or privilege is claimed are defined as follows:

1. A magnetic storage media, comprising:
   a nanotube;
   a first magnetic nanoparticle configured to store binary information through magnetic polarization, said first magnetic nanoparticle contained within said nanotube;
   a second magnetic nanoparticle configured to store binary information through magnetic polarization, said second magnetic nanoparticle contained within said nanotube; and
   a first magnetic shunt nanoparticle, said first magnetic shunt nanoparticle contained within said nanotube between said first and second magnetic nanoparticles, wherein said magnetic shunt nanoparticle is configured to duct magnetic flux without permanently retaining a magnetic field.

2. The magnetic storage media of claim 1, wherein said first magnetic shunt nanoparticle is comprised of a dielectric material.

3. The magnetic storage media of claim 1, wherein said nanotube is encapsulated within a data layer.

4. The magnetic storage media of claim 1, wherein said first magnetic shunt nanoparticle is comprised of an insulating material.

5. The magnetic storage media of claim 1, wherein said first and second magnetic nanoparticles and said first magnetic shunt nanoparticle are held in a stationary position within said nanotube by friction.

6. The magnetic storage media of claim 1, wherein said nanotube is a carbon nanotube.

7. The magnetic storage media of claim 1, further comprising a third magnetic nanoparticle configured to store binary information through magnetic polarization, said third magnetic nanoparticle contained within said nanotube; and
   a second magnetic shunt nanoparticle, said second magnetic shunt nanoparticle contained within said nanotube between said second and third magnetic nanoparticles.

* * * * *